United States Patent
Baumgartner et al.

(10) Patent No.: US 9,474,034 B1
(45) Date of Patent: Oct. 18, 2016

(54) POWER REDUCTION IN A PARALLEL DATA COMMUNICATIONS INTERFACE USING CLOCK RESYNCHRONIZATION

(71) Applicant: International Business Machines Corporation, Armonk, NY (US)

(72) Inventors: Steven J. Baumgartner, Zumbro Falls, MN (US); Daniel M. Dreps, Georgetown, TX (US); Michael B. Spear, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/954,418

(22) Filed: Nov. 30, 2015

(51) Int. Cl.
*H04W 56/00* (2009.01)
*H04W 24/08* (2009.01)

(52) U.S. Cl.
CPC .......... *H04W 56/001* (2013.01); *H04W 24/08* (2013.01)

(58) Field of Classification Search
CPC ........ G06F 11/00; G06F 11/20; G06F 11/30; G06F 11/34; G06F 13/00; G06F 13/28; G06F 13/36; H04L 5/16; H04L 7/00; H04L 7/02; H04L 12/28; H04L 12/66; H04W 24/08; H04W 56/001
USPC .................... 365/233.11; 370/351, 419, 463; 375/219, 354, 356, 359; 702/107, 117, 702/186; 710/104, 316; 714/4.5, 34, 43, 714/733
See application file for complete search history.

(56) References Cited

U.S. PATENT DOCUMENTS

| | | | |
|---|---|---|---|
| 4,656,592 A | 4/1987 | Spaanenburg et al. | |
| 4,964,120 A | 10/1990 | Mostashari | |
| 5,359,561 A | 10/1994 | Sakomura et al. | |
| 5,577,096 A | 11/1996 | Kitano et al. | |
| 5,715,274 A * | 2/1998 | Rostoker ................. | H01L 23/48 375/130 |
| 5,734,844 A | 3/1998 | Moughanni et al. | |
| 6,101,151 A * | 8/2000 | Watanabe ............ | G11C 7/1051 365/189.05 |
| 6,240,087 B1 | 5/2001 | Cummings et al. | |
| 6,556,660 B1 | 4/2003 | Li et al. | |
| 6,606,576 B2 | 8/2003 | Sessions | |
| 6,650,649 B1 | 11/2003 | Muhammad et al. | |
| 6,735,543 B2 | 5/2004 | Douskey et al. | |

(Continued)

FOREIGN PATENT DOCUMENTS

| | | |
|---|---|---|
| JP | 9161498 A | 6/1997 |
| JP | 2000090690 A | 3/2000 |

OTHER PUBLICATIONS

"Continuous Time, Interface Calibration for a High-Speed Interface—Dynamic Data Centering", published anonymously in ip.com, Document No. IPCOM000196832D, Jun. 17, 2010.

(Continued)

*Primary Examiner* — Sam K Ahn
*Assistant Examiner* — Shawkat M Ali
(74) *Attorney, Agent, or Firm* — Roy W. Truelson

(57) ABSTRACT

A digital data communications mechanism includes multiple parallel lines, in which components of one or more lines are temporarily powered down to save power. Preferably, both the transmitter and receiver contain respective generators generating identical pre-determined pseudo-random bit streams, which are initially synchronized and which remain powered up when the line is temporarily powered down. Upon re-powering the line, the transmitter transmits the locally generated bit stream, and the receiver compares the received bit stream with its internally generated bit stream to determine an amount of shift required for re-synchronization.

13 Claims, 19 Drawing Sheets

(56) References Cited

U.S. PATENT DOCUMENTS

| | | |
|---|---|---|
| 6,771,568 B2 | 8/2004 | Hochendoner |
| 7,072,355 B2 | 7/2006 | Kizer |
| 7,117,126 B2 | 10/2006 | Floyd et al. |
| 7,142,640 B2 | 11/2006 | Beltz et al. |
| 7,159,136 B2 | 1/2007 | Best et al. |
| 7,305,574 B2 | 12/2007 | Ferraiolo et al. |
| 7,400,670 B2 | 7/2008 | Hampel et al. |
| 7,444,559 B2 | 10/2008 | Swanson et al. |
| 7,479,912 B1 | 1/2009 | Xianggang et al. |
| 7,603,246 B2 | 10/2009 | Newcomb et al. |
| 7,676,715 B2 | 3/2010 | Miller et al. |
| 7,944,818 B2 | 5/2011 | Barthel et al. |
| 8,116,162 B1 | 2/2012 | Wennekamp et al. |
| 8,218,537 B1 | 7/2012 | Gui et al. |
| 8,497,704 B2* | 7/2013 | Singh ............... H03K 19/17744 326/38 |
| 8,681,839 B2 | 3/2014 | Bulzacchelli et al. |
| 8,767,531 B2 | 7/2014 | Ferraiolo et al. |
| 8,898,504 B2 | 11/2014 | Baumgartner et al. |
| 2002/0066001 A1 | 5/2002 | Olgarig et al. |
| 2002/0093994 A1 | 7/2002 | Hendrickson et al. |
| 2002/0145981 A1 | 10/2002 | Klinker et al. |
| 2004/0156396 A1 | 8/2004 | Amick et al. |
| 2005/0213593 A1 | 9/2005 | Anderson et al. |
| 2005/0216736 A1 | 9/2005 | Smith |
| 2006/0123297 A1* | 6/2006 | Reichert .......... G01R 31/31907 714/731 |
| 2006/0159113 A1 | 7/2006 | Kizer |
| 2006/0244505 A1 | 11/2006 | Fung et al. |
| 2007/0002939 A1 | 1/2007 | Daugherty |
| 2007/0177576 A1 | 8/2007 | Johansen et al. |
| 2007/0183319 A1 | 8/2007 | Rug et al. |
| 2007/0240000 A1 | 10/2007 | Chapuis et al. |
| 2008/0320191 A1 | 12/2008 | Bravo et al. |
| 2010/0005202 A1 | 1/2010 | Ferraiolo et al. |
| 2010/0005365 A1 | 1/2010 | Buchmann et al. |
| 2010/0046543 A1 | 2/2010 | Parnaby |
| 2010/0055846 A1 | 3/2010 | Lii et al. |
| 2010/0121994 A1 | 5/2010 | Kim et al. |
| 2010/0174955 A1 | 7/2010 | Carnevale et al. |
| 2010/0232489 A1* | 9/2010 | Watkins ........... G01R 31/31709 375/226 |
| 2010/0265820 A1 | 10/2010 | Feng et al. |
| 2010/0271092 A1* | 10/2010 | Zerbe ................. G06F 13/4243 327/161 |
| 2011/0126081 A1 | 5/2011 | Kasamsetty et al. |
| 2011/0176372 A1 | 7/2011 | Baba et al. |
| 2011/0211404 A1 | 9/2011 | Raghunathan et al. |
| 2011/0235459 A1* | 9/2011 | Ware ........................ G11C 7/04 365/233.11 |
| 2011/0320881 A1 | 12/2011 | Dodson et al. |
| 2011/0320921 A1 | 12/2011 | Gower et al. |
| 2012/0106539 A1 | 5/2012 | Ferraiolo et al. |
| 2012/0155253 A1 | 6/2012 | Johansen |
| 2012/0221769 A1 | 8/2012 | Ware et al. |
| 2013/0159761 A1* | 6/2013 | Baumgartner ............ H04L 1/22 714/4.5 |
| 2013/0287784 A1 | 10/2013 | Brouxhon et al. |
| 2014/0032799 A1 | 1/2014 | Dickson et al. |

OTHER PUBLICATIONS

"Continuous Time, Interface Calibration for a High-Speed Interface—Decision Feedback Equalization (DFE)", published anonymously in ip.com, Document No. IPCOM000196836D, Jun. 17, 2010.

"Real Time, Interface Calibration for a High-Speed Interface—Continuous Time Linear Equalization (CTLE)", published anonymously in ip.com, Document No. IPCOM000196834D, Jun. 17, 2010.

"Continuous Time, Interface Calibration for a High-Speed Interface—DC Offset Calibration", published anonymously in ip.com, Document No. IPCOM000196833D, Jun. 17, 2010.

"Continuous Time, Interface Calibration for a High-Speed Interface—VGA Gain Adjust", published anonymously in ip.com, Document No. IPCOM000196835D, Jun. 17, 2010.

D. M. Berger et al., "High-speed source-synchronous interface for the IBM System z9 processor", IBM J. Res. & Dev., vol. 51, No. 1/2, Jan./Mar. 2007.

Anonymously; "Method of Achieving Minimal Skew Across Multiple Transmit Channels of a Transceiver"; An IP.com Prior Art Database Technical Disclosure; http://ip.com/IPCOM/000201498; Nov. 12, 2010.

Vestas Wind Systems A/S et al.; "Power Saving Modes in Modern Distributed Control Systems Utilizing Ethernet Communication Networks"; An IP.com Prior Art Database Technical Disclosure; http://ip.com/IPCOM/000229471; Aug. 1, 2012.

U.S. Appl. No. 14/954,418, filed Nov. 30, 2015.

U.S. Appl. No. 15/040,979, filed Feb. 10, 2016.

* cited by examiner

POWER REDUCTION IN A PARALLEL DATA COMMUNICATIONS INTERFACE USING CLOCK RESYNCHRONIZATION

FIELD OF THE INVENTION

The present invention relates to digital data processing, and in particular to the design and operation of communications circuit interfaces for communicating between digital data devices.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication links coupled to a network, etc. CPU's (also called processors) are capable of performing a limited set of very simple operations, but each operation is performed very quickly. Data is moved between processors and memory, and between input/output devices and processors or memory. Sophisticated software at multiple levels directs a computer to perform massive numbers of these simple operations, enabling the computer to perform complex tasks, and providing the illusion at a higher level that the computer is doing something sophisticated.

Continuing improvements to computer systems can take many forms, but the essential ingredient of progress in the data processing arts is increased throughput, i.e., performing more of these simple operations per unit of time.

The computer is a sequential state machine in which signals propagate through state storing elements synchronized with one or more clocks. Conceptually, the simplest possible throughput improvement is to increase the speeds at which these clocks operate, causing all actions to be performed correspondingly faster.

Data must often be communicated across boundaries between different system components. For example, data may need to be communicated from one integrated circuit chip to another. In countless instances, an operation to be performed by a component can not be completed until data is received from some other component. The capacity to transfer data can therefore be a significant limitation on the overall throughput of the computer system. As the various components of a computer system have become faster and handle larger volumes of data, it has become necessary to correspondingly increase the data transferring capability ("bandwidth") of the various communications paths.

Typically, a communications medium or "bus" for transferring data from one integrated circuit chip to another includes multiple parallel lines which carry data at a frequency corresponding to a bus clock signal, which may be generated by the transmitting chip, the receiving chip, or some third component. The multiple lines in parallel each carry a respective part of a logical data unit. For example, if eight lines carry data in parallel, a first line may carry a first bit of each successive 8-bit byte of data, a second line carry a second bit, and so forth. Thus, the signals from a single line in isolation are meaningless, and must somehow be combined with those of other lines to produce coherent data.

The increased clock frequencies of processors and other digital data components have induced designers to increase the speeds of bus clocks in order to prevent transmission buses from becoming a bottleneck to performance. This has caused various design changes to the buses themselves. For example, a high-speed bus is typically implemented as a point-to-point link containing multiple lines in parallel, each carrying data from a single transmitting chip to a single receiving chip, in order to support operation at higher bus clock speeds.

The geometry, design constraints, and manufacturing tolerances of integrated circuit chips and the circuit cards or other platforms on which they are mounted makes it impossible to guarantee that all physical lines of a single link are identical. For example, it is sometimes necessary for a link to turn a corner, meaning that the lines on the outside edge of the corner will be physically longer than those on the inside edge. Circuitry on a circuit card is often arranged in layers; some lines may lie adjacent to different circuit structures in neighboring layers, which can affect stray capacitance in the lines. Any of numerous variations during manufacture may cause some lines to be narrower than others, closer to adjacent circuit layers, etc. These and other variations affect the time it takes a signal to propagate from the transmitting chip to the receiving chip, so that some data signals carried on some lines will arrive in the receiving chip before others (a phenomenon referred to as data skew). Furthermore, manufacturing variations in the transmitter driving circuitry in the transmitting chip or receiving circuitry in the receiving chip can affect the quality of the data signal.

In order to support data transfer at high bus clock speeds, the lines of a data communications bus can be individually calibrated to compensate for these and other variations. However, so sensitive is the communications mechanism in many modern data processing environments that calibration parameters can drift significantly during operation, so that periodic re-calibration is required to achieve acceptable performance.

Modern data processing systems are expected to provide a high degree of availability, and interruption of data processing function to perform system maintenance is increasingly unacceptable. Accordingly, various techniques exist whereby a data communications bus can be periodically re-calibrated without suspending operation of the bus, i.e. without suspending the transfer of functional data. For example, it is known to provide a duplicate of each individual line and certain associated hardware for use in calibrating the line, so that functional data can be transmitted on the duplicate line while the primary line is being calibrated. It is also known to provide a common redundant line for use in calibration, the individual lines being calibrated one at a time, while the common redundant line compensates for the lost data capacity of the line being calibrated.

Data communications buses for communicating data among multiple integrated circuit chips, board assemblies or other components consume a significant portion of the power consumed by digital electronic devices. Continuous calibration and/or maintaining redundancy of communications buses only increases the power requirements of these buses. It is desirable to keep power consumption at a minimum.

One known technique for reducing power consumption is to power off selective components of the interface at selective times. Exemplary embodiments of this technique are disclosed in U.S. Pat. No. 8,898,504 to Baumgartner et al., which is herein incorporated by reference. Notwithstanding power savings achieved with these and other methods, a need exists for devices or methods which further reduce power consumption is data communications buses, and in particular, in data communications buses which are continuously calibrated.

SUMMARY

A communications mechanism for communicating digital data between two devices includes a parallel data link of multiple parallel lines, in which at least some of the components associated with one or more lines are powered down at least some of the time, and receiver components are re-synchronized with the transmitter upon re-powering the components by matching an internally generated data pattern in the receiver with a corresponding data pattern transmitted by the transmitter.

In one or more preferred embodiments, both the transmitter and the receiver contain respective pseudo-random pattern generators which generate identical pre-determined pseudo-random bit streams. These bit streams are synchronized with respect to each other when the system containing the communications bus is initialized. When a line is temporarily powered down, the pseudo-random pattern generators in the transmitter and receiver remain powered on and continue to generate their respective bit streams. Upon re-powering the line, the transmitter transmits the pseudo-random bit stream generated by its pseudo-random bit stream generator. The receiver compares the pseudo-random bit stream received over the line with the pseudo-random bit stream internally generated by the receiver's pattern generator to determine an amount of shift required for the receiver circuits, and shifts the receiver's circuits so that the two patterns match, thus re-synchronizing the line. Preferably, this pseudo-random bit stream is not used solely for re-synchronization, but is also used for one or more other purposes, such as calibration of the receiver and/or scrambling of transmitted data.

In one or more preferred embodiments, the receiver circuit for each line includes a respective local clock phase rotator, a sampler, a deserializer, and a deskew circuit, the output of the deskew circuit being adjusted to a common clock domain for all lines. The clock phase rotator adjusts the phase of the interface clock to an optimum value for use by the sampler and deserializer. The receiver circuit further includes a clock divider which divides the frequency of a phase adjusted signal produced by the phase rotator, for use by the deserializer and deskew circuit. The receiver circuit further includes a load counter and an unload counter which independently select different registers in the deskew for load and unload of data to produce data output in the common clock domain. When a line is temporarily powered down, synchronization of the clock divider and the unload counter are lost. The receiver circuit is re-synchronized by shifting both the clock divider and the unload counter as necessary so that the received data pattern matches the internally generated pattern. The result of re-synchronization is that the latency of data passing through the deskew circuit is the same as it was before the line was temporarily powered down.

In one or more preferred embodiments, a bi-directional communications link comprises a first set of parallel lines for transmitting data in a first direction and a second set of parallel lines for transmitting data in the opposite direction, the first set containing $N_{MAX}$ lines plus at least one redundant line and the second set containing $P_{MAX}$ lines plus at least one redundant line, where $N_{MAX}$ and $P_{MAX}$ are the maximum number of logical lanes in each respective set which can transmit functional data at any given instant in time (and where $N_{MAX}$ and $P_{MAX}$ may be, but are not necessarily, equal). A respective set of switches is associated with each set of parallel lines, enabling any arbitrary line of the set to be selected for calibration while others of the set carry functional data. A traffic monitoring mechanism monitors the volume of data being transmitted across each set of parallel lines, and dynamically adjusts the respective number of logical lanes N and P in each set which are used to transmit functional data to conserve power, this number being limited by the respective $N_{MAX}$ and $P_{MAX}$ of each set. All lines in each set are continuously recalibrated by cycling through the lines one by one and recalibrating, using a redundant line to carry functional data while a line otherwise used for functional data is being recalibrated. Any line not required for carrying functional data or calibration (i.e., any line in excess of (N+1) or (P+1)) is at least partially powered down. A design structure for an integrated circuit embodying any or all of the inventive aspects may alternatively be constructed and/or used in a design process.

A communications mechanism in accordance with the preferred embodiment provides a set of continuously calibrated lines while reducing overall power requirements. Furthermore, in a preferred embodiment such a mechanism can include one or more redundant lines which are also continuously calibrated and can be used in the event of a fault in any line, thereby providing high reliability and availability of the communications interface.

The details of the present invention, both as to its structure and operation, can best be understood in reference to the accompanying drawings, in which like reference numerals refer to like parts, and in which:

DETAILED DESCRIPTION

Communications Media Terminology

Figure 1:
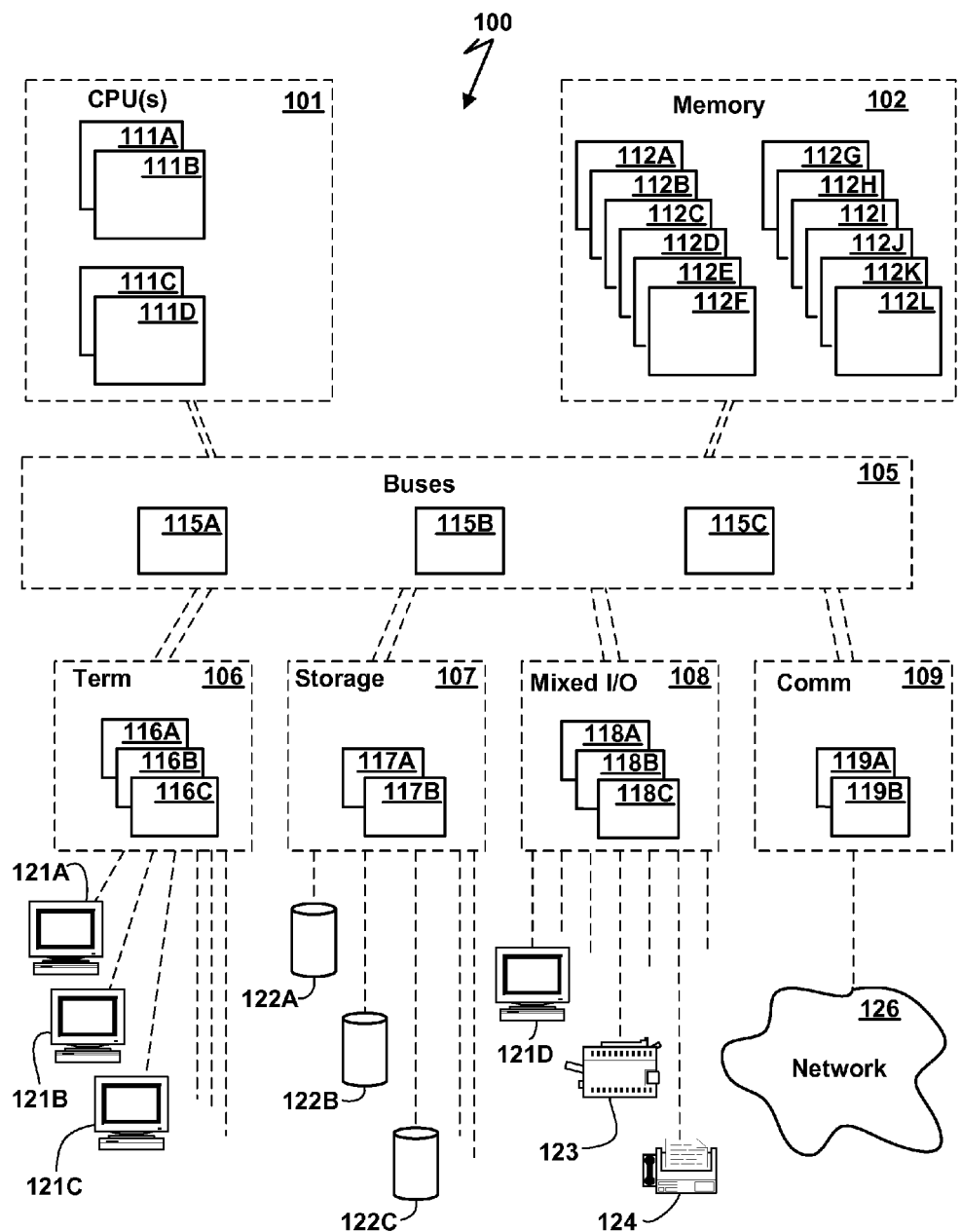
FIG. 1 is a high-level block diagram of the major hardware components of an exemplary computer system having multiple integrated circuit chips and one or more high-speed buses providing communications paths among the integrated circuit chips, according to one or more preferred embodiments.

As described herein, a digital communications media contains multiple lines in parallel which collectively transmit logical units of data from a transmitter to a receiver.

As used herein, a "line" is a communications medium which conveys a single bit of digital data at a time from a transmitter to one or more receivers. Commonly, a line is a single electrically conductive wire which transmits an electrical voltage, the value of the voltage with respect to a reference (such as ground) indicating the value of the bit of data. However, a "line" as used herein could also mean a pair of electrically conductive wires which each transmit a respective voltage, the relative values of the two voltages indicating the value of the bit of data. A line may be bidirectional, having both transmitting and receiving circuitry at either end, or may be unidirectional, having only transmitting circuitry at one end and only receiving circuitry at the other.

As used herein, "parallel lines" or a "parallel bus" refers to a set of multiple lines as explained above, wherein the lines of the set collectively are used to convey coherent data. Each line of the set only conveys some part of the data, which itself is only a meaningless stream of bits until it is combined and interleaved with the bits from the other lines to produce coherent data. In some parallel bus implementations, the bits of a logical unit of data are simultaneously presented at the receiver on a common clock signal. For example, if an 8-line parallel bus carries one byte of data at a time, all bits of that byte may be clocked into the receiver circuits simultaneously. However, this restriction is difficult or impossible to maintain as bus clock speeds increase due to the relative amount of data skew. Accordingly, in modern high-speed parallel buses, each of the lines may present data at the receiver at different phases and be sampled independently by their respective receiver circuits. Sometimes this latter form of parallel bus is referred to as a "striped serial bus", to distinguish it from slower buses which sample on a common clock. Unless otherwise qualified, a "parallel bus" or "parallel lines" as used herein does not imply any particular clock arrangement, and could be of the common clock phase type or of the independent clock phase type.

In one or more preferred embodiments described herein, a high-speed parallel bus is a point-to-point link, in which data is communicated only between a pair of devices, i.e from one transmitter to one receiver. However, the present invention is not necessarily limited to use in point-to-point links, and unless otherwise qualified herein, the terms "parallel bus" or "parallel lines" should not be taken to require that the bus or lines be a point-to-point link. For example, a parallel bus could be a single-to-multi-point medium, in which there is a single transmitting device and multiple receiving devices, or a medium having multiple possible transmitting devices, which typically requires some form of arbitration.

One of the features of the communications mechanism described as a preferred embodiment herein is the ability to calibrate certain circuitry while communicating functional data. As used herein, functional data means data used by the receiving chip, or by some other system component to which it is subsequently communicated, to perform its intended function (as opposed to test or calibration data used to test or calibrate the communications link itself, or control information used to control or coordinate the communications link, and specifically its calibration, spare line replacement, and/or bandwidth control activities). The ability to calibrate certain communications circuitry while communicating functional data is referred to as continuous time, dynamic calibration.

Hardware Overview

In one or more preferred embodiments, multiple integrated circuit chips of a digital data system are coupled for inter-chip communications by one or more high-speed point-to-point data links or buses, each containing multiple parallel data lines. Referring to the Drawing, wherein like numbers denote like parts throughout the several views, FIG. 1 is a high-level block diagram of the major hardware components of an exemplary general-purpose computer system having multiple integrated circuit chips and one or more high-speed buses providing communications paths among the integrated circuit chips, according to one or more preferred embodiments. At a functional level, the major components of system 100 are shown in FIG. 1 outlined in dashed lines; these components include one or more central processing units (CPUs) 101, main memory 102, interfaces for I/O devices such as terminal interface 106, storage interface 107, mixed I/O device interface 108, and communications/network interface 109, all of which are coupled for inter-component communication via one or more buses 105.

CPU 101 is one or more general-purpose programmable processors, executing instructions stored in memory 102; system 100 may contain either a single CPU or multiple CPUs, either alternative being collectively represented by feature CPU 101 in FIG. 1, and may include one or more levels of on-board cache (not shown). Memory 102 is a random-access semiconductor memory for storing data and programs. Memory 102 is conceptually a single monolithic entity, it being understood that memory is often arranged in a hierarchy of caches and other memory devices. Additionally, memory 102 may be divided into portions associated with particular CPUs or sets of CPUs and particular buses, as in any of various so-called non-uniform memory access (NUMA) computer system architectures.

Terminal interface 106 provides a connection for the attachment of one or more user terminals 121A-C (referred to generally as 121), and may be implemented in a variety of ways. Many large server computer systems (mainframes) support the direct attachment of multiple terminals through terminal interface I/O processors, usually on one or more electronic circuit cards. Alternatively, interface 106 may provide a connection to a local area network to which terminals 121 are attached. Various other alternatives are possible. Data storage interface 107 provides an interface to one or more data storage devices 122A-C, (referred to generally as 122), which are typically rotating magnetic hard disk drive units, although other types of data storage device could be used. Mixed I/O device interface 108 provides an interface to these or any of various other input/output devices or devices of other types. Three such devices, terminal 121D, printer 123 and fax machine 124, are shown in the exemplary embodiment of FIG. 1, it being understood that many other such devices may exist, which may be of differing types. Communications interface 109 provides one or more communications paths from system 100 to other digital devices and computer systems; such paths may include, e.g., one or more networks 126 such as the Internet, local area networks, or other networks, or may include remote device communication lines, wireless connections, and so forth. The communications paths running between I/O device interfaces 106-109 and the devices or networks may be dedicated communication links or links which are shared (e.g., multi-drop buses), and may be generally referred to as I/O buses, whether single or multiple devices are attached thereto.

Buses 105 provide communication paths among the various system components. Although a single conceptual bus entity 105 is represented in FIG. 1, it will be understood that a typical computer system may have multiple buses, often arranged in a complex topology, such as point-to-point links in hierarchical, star or web configurations, multiple hierarchical busses, parallel and redundant paths, etc., and that separate buses may exist for communicating certain information, such as addresses or status information.

Physically, the major functional units are typically embodied in one or more integrated circuit chips. Such chips are generally mounted on electronic circuit card assemblies, with multiple chips often mounted on a single circuit card.

In FIG. 1, CPU 101 is represented as containing four integrated circuit chips 111A-D, each of which may contain one or more processors, or may perform only part of the functions of a single processor; memory 102 is represented as containing six chips 112A-112F, buses 105 as containing three bus interface chips 115A-C, terminal interface 106 as containing three chips 116A-116C, storage interface 107 as containing two chips 117A-B, I/O and mixed I/O device interface 108 as containing three chips 118A-C, and communications interface 109 as containing two chips 119A-B. However, the actual number of such chips may vary, and different devices as well as buses which couple multiple devices may be integrated into a single chip.

Figure 2:
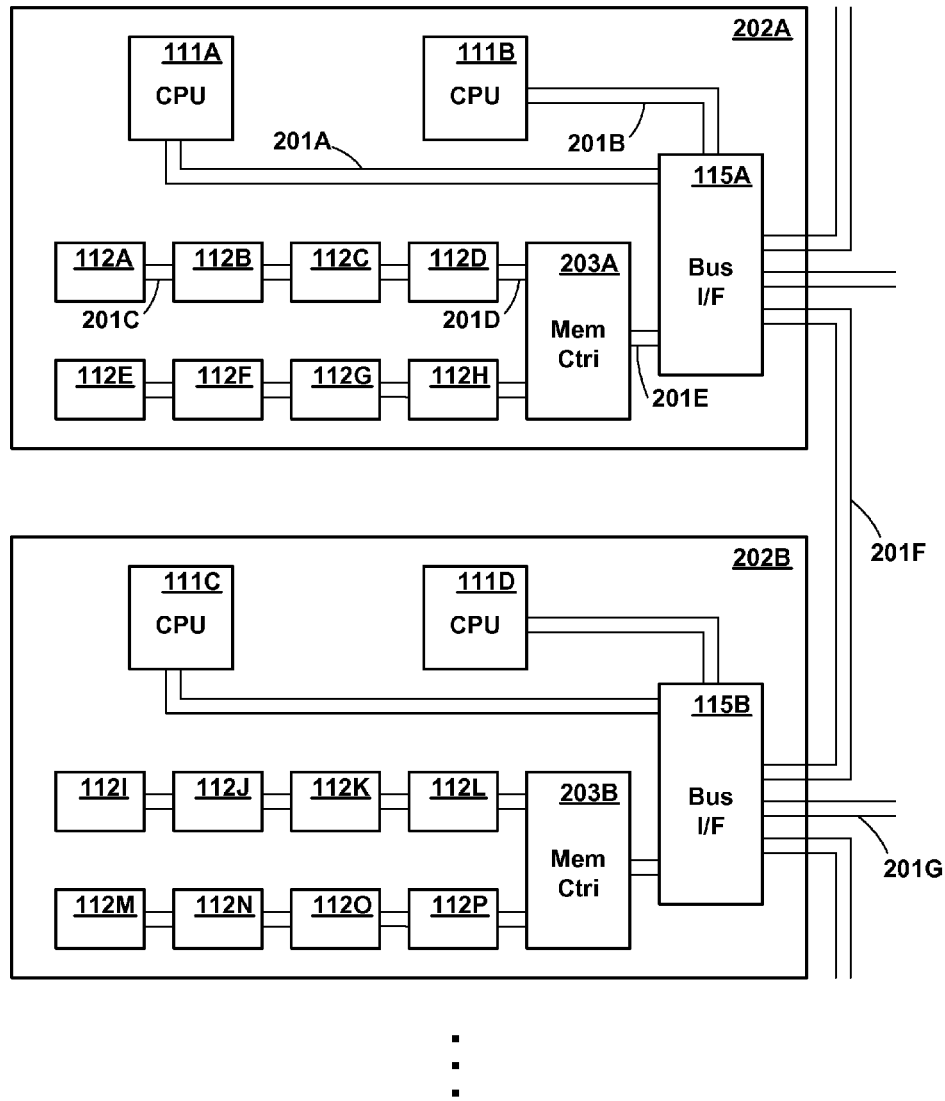
FIG. 2 is a generalized representation showing in greater detail certain hardware packaging elements of a representative portion of the computer system of FIG. 1, in accordance with one or more preferred embodiments.

Communication paths which connect the various components of system 100, and in particular paths connecting any of the various I/O devices with CPUs 101 or memory 102, are represented in FIG. 1 at a high level of abstraction. In fact, such paths are typically far more complex, and are generally arranged in a hierarchy. FIG. 2 is a generalized representation showing in greater detail certain hardware packaging elements of a representative portion of CPU 101, memory 102, and buses 105 for coupling CPU and memory of the computer system 100 of FIG. 1, in accordance with one or more preferred embodiments.

Referring to FIG. 2, multiple integrated circuit chips are each mounted on a respective circuit card 202A, 202B (herein generically referred to as feature 202), of which two are represented in FIG. 2, it being understood that the number of circuit cards may vary, and for a large computer system is typically much greater. For example, in the exemplary system portion of FIG. 2, circuit card 202A contains processor chips 111A, 111B, memory chips 112A-H, memory controller chip 203A for accessing memory chips 112A-H, and bus interface chip 115A. Circuit card 202B similarly contains processor chips 111C-D, memory chips 112I-P, memory controller chip 203B for accessing memory chips 112I-P, and bus interface chip 115B.

System 100 further contains multiple point-to-point communication links 201A-201G (herein generically referred to as feature 201), each coupling a respective pair of integrated circuit chips. Logically, these links convey data in both directions, but physically they are often constructed as a two separate sets of parallel lines, each set conveying data in a single direction opposite that of the other set. Some of these links couple pairs of integrated circuit chips mounted on the same circuit card, while other links couple pairs of chips mounted on different cards. For example, as shown in FIG. 2, links 201A, 201B couple processor chips 111A, 111B, respectively to bus interface chip 115A; link 201C couples memory chip 112A to memory chip 112B; link 201D couples memory chip 112D to memory controller chip 203A, and link 201E couples memory controller chip 203A to bus interface 115A, all of these chips being mounted on common circuit card 202A. There thus exists a communications path between any two chips on card 202A, although it may have to traverse one or more intermediate chips. Additionally, link 201F, connecting bus interface chip 115A with bus interface chip 115B, and link 201G, connecting bus interface chip 115B with another module (not shown), couple devices mounted on different circuit cards. Link 201G might couple chip 115B with a similar bus interface chip servicing additional processor and memory chips, or it might couple chip 115 with some other device, such as an I/O controller chip for connecting to one or more I/O buses. Although all of links 201A-G are logically point-to-point links, they do not necessarily have identical properties: they may operate at different clock speeds; they may have different widths (i.e., different numbers of parallel lines); they may operate at different voltages; some may contain bi-directional lines while others contain separate sets of unidirectional lines; and/or any of various additional parameters may be different.

It should be understood that FIGS. 1 and 2 are intended to depict the representative major components of system 100 at a high level, that individual components may have greater complexity than represented in FIGS. 1 and 2, that components other than or in addition to those shown in FIGS. 1 and 2 may be present, that the number, type and configuration of such components may vary, and that a large computer system will typically have more components than represented in FIGS. 1 and 2. Several particular examples of such additional complexity or additional variations are disclosed herein, it being understood that these are by way of example only and are not necessarily the only such variations.

Although system 100 is depicted as a multiple user system having multiple terminals, system 100 could alternatively be a single-user system, typically containing only a single user display and keyboard input, or might be a server or similar device which has little or no direct user interface, but receives requests from other computer systems (clients). While a large system typically contains multiple CPUs and multiple I/O buses, the present invention is not limited to use in systems of any particular size, and it would be possible to construct a system having only a single CPU and/or a single I/O bus. Furthermore, the present invention is not limited to use in general-purpose computer systems, but could be used in any digital data system having multiple integrated circuit chips which communicate with one another, whether called a computer system or not. By way of example and not limitation, such digital data systems could include control systems for machinery, entertainment systems, security and monitoring systems, medical systems, network routing mechanisms, telephonic and cell communications devices, personal digital devices, and so forth.

While FIG. 2 represents a system in which each card contains some processors and some memory, as might be typical of a non-uniform memory access (NUMA) or nodal computer system, all memory might alternatively be placed on one or more dedicated cards to which processors have uniform access. FIG. 2 further represents memory chips in a daisy-chain configuration of links from a controller, but numerous alternative chip configurations are possible. It will also be understood that other communications links which are not point-to-point links may be present; for example, I/O buses (not show in FIG. 2) often operate at slower speeds and may be embodied as multi-drop buses.

While various system components have been described and shown at a high level, it should be understood that a typical computer system contains many other components not shown, which are not essential to an understanding of the present invention.

Communications Circuit Description

Figure 3:
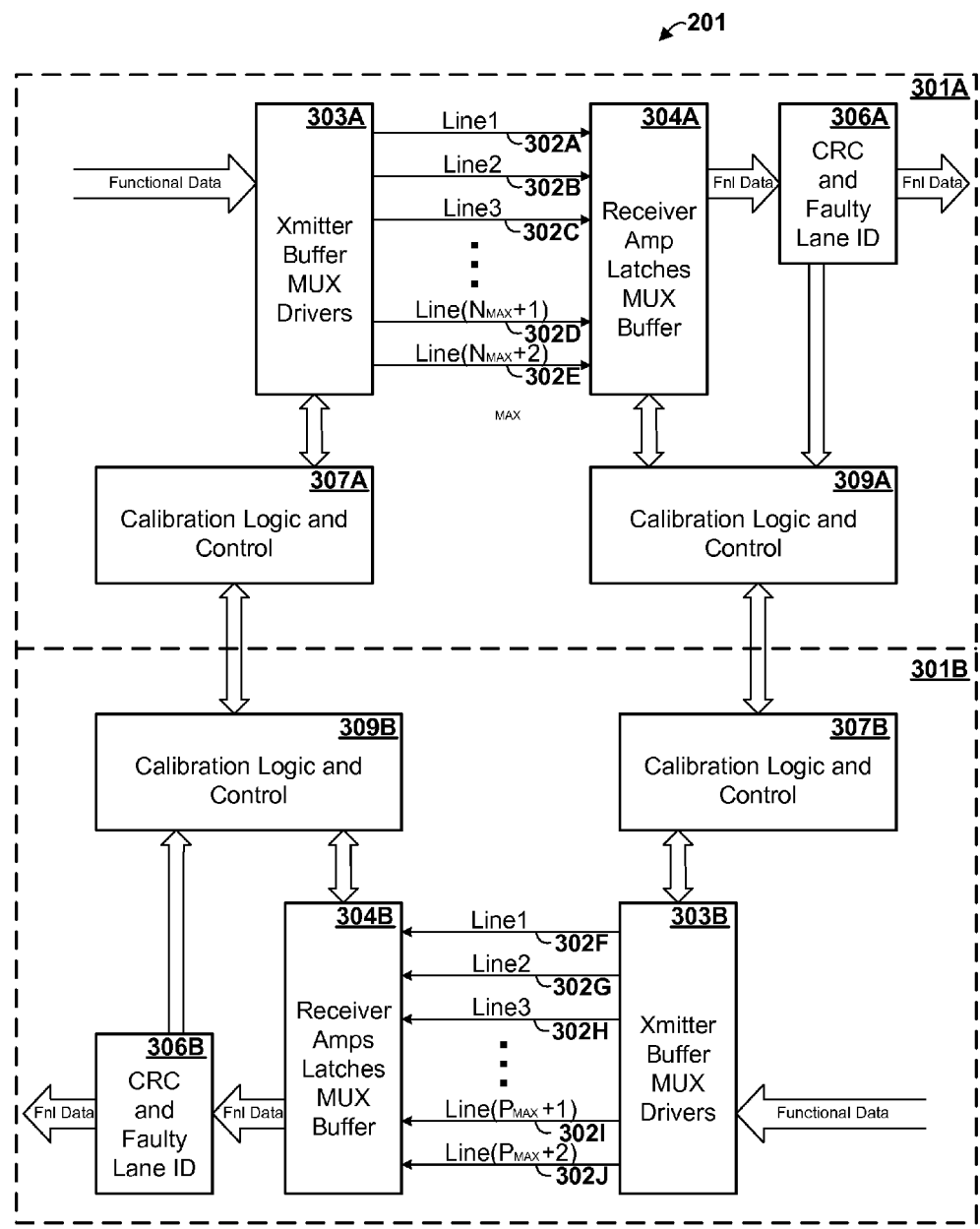
FIG. 3 is a high-level diagram showing the basic structure of a single point-to-point bidirectional link of parallel lines, according to one or more preferred embodiments

FIG. 3 is a high-level diagram showing the basic structure of a single point-to-point bidirectional link of parallel lines 201, including associated circuitry, according to one or more preferred embodiments. In this embodiment, each individual line is unidirectional, and a bidirectional link therefore comprises two unidirectional halves 301A, 301B (herein generically referred to as feature 301) transmitting data in opposite directions.

Each unidirectional half 301 of parallel link 201 contains a respective set of parallel lines 302A-J (herein generically referred to as feature 302), which are coupled to respective transmitter interface circuitry 303A, 303B (herein generically referred to as feature 303) on the transmitting side and respective receiver interface circuitry 304A, 304B (herein generically referred to as feature 304) on the receiver side. Each unidirectional half 301 may contain the same number of lines 302 having the same parameters, or the number of lines and/or other parameters may be different. Furthermore, while it is preferred that separate sets of unidirectional lines be used, it would be alternatively possible to employ a single set of bidirectional lines, having both receiver and transmitter circuitry on each end. As a further alternative, some lines could be unidirectional while others (e.g., spare lines) could be coupled to receiver and transmitter circuitry at each end, enabling them to be used for transmitting data in either direction.

Transmitter interface circuitry preferably contains a buffer for holding data to be transmitted, selector switches (MUX) for enabling particular physical lines 302, and drivers for transmitting data signals on lines 302, as explained in greater detail below with respect to FIG. 4. Receiver interface circuitry preferably contains amplifiers for amplifying incoming data signals on lines 302, latches for capturing signals, selector switches (MUX) for selecting particular physical lines 302, and a buffer, as explained in greater detail below with respect to FIG. 4.

Preferably, each unidirectional half 301 of parallel link 201 further contains a respective cyclic redundancy check (CRC) and faulty lane identification circuit 306A, 306B (herein generically referred to as feature 306, transmitter side calibration logic and control 307A, 307B (herein generically referred to as feature 307), and receiver side calibration logic and control (herein generically referred to as feature 309). In operation, functional data passes through transmitter interface circuitry 303, across parallel lines 302, through receiver interface circuitry 304, and through CRC and faulty lane ID circuit 306. CRC and faulty lane ID circuit 306 performs cyclic redundancy checking of the functional data, and if an error is detected, identifies the logical lane in which the error occurred. Calibration logic and control circuits 307 and 309 generally control the operation of the parallel link, including in particular the performance of periodic re-calibration of the interface circuitry and, in appropriate circumstances, repair of faulty lines, as explained in greater detail herein.

Figure 4:
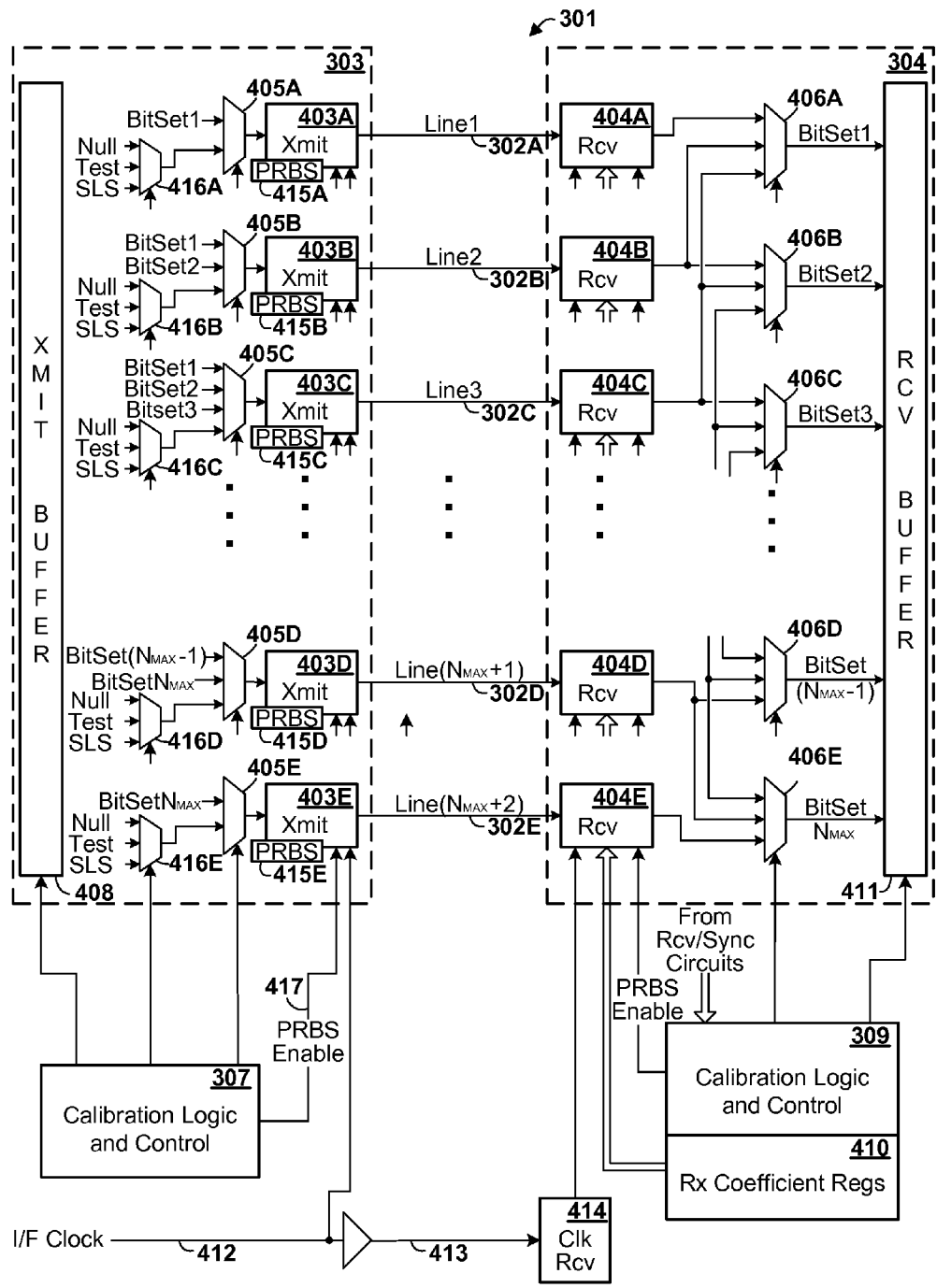
FIG. 4 is a diagram showing in greater detail the basic structure of a unidirectional half of a single point-to-point link of parallel lines, according to one or more preferred embodiments.

FIG. 4 is a diagram showing in greater detail the basic structure of a unidirectional half 301 of a single point-to-point link of parallel lines 201, according to one or more preferred embodiments. Referring to FIG. 4, a unidirectional half 301 of a parallel link contains $N_{MAX}$ parallel lines 302 corresponding to an $N_{MAX}$-line wide data transmission capability, and M additional (redundant) parallel lines 302. In one or more preferred embodiments, the link contains two redundant parallel lines (M=2), so that the total number of parallel lines is $N_{MAX}$+2. It is expected that M will be less than $N_{MAX}$ and generally small; M might be only 1. At any given instant in time, at most $N_{MAX}$ (and possibly fewer) of parallel lines 302 are used for transmitting functional data. The M redundant line or lines are used for dynamic calibration and/or as spares, as explained further herein. Since at most $N_{MAX}$ of the lines transmit functional data at a time, it can be said that the link contains $N_{MAX}$ logical lines, also referred to as $N_{MAX}$ logical lanes or $N_{MAX}$ lanes. Although unidirectional link half 301 preferably contains at least one redundant line (M≥1), this is not required by at least some aspects or variations of the present invention, and in an alternative embodiment the link contains no redundant lines (M=0).

Unidirectional link half 301 further contains a respective transmitter drive circuit 403A-E (herein generically referred to as feature 403) in the transmitting chip corresponding to each parallel line 302; a respective receiver synchronization circuit 404A-E (herein generically referred to as feature 404) in the receiving chip corresponding to each parallel line 302; a respective transmitter selector switch 405A-E (herein generically referred to as feature 405) in the transmitting chip corresponding to each parallel line 302; a respective secondary input selector switch 416A-E (herein generically referred to as feature 416) in the transmitting chip corresponding to each parallel line 302; and a bank of $N_{MAX}$ receiver selector switches 406A-E (herein generically referred to as feature 406) in the receiving chip, the number of switches 406 corresponding to the maximum number of logical lanes in the link.

On the transmitting chip, data for transmission across the link is placed in a transmit buffer 408. The buffer outputs N sets of bits in parallel, each set containing $P_{TX}$ bits, so that the buffer outputs a total of $N*P_{TX}$ bits in parallel. N represents the number of lines currently being used to transmit functional data (also known as the "logical bus width"), and is limited by $N_{MAX}$. Each set of $P_{TX}$ bits is intended for transmission by a single line 302 of the N lines currently being used to transmit functional data. A set may contain only a single bit ($P_{TX}=1$), or may contain multiple bits. The use of multiple bits enables the transmit buffer (and by extension, the logic within the transmitting chip which supplies the transmit buffer) to operate at a lower frequency than the lines 302 of the link. In one or more preferred embodiments, $P_{TX}=8$, it being understood that this number may vary.

In one or more preferred embodiments, the number of lines N currently being used to transmit functional data is variable (limited by $N_{MAX}$), allowing lines to be temporarily disabled and selective portions of the corresponding interface circuitry (e.g., in corresponding transmitter drive circuits 403 and receiver synchronization circuits 404) to be temporarily powered off in order to conserve power. Transmit buffer 408 accordingly responds to control signals from calibration and control logic 307 to regulate the width of its buffer output to correspond to the desired number of lines N, and receive buffer 411 responds to control signals from calibration logic and control circuit 309 to receive input from a corresponding number of switches 406, as described in greater detail herein. However, in one or more alternative embodiments, N is not variable and is equal to $N_{MAX}$.

The output of the transmit buffer 408 is fed to transmitter selector switches 405. Each transmitter selector switch 405 corresponds to a single respective transmitter drive circuit 403 and line 302, there being $N_{MAX}+2$ transmitter selector switches in the embodiment illustrated. Each transmitter selector switch 405 is also paired with a respective secondary input selector switch 416 which provides one of the inputs to the corresponding transmitter selector switch. Each transmitter selector switch receives multiple sets of $P_{TX}$ bits each as input and selects a single one of these sets as output to the corresponding transmitter drive circuit 403, according to a control signal received from calibration logic and control 307. The number of sets input to each selector depends on the position of the selector switch and the number of redundant lines in link half 301, and is a maximum of M+2. Thus, in one or more preferred embodiments in which M=2, the transmitter selector switches 405 for Line 1 and for Line ($N_{MAX}+2$) each have two input sets, consisting of bitset 1 and an input from the corresponding secondary input selector switch 416A (in the case of Line 1), or bitset $N_{MAX}$ and an input from the corresponding secondary input selector switch 416E (in the case of Line ($N_{MAX}+2$)); the selector switches for Line 2 and for Line ($N_{MAX}+1$) each have three input sets, consisting of bitset 1, bitset 2, and an input from the corresponding secondary input selector switch 416B (in the case of Line 2), or bitset ($N_{MAX}-1$), bitset $N_{MAX}$, and an input from the corresponding secondary input selector switch 416D (in the case of Line ($N_{MAX}+1$); and the selector switches for all other lines each have a four set input, where the switch for the ith line (where $3<=i<=N_{MAX}$) receives as input bitset (i-2), bitset (i-1), bitset(i), and a fourth input from the corresponding secondary input selector switch 416A.

Switches 405 make it possible to select any arbitrary N lines of the first N+2 lines for transmitting data in transmit buffer 408 across the link. Or put another way, any arbitrary two of the first N+2 lines can be disabled or used for test or calibration purposes (by selecting the corresponding secondary input selector switch input) while the remaining N lines of the first N+2 lines are sufficient to provide an N-lane wide bus for transmitting functional data in transmit buffer 408. Each secondary input selector switch 416 selects from among a null input, a test pattern, or a control signal known as an SLS command, which are explained in further detail herein. The test pattern and SLS commands are generated by calibration logic and control circuit 307, which also controls selection of a signal by secondary input selector switch 416.

In one or more preferred embodiments, each line 302 is selected, one at a time, for calibration, leaving at least N lines available at all times for transmitting functional data. If no line has been permanently disabled due to a line fault, then N+1 lines are needed to provide N lines for functional data and one line for calibration. Accordingly, all lines in excess of the first N+1 are disabled from carrying functional data, although they are still continuously calibrated. These lines (in excess of the N+1 lines which are used for transmitting functional data and for calibration) are partially powered off in the intervals between calibrating each respective line, i.e. selective components of transmitter drive circuitry 403 and receiver synchronization circuitry 404 associated with the corresponding line are powered off between calibration intervals, as explained in greater detail herein. In the description herein of certain operations performed by all lines, it will be understood that these operations are not performed on lines while partially powered off.

The capability to select any arbitrary N of the first N+2 lines exists to provide a true spare line, in the event that any line or the transmit or receive circuitry associated with it fails, as for example, by being unable to transmit and receive reliable data even after calibration. It will be understood that additional spares could be provided, i.e., M could be greater than 2, in which case a correspondingly greater number of inputs could be provided to switches 405 and 406.

Each transmitter drive circuit 403 contains a corresponding pseudo-random bit sequence (PRBS) generator 415A-E (herein generically referred to as feature 415). Each PRBS generator produces a corresponding PRBS23 signal for use by its transmitter drive circuit. The PRBS23 signal is a pseudo-random bit sequence of $(223)-1$ bits, or 8,388,607 bits, it being understood that other bit sequences could alternatively be used. This signal is ANDed in each transmitter drive circuit with a respective PRBS enable signal 417 from calibration logic and control circuit 307, and the result is exclusive-ORed with the output of the respective switch 405. Each PRBS generator 415** generates the same pseudo-random bit sequence, but the PRBS sequences generated by different generators in different transmitter drive circuits 403 are out of phase with respect to one another. Disabling the PRBS23 by driving a logic '0' on the PRBS enable signal 417 to the corresponding AND gate causes the output of switch 405 to be transmitted unaltered; enabling the PRBS23 by driving logic '1' to the AND gate causes the output of switch 405 to be "scrambled" with the PRBS23 bit pattern (which is then descrambled in the receiver circuit 404). When a null input is provided through a switch 405, a pure PRBS23 signal is transmitted across the corresponding line for use in calibrating the receiver synchronization circuit on the other end. The transmitter drive circuit of the one or more preferred embodiments can thus be used either to scramble functional data being transmitted across the link by enabling PRBS23, or to transmit functional data unaltered by disabling PRBS23. Furthermore, each line can be selectively scrambled or not independently, so that functional data could be transmitted unscrambled while calibration data or commands are scrambled, or vice versa.

In the receiving chip, each receiver synchronization circuit 404 receives data signals transmitted across its corresponding line 302 from the corresponding transmitter drive circuit 403, and outputs a set of $P_{RX}$ bits in parallel. In one or more preferred embodiments, $P_{RX}=P_{TX}=8$. However $P_{RX}$ could be 1 or some other number; furthermore, $P_{RX}$ need not be the same as $P_{TX}$. Each receiver synchronization circuit generates a PRBS23 signal at a phase corresponding to the signal generated by the PRBS generator 415 in the corresponding transmitter drive circuit 403, which is selectively enabled or disabled, and exclusive-ORed with the received data, in a manner similar to the transmitter drive circuits, to selectively descramble the received data or output it unaltered.

Each receiver selector switch 406 receives as input the output sets of M+1 receiver synchronization circuits; in one or more preferred embodiments wherein M=2, each receiver selector switch receives the output sets of 3 receiver synchronization circuits. I.e., the ith receiver selector switch receives the outputs of receiver circuits corresponding to Line i, Line (i+1) and Line (i+2). Each receiver selector switch 406 selects one of these inputs for output to receiver buffer 411, according to a control signal received from receiver calibration logic and control 309. Receiver buffer stores the output of the selector switches 406 until the data is retrieved for use by internal logic within the receiving chip.

Collectively, receiver selector switches 406 perform a function complementary to that of transmitter selector switches 405. I.e., receiver selector switches are capable of selecting the outputs of any arbitrary N of the first N+2 receiver synchronization circuits 404 for storing in receiver buffer 411. Or put another way, receiver selector switches 406 can prevent the output of any arbitrary two receiver synchronization circuits of the first N+2 lines from entering buffer 411. Thus, when a line is being calibrated, its output is not selected by receiver selector switches for storing in receiver buffer 411. In this manner, it is possible to select one line at a time for calibration, preventing its output from reaching receiver buffer 411, while N of the remaining lines are used to transmit functional data, the line being selected for calibration being rotated until all lines are calibrated. Switching and rotation of lines for calibration or other purposes is accomplished in a straightforward manner, without complex timing issues, because all controls and inputs to the switches are synchronized and operating in the same clock domain. This embodiment of a receiver circuit also produces a low power and efficient design.

Receiver calibration logic and control circuit 309 controls the calibration of receiver synchronization circuits 404 at power-on time, and the dynamic calibration of these circuits during operation, i.e. while the link is transmitting functional data. Circuit 309 controls a bank of $N_{MAX}+2$ receiver coefficient registers 410, each receiver coefficient register corresponding to a respective receiver synchronization circuit 404 and holding individually calibrated coefficients for the corresponding receiver synchronization circuit. In order to support calibration, receiver calibration and logic control circuit 309 receives the $P_{RX}$-bit output of each receiver synchronization circuit 404, and adjusts the coefficients in the corresponding register 410 to produce an optimum stable output, as described in further detail herein.

Calibration logic and control circuit 309 additionally records error data received from CRC and Faulty Lane ID logic 306 and determines whether a particular line 302 exhibits fault characteristics indicating that the line should be replaced, i.e. by disabling the line and enabling a spare line, such as Line($N_{MAX}+2$), in its place. In one or more embodiments, errors are detected and repair actions taken using circuitry and methods of operation described in U.S. Pat. No. 8,767,531 to Ferraiolo et al. and/or U.S. Pat. No. 8,566,682 to Gower et al., and or U.S. Pat. No. 8,862,944 to Dodson et al., each of which is herein incorporated by reference. However, it will be understood that other or additional techniques for detection and correction of fault conditions could be used, and further that in one or more embodiments there would be no spare lines and/or no capability to perform repair actions.

An interface clock 412 provides clock signals to transmitter drive circuits 403A and receiver synchronization circuits 404A. In one or more preferred embodiments, the interface clock is generated in the transmitting chip. The interface clock is driven locally to each of transmitter drive circuits 403A, which may require one or more local clock signal drivers (not shown) to achieve the necessary fan-out, and driven across the chip boundaries to the receiving chip on clock line 413 to clock receiver 414 in the receiving module. Clock line 413 runs physically parallel to parallel data lines 302. Clock receiver 414 is preferably a phase-locked loop with as many drivers as are necessary to distribute the clock signal to the $N_{MAX}+2$ receiver synchronization circuits 404. In one or more preferred embodiments, clock receiver actually generates four clock signals for distribution, each of the same frequency and 90 degrees out of phase with one another. Although as shown in FIG. 4, the interface clock is generated in the transmitting chip, it could alternatively be generated in the receiving chip, or could be generated in some module external to both the transmitting chip and the receiving chip.

Interface clock 412 provides a reference clock frequency for operation of the transmitter drive circuits 403 and ensures that all data signals on lines 302 correspond to this reference frequency. Similarly, selective circuitry in receiver synchronization circuits 404 which samples the incoming data signals operates according to this reference clock frequency. In one or more preferred embodiments, data is transmitted on each line at the rate of two bits per cycle of the reference clock frequency, it being understood that this data rate with respect to the clock frequency could vary.

Although there is a common reference clock frequency for both the transmitter drive circuits and the receiver synchronization circuits, it is not true that sampling is performed in the receiver on a common clock signal. Due to variations in physical length of data lines 302, stray capacitance, and other factors, the data signal arriving in each receiver synchronization circuit arrives at a respective phase shift from the reference clock. These phase shifts are independent of one another in the sense that the hardware does not synchronize them to a common phase, and all of the phase shifts may be different.

Therefore, the incoming signal on each line 302 is synchronized to a respective independent clock domain, having a frequency synchronized to the interface clock 412 and having a respective independent phase shift from the interface clock 412. A respective independent phase rotator associated with each receiver synchronization circuit provides a respective phase shifted clock signal to the synchronization circuit for use by at least some of the circuit elements therein, particularly for use by the sampling latches. This allows the receiver synchronization circuits to properly sample incoming data on different lines at different phase shifts.

The output of receiver synchronization circuits 404 is provided to switches 406 and clocked into a common receiver buffer 411. This output is synchronized to a common clock domain, i.e. all of circuits 404 provide output synchronized to the same clock. Data is clocked into receiver buffer 411 in this common clock domain, and calibration logic and control circuitry 309 operates in this common clock domain. In one or more preferred embodiments, this common clock domain is a clock domain used for internal logic in the receiving chip, so that all downstream logic uses this same clock without further clock domain conversion. This clock domain of the receiving chip's internal logic is herein referred to as the receiver host clock domain for clarity of description. However, it should be understood that a common clock domain for output of the synchronization circuits need not be the same as the clock domain for internal logic in the receiving chip; it could alternatively be a clock domain derived from interface clock signal 412, or some other clock domain. This common clock domain need not be the same frequency as the interface clock.

Figure 5:
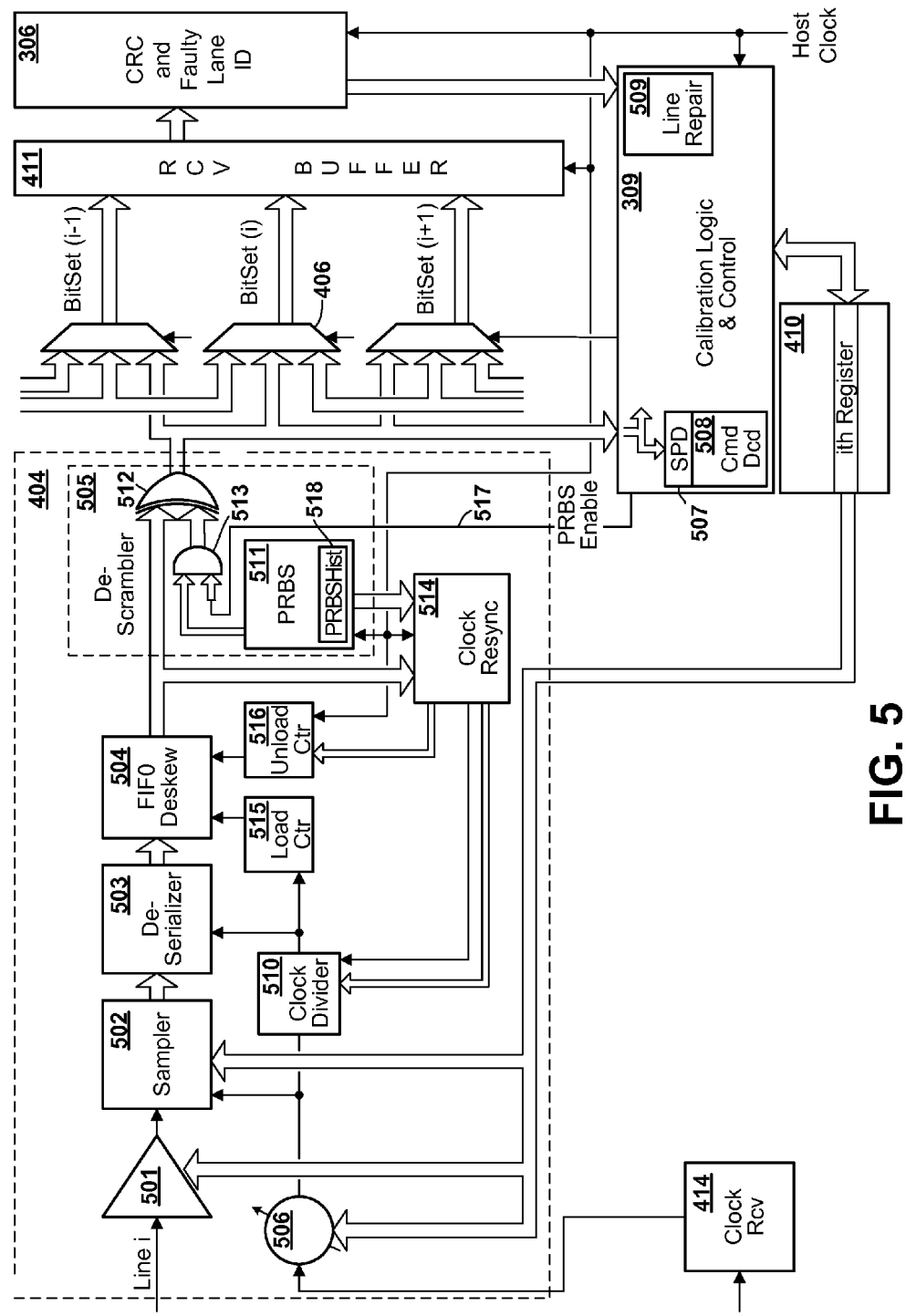
FIG. 5 is a diagram showing in greater detail a representative receiver synchronization circuit of a point-to-point link of parallel lines and associated calibration circuitry, according to one or more preferred embodiments.

FIG. 5 is a diagram showing in greater detail a representative receiver synchronization circuit 404 and its association with certain other elements of a unidirectional half 301 of a point-to-point link of parallel lines, according to one or more preferred embodiments. The circuit depicted is for a representative ith line of the ($N_{MAX}$+2) lines 302. An identical receiver synchronization circuit 404 exists for each of the $N_{MAX}$+2 lines, there being $N_{MAX}$+2 receiver synchronization circuits.

Referring to FIG. 5, receiver synchronization circuit 404 according to one or more preferred embodiments comprises receiver amplifier 501, sampler 502, deserializer 503, FIFO deskew buffer 504, descrambler 505, phase rotator 506, clock divider 510, and clock resync logic circuit 514. Additionally, a load counter 515 and unload counter 516 are associated with the FIFO deskew buffer 504 and used to align data traversing the buffer.

Receiver amplifier 501 is an analog circuit which amplifies and/or provides a voltage offset to an incoming data signal on line i. The amplified/offset signal produced by the receiver amplifier is input to sampler 502. Sampler 502 contains one or more (i.e., preferably 4) sampling latches which sample the input at respective phases of a clock domain local to synchronization circuit 404, produced by phase rotator 506. Sampler provides one output line corresponding to each sampling latch. Deserializer 503 selects outputs of the sampler at appropriate times, and stores them in a latch bank on a common clock signal generated by clock divider 510 (herein referred to as the deserializer clock, or R8 clock). Deserializer produces $P_{RX}$ bits (preferably 8) in parallel as output from the latch bank on this deserializer clock signal. The deserializer clock frequency is (number of bits output by sampler)/(number of bits output by deserializer, or $P_{RX}$). In one or more preferred embodiments in which 2 bits are transmitted on the line in each cycle of the bus clock 413 and output by sampler 502, and $P_{RX}$=8, the deserializer clock frequency is 2/8, or ¼, that of the bus clock signal.

FIFO deskew buffer 504 contains multiple latch banks which add an adjustable delay to the $P_{RX}$-bit output of deserializer 503. FIFO deskew buffer preferably outputs $P_{RX}$ bits (i.e, 8 bits) in parallel after the adjustable delay, the data being the same as the data output of deserializer 503. The latch banks in the FIFO deskew buffer clock data in on the deserializer clock signal. The delay of the FIFO deskew buffer 504 is adjusted in increments of $P_{RX}$ bit times to compensate for variations in data skew among the different lines 302 of unidirectional half 301 of the link, so that the output of FIFO deskew buffer is synchronized to the output of the FIFO deskew buffers corresponding to the other lines. Unlike the deserializer, the outputs of the FIFO deskew buffers 504 in unidirectional half 301 of the link are synchronized to the receiver host clock domain.

The $P_{RX}$-bit output of FIFO deskew buffer 504 is provided to descrambler 505. Descrambler 505 descrambles scrambled data to restore it to its original form. I.e., in one or more preferred embodiments, a pseudo-random bit pattern is mixed with the data transmitted across the interface by transmitting circuit 403. Mixing data with a pseudo-random bit pattern can have several advantages: it "whitens" or spreads out the spectral content of the data stream, eliminating any repetitive patterns which might otherwise degrade receiver performance; it prevents a long string of zeroes or ones in the original data from being transmitted across the line as all zeroes or all ones; and it can reduce electro-magnetic interference. Since the scrambled data is not an encoding which expands the number of bits in the data stream, it does not guarantee a logical transition with any minimum frequency; it simply makes a long string of zeroes or ones very unlikely. Descrambler 505 uses a reverse transformation of the scrambled data to restore it to its original form. Each descrambler contains a respective PRBS generator 511, Exclusive-OR circuit 512, and AND circuit 513. The PRBS generator 511 generates a PRBS23 bit pattern corresponding to that generated in the transmitting circuit. The PRBS23 bit pattern generated by PRBS generator 511 is logically ANDed with a PRBS enable signal 517 from calibration logic and control circuit 309 by AND circuit 513, and the result is exclusive-OR with the data by exclusive-OR circuit 512. The PRBS enable signal is used to selectively turn descrambling on or off in each receiver synchronization circuit, depending on whether the data being transmitted across the corresponding line is currently being scrambled or not. Each descrambler therefore outputs P bits in parallel, synchronized to the receiver host clock domain.

Among the advantages of the transmitter drive circuit and receiver synchronization circuit of the one or more preferred embodiments is that scrambling and descrambling of data, and in particular functional data, can be selectively turned on or off. Calibration can be performed in a particular line using a PRBS23 or other suitable test pattern which guarantees any required characteristics, while functional data can independently be transmitted either scrambled or unscrambled. Certain advantages of scrambling functional data are explained above, but scrambling of functional data also consumes significant amounts of power. If scrambling of functional data is not necessary to achieving the requisite performance of the interface, then power can be conserved by shutting off scrambling. Circuit designers may not know in advance whether scrambling of data will be necessary in each and every application of an integrated circuit chip design, so providing the capability to selectively scramble data where necessary for performance, or not scramble functional data to reduce power consumption where not necessary for performance, provides the designers with added flexibility. The decision whether or not to scramble functional data can even be made dynamically within a given digital data system by monitoring the amount of drift in the various calibrated coefficients between calibration intervals. For example, where there is very little change in calibrated coefficients, it may be assumed that scrambling may be unnecessary; where large changes in coefficient values are observed, scrambling may be needed to hold drift to manageable levels. In one or more embodiments, such monitoring can also be used to vary the calibration interval, as described herein.

The $P_{RX}$-bit parallel output of each descrambler 505 is provided to one or more respective switches 406 and to receiver calibration logic and control circuit 309. Each switch receives the output of (M+1) descrambler circuits (where M is the number of redundant lines); in one or more preferred embodiments, each switch receives the output of three descrambler circuits. In this embodiment, each descrambler except the first two and the last two provide their output to three respective switches; the first and last provide output to only one switch each, while the second and next to last provide output to two switches each. Each switch 406 selects a single one of these outputs for input to receiver buffer 411. Receiver buffer 411 clocks in the output of the switches 406 synchronously with the receiver host clock domain. CRC and Faulty Lane ID logic 306, which also operates in the receiver host clock domain, receives the output of receiver buffer 411, verifies the data, and if an error is discovered, identifies the faulty logical lane in which the error occurred to calibration logic and control circuit 309.

Phase rotator 506 receives a redriven interface clock signal from clock receiver 414, this redriven interface clock signal being the same input for all phase rotators. Preferably, clock receiver generates four clock signals of identical frequency to the signal it receives over the clock line, and at successive 90 degree phase offsets from one another. Phase rotator provides an adjustable phase shift of this redriven interface clock signal to produce a pair of phase shifted signals (herein designated R2+ and R2−), 180 degrees out of phase from each other and at the same frequency as the original interface clock signal, for use by certain elements of receiver synchronization circuit 404. In particular, the pair of phase shifted signals is used to clock the sampling latches of sampler 502 and deserializer 503. The clock divider 510 further divides the frequency of the phase shifted signal to produce one or more pairs of divided signals for use by deserializer 503 and FIFO deskew buffer 504. Since the amount of phase shift is individually adjustable in each of the phase rotators, the output clock signal is an independent clock domain, which is particular to the corresponding receiver synchronization circuit which uses it. Each synchronization circuit contains its own phase rotator 506, rotating the input interface clock signal an independently adjustable amount, to produce a corresponding independent clock domain to optimally sample the arbitrary phase of the incoming data signal, the phase being arbitrary due the effects of data skew.

In accordance with one or more preferred embodiments, certain elements of receiver circuit 404, and in particular phase rotator 506 (and, by extension, clock divider 510), are temporarily powered down at times to reduce power consumption of the interface. Powering down the phase rotator and clock divider places the clock divider 510, load counter 515 and FIFO Deskew circuitry 504 in an indeterminate state. When the receiver circuit is again powered on to receive data, it is necessary to re-synchronize these various elements. Clock resync logic 514 uses the PRBS23 signal generated by PRBS generator 511 to resynchronize the receiver by matching segments of the internally generated PRBS23 signal with a PRBS23 signal transmitted by the transmitter circuit. During temporary power down of certain receiver circuit components, PRBS generator 511 remains powered on and receives a clock signal from the host clock domain, thus being unaffected by loss of the clock signals derived from the phase rotator. The operation of clock resynchronization logic circuit 514 is described in greater detail herein.

Calibration logic and control circuit 309 receives the $P_{RX}$-bit descrambler output (i.e, in the host clock domain), which is used to perform calibration of receiver synchronization circuit 404 and coordination of switching and other calibration actions, as described further herein. In one or more preferred embodiments, control information for coordinating calibration actions is carried in "SLS commands" on a line selected for calibration along with test pattern data. Calibration logic and control circuit includes static pattern detector 507 for detecting an SLS command received, as well as SLS command decoder 508 for decoding the command and taking appropriate action.

During calibration, calibration logic and control circuit 309 determines calibration coefficients for receiver synchronization circuit and stores them in a corresponding receiver coefficient register of a bank of receiver coefficient registers 410, there being one such register for each receiver synchronization circuit 404. Calibration logic and control circuit also aligns the outputs of the multiple FIFO deskew buffers 504 with respect to one another. Both calibration logic and control circuit 309, and receiver coefficient registers 410 are in the receiver host clock domain. The calibration coefficients in receiver coefficient register include an amount of phase rotation to be performed by phase rotator 506, gain and offset coefficients for receiver amplifier 501, and individual sampling latch offsets of sampler 502.

In one or more embodiments, calibration logic and control circuit 309 further contains line repair logic 509 which receives output from CRC and Faulty Lane ID 306 and uses this and other data to determine whether repair a physical line by replacing it with a spare line. Line repair logic may determine whether to repair a line based on both observed errors in functional data (as detected by CRC and faulty land ID circuit 306) as well as anomalous line parameters observed during calibration of the line. In an exemplary embodiment in which there are two spare lines (M=2), in the event any of lines 1 through N+1 is determined to be faulty, the faulty line is deactivated and powered off, and Line(N+2) assumes the role formerly performed by Line(N+1). Thereafter the link operates in the same manner to periodically calibrate each active line in a round robin manner as described herein, ignoring the previously deactivated faulty line. Where M≥2, it is possible to replace a single faulty line without any effect on operations, but at some point it is always possible, as a result of multiple failures, to exhaust the number of spare lines. In such an unlikely circumstance, additional spare lines can be obtained by permanently reducing the logical bus width N below $N_{MAX}$. Techniques for detecting a faulty line and repairing a faulty line by replacing it with a spare line are described in further detail in U.S. Pat. No. 8,767,531 to Ferraiolo et al. and/or U.S. Pat. No. 8,566,682 to Gower et al., and or U.S. Pat. No. 8,862,944 to Dodson et al., each of which is herein incorporated by reference.

Figure 6:
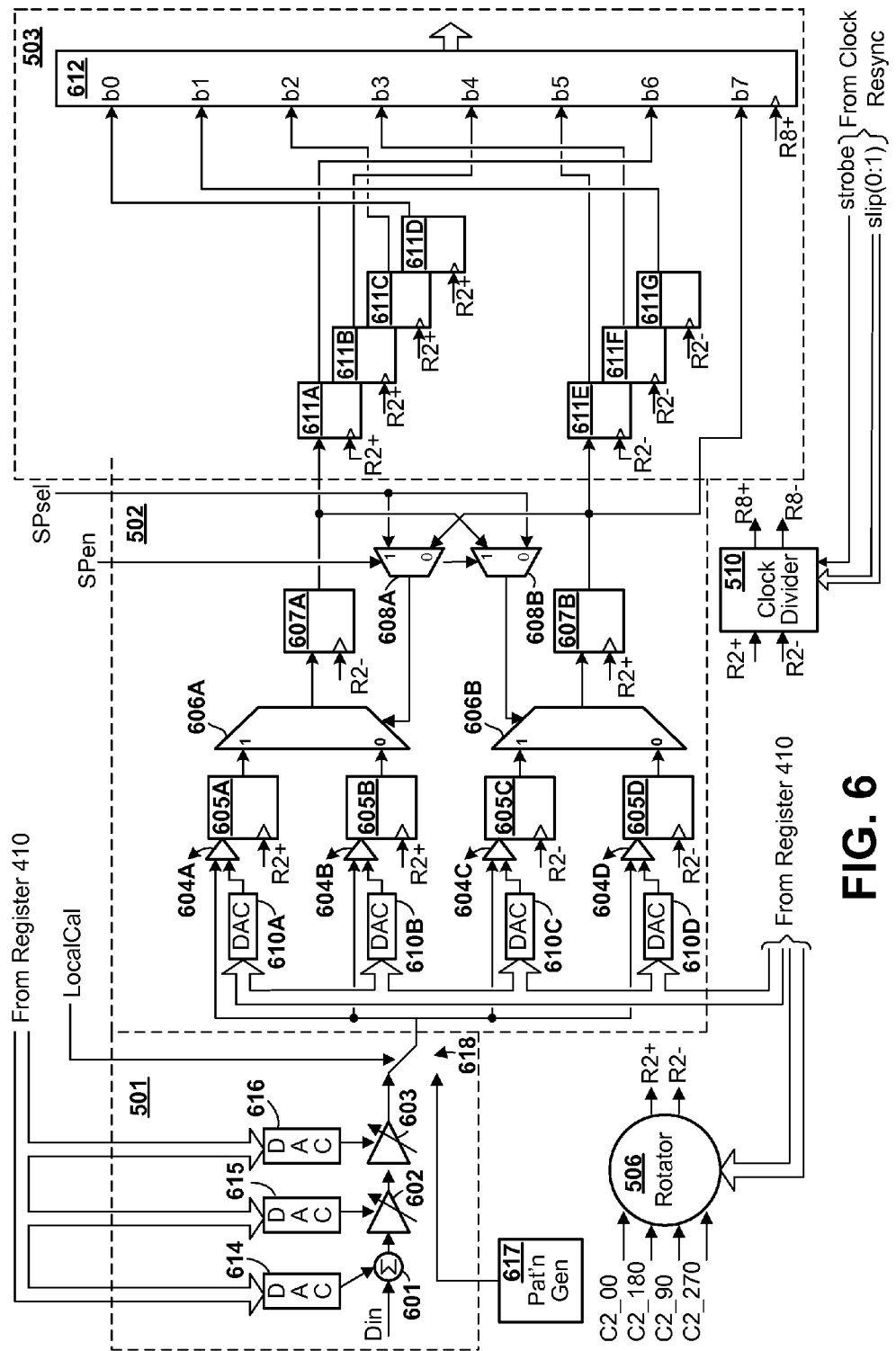
FIG. 6 is a diagram showing in greater detail certain portions of the receiver synchronization circuit shown in FIG. 5 including sampling latches, according to one or more preferred embodiments.

FIG. 6 is a diagram showing in greater detail certain portions of the receiver synchronization circuit shown in FIG. 5, according to one or more preferred embodiments. Referring to FIG. 6, incoming data passes through an offset adder 601, variable gain amplifier 602, and continuous time linear equalization filter 603, in that order, all within receiver amplifier circuit 501. Offset adder 601 adds a calibrated offset to the incoming data signal. The value of this offset is determined during calibration, stored in the corresponding receiver coefficient register 410, and provided to digital-to-analog converter (DAC) 614 to generate an analog offset signal corresponding to the value of the offset coefficient for offset adder 601. Variable gain amplifier (VGA) 602 provides a variable gain according to a calibrated gain coefficient, which is stored in receiver coefficient register and provided to DAC 615 to generate an analog gain signal for VGA 602. Continuous time linear equalization filter (CTLE) 603 is a linear amplifier providing adjustable poles and zeroes to create an emphasized high-frequency response (peaking) to compensate for lossy transmission media. A calibrated peaking amplitude is stored in receiver coefficient register 410 and provided to DAC 616 to generate a peaking amplitude signal for CTLE 603.

The resultant adjusted and amplified signal produced by the receiver amplifier circuit 501 is driven simultaneously to four comparators 604A-D (herein generically referred to as feature 604), each providing input to a respective latch 605A-D (herein generically referred to as feature 605). One pair of latches 605A,B is used for sampling even data bits, while the other pair of latches 605C,D is used for sampling odd data bits. A respective selector 606A,B (herein generically referred to as feature 606) selects the output of one latch of each pair for input to respective secondary latches 607A,B (herein generically referred to as feature 607). The outputs of the secondary latches 607 are input to deserializer 503.

A pair of sampling latches 605 is provided for each of even and odd bits so that a different latch may be used depending on the immediately preceding bit, allowing a different value to be used for sampling comparison. I.e., due to inherent impedance of the line, the voltage value following a logical transition (from '0' to '1' or vice-versa) is somewhat different from a voltage value for the same logical value, where there was no transition from the previous bit (two '1's or two '0's in succession). During normal operation, signal SPen is set to '1', allowing the value of the previously sampled bit to pass through switches 608A, 608B and control switches 606, which select a sampling latch 605. During certain calibration operations, SPen causes switches 608A,B to substitute a signal SPsel, generated by calibration logic and control circuit 309, for controlling switches 606.

In one or more embodiments in which $P_{RX}=8$, deserializer 503 includes delay latches 611A-G for capturing and delaying four even bits and three odd bits, and deserializer output register 612 for outputting an 8-bit byte in parallel. Delay latches 611A-G enable all eight data bits from latches 607A,B to be clocked into deserializer output register 612 simultaneously, so that eight bits are output from register 612 in parallel.

Receiver amplifier portion 501 further contains a secondary offset amplifier 617 tied to a null input value, and a switch 618 which can alternatively enable input from line 302 through offset amplifier 601, variable gain amplifier 602 and CTLE 603, or from a null input through secondary offset amplifier 617. During normal operation, switch 618 enables input from line 302 through elements 601, 602 and 603. The null input through secondary offset amplifier 617 is only used for certain calibration operations, as described further herein.

As described above, phase rotator generates a pair of phase shifted signals, 180 degrees out of phase from each other and at the same frequency as the original interface clock signal. In one or more preferred embodiments, two bits are transmitted on each line 302 with each cycle of the interface clock. Since the phase rotator generates signals at the same frequency, two bits are received on the line with each cycle of resultant phase shifted signal. The pair of phase shifted clock signals are therefore designated R2+ and R2−. The even latch pair 605A,B samples on the R2+ clock signal, and the odd latch pair 605C,D samples on the R2− clock signal. Secondary latches 607 reverse this orientation, so that data is clocked into the secondary latches a half cycle after being captured by latches 605.

In one or more preferred embodiments in which $P_{RX}=8$, clock divider 510 derives a pair of divided signals from the phase shifted signals R2+, R2− for use by certain elements of deserializer 503 and FIFO deskew buffer 504. This pair of divided signals, designated R8+ and R8−, are 180 degrees out of phase with respect to each other, and at one-quarter the frequency of R2+, R2−. Delay latches 611A, 611B, 611C, and 611D clock their respective signals in on the R2+ clock, while delay latches 611E, 611F, and 611G clock their respective signals in on the R2− clock. The signals propagate through the delay latches 611 at one cycle increments of the R2 clock, as shown in FIG. 6. All seven data bits from latches 611A-G are clocked into the deserializer output register 612 simultaneously on the R8+ clock, so that eight bits are output from register 612 in parallel (the eighth bit passing through directly from latch 607B). It will be understood that the number of delay latches and frequency of the deserializer clock could vary for different values of $P_{RX}$.

Figure 7:
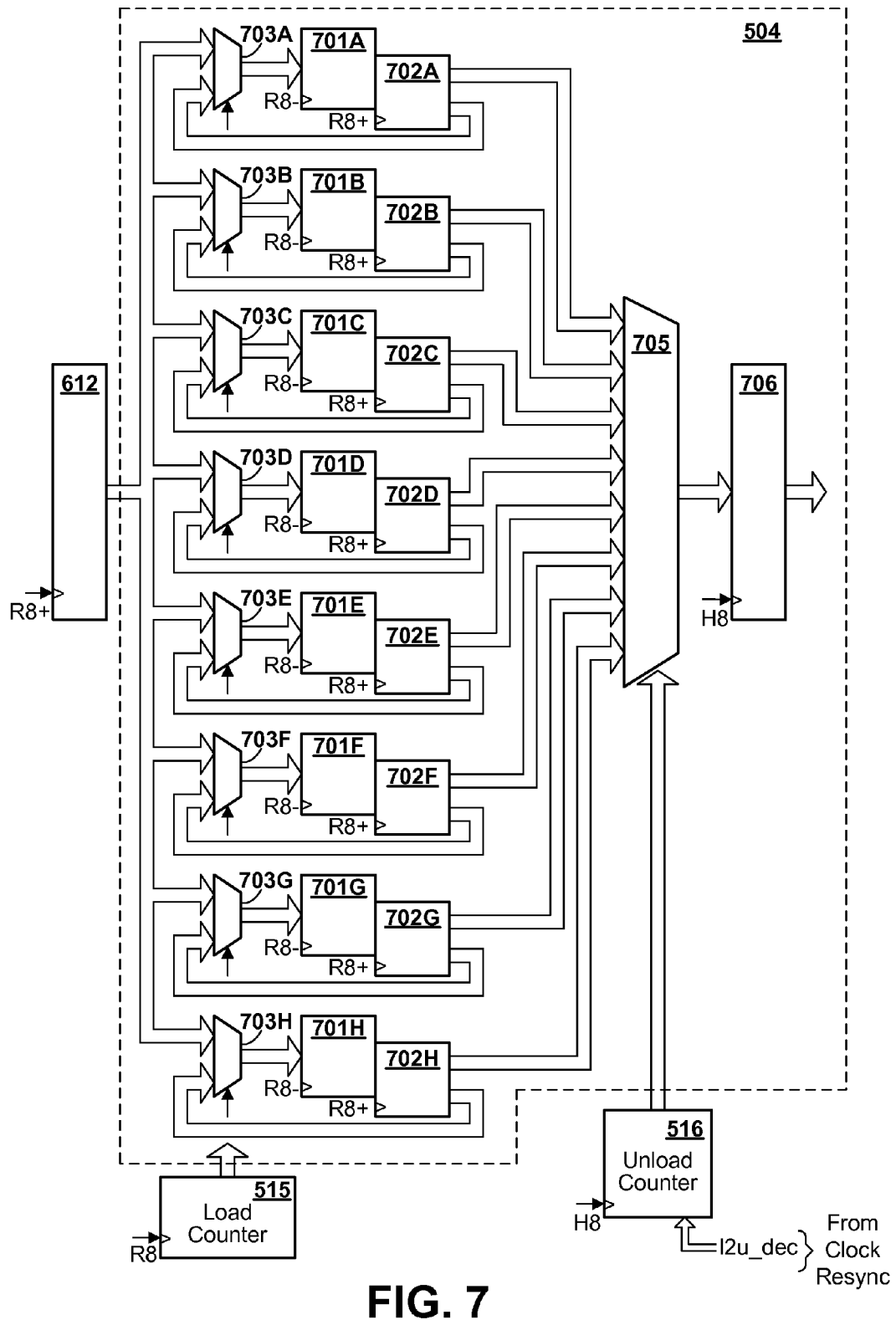
FIG. 7 is a diagram showing in greater detail certain portions of the receiver synchronization circuit shown in FIG. 5 including FIFO deskew buffer, according to one or more preferred embodiments.

FIG. 7 is a diagram showing in greater detail certain portions of the receiver synchronization circuit shown in FIG. 5 including FIFO deskew buffer 504, according to one or more preferred embodiments. FIFO deskew buffer includes multiple of delay register pairs, each containing a respective primary delay register 701A-H (herein generically referred to as feature 701) and a respective secondary delay register 702A-H (herein generically referred to as feature 702, the preferred number of delay register pairs being eight, although this number could vary. Each primary delay register 701 and each secondary delay register is a respective bank of $P_{RX}$ (preferably eight) latches, one for each bit of parallel data. As shown in FIG. 7, primary delay registers 701 use the R8− clock (one-half cycle behind deserializer register 612), while secondary delay registers use the R8+ clock (one-half cycle behind the primary registers). A respective feedback switch 703A-H (herein generically referred to as feature 703) is associated with each pair of delay registers. The feedback switch selects either the output of deserializer register 612 or the output of the corresponding secondary register 702 for input to the corresponding primary register 701. Load counter 515 provides a round-robin control signal, synchronized by the R8 clock, which selects each switch 703 in turn to receive the input from deserializer register 612. During cycles in which a switch 703 is not selected by the load counter, the switch feeds back the output of the secondary delay register to the primary register. Thus the data in each pair of delay registers is replaced every eight cycles of the R8 clock with newly arriving data.

The output of each secondary delay register 702 is connected to alignment switch 705, which selects one of these outputs for input to FIFO deskew output register 706. FIFO deskew output register is a set of $P_{RX}$ (preferably eight) latches, one for each parallel bit, which are clocked by the receiver host clock (designated H8). This clock is preferably of the same frequency as the R8 clock, but of indeterminate phase with respect to the R8.

Alignment switch 705 selects each output of a secondary delay register 702 in turn in a round-robin manner, under control of unload counter 516. Unload counter 516 is also clocked by the receiver host clock, although not necessarily on the same clock phase as FIFO deskew output register 706. Normally, unload counter 516 operates independently, without any external input except the clock signal. However, during initial power-on calibration, as well as during a re-synchronization following temporary power-down of clock rotator 506 and selective elements of the receiver circuit, the contents of unload counter 516 can be adjusted to change the currently selected primary delay register output in order to align the outputs of all the FIFO deskew output registers 706 with respect to one another.

By selectively adjusting the output selected by unload counter 516, it is possible to adjust the length of time the data waits in a primary and secondary delay register before being clocked into output register 706. Since all deskew output registers 706 use the same receiver host clock signal, all are synchronized to a common clock domain. By adjusting the delay time in the delay registers, it is possible to align all output registers 706 with respect to one another.

It will be observed that the deskewing delay includes delay through multiple successive latches, i.e. memory elements which hold a data value through at least some portion of a clock cycle. Thus, in one or more preferred embodiments, deskew delay is not limited to delay through some number of gates or analog circuit elements, and relatively large skew is easily compensated. As noted above, the data in a delay register is replaced every eight cycles of the R8 clock, amounting to a time period equivalent to that required to transmit 64 successive bits on a single line. Thus, a 64 bit-time window is established by the FIFO deskew buffers, whereby any amount of skew falling within the window is automatically accommodated by the deskew buffers. As a result, the output of the receiver synchronization circuit according to one or more preferred embodiments is effectively isolated from even large amounts of dynamic and static data skew at the input.

Figure 8:
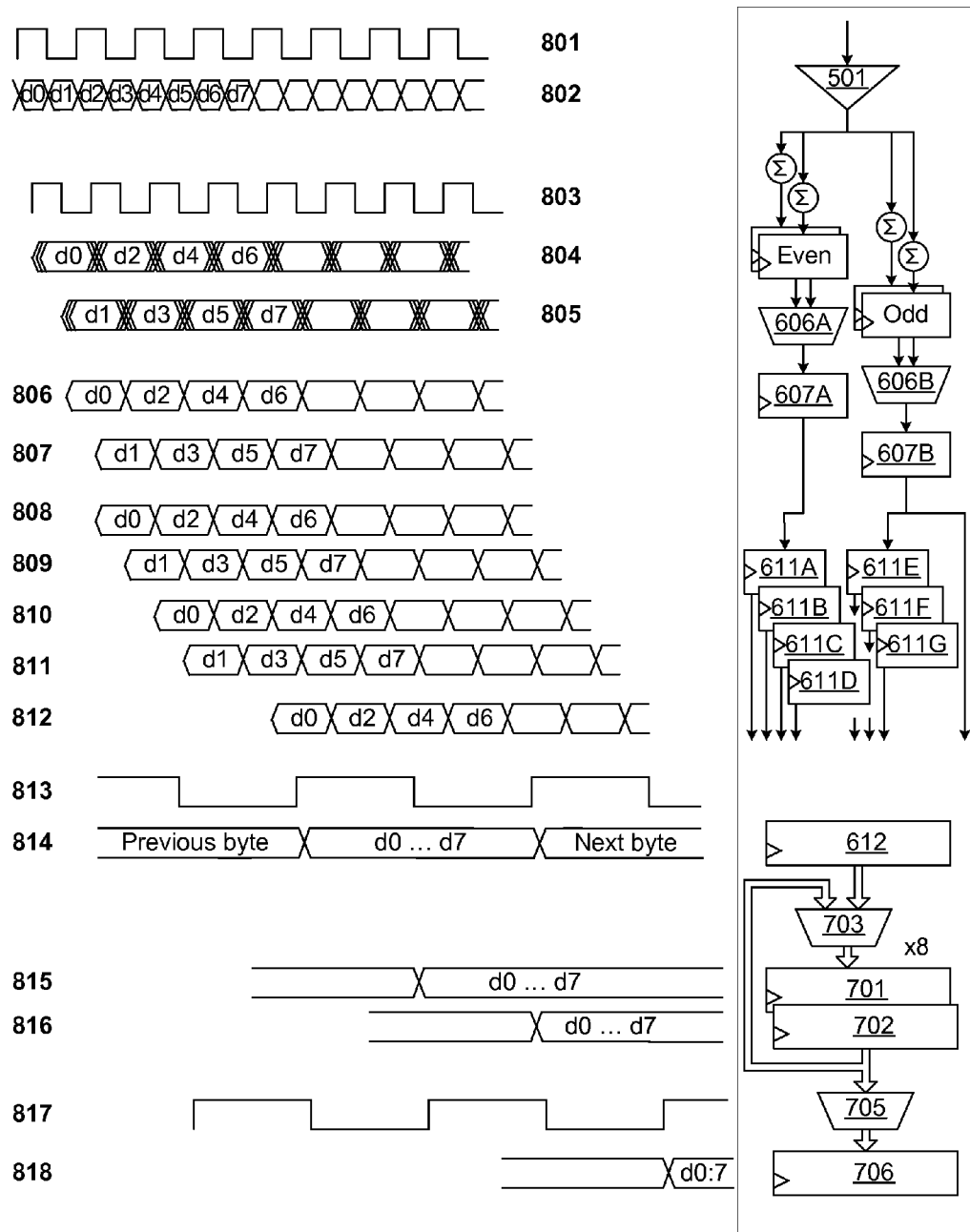
FIG. 8 is a timing diagram showing the propagation of data signals though certain portions of the receiver synchronization circuit of FIG. 4, according to one or more preferred embodiments.

FIG. 8 is a timing diagram showing the propagation of clock and data signals though certain portions of the receiver synchronization circuit of FIG. 5, according to one or more preferred embodiments. The left portion of the figure illustrates a representative relative timing of selective signals during operation. The right hand portion of the figure is a simplified representation of certain circuitry described above and illustrated in FIGS. 5, 6 and 7, which is shown as a visual aid for use in identifying the location of the corresponding clock or data signal.

Referring to FIG. 8, signal 801 represents an interface clock signal, i.e. a signal transmitted across line 413. Signal 802 represents the timing of a data signal received over line 302 and propagated through receiver amplifier 501. It will be observed that there are two serial bits of data in signal 802 for each cycle of interface clock signal 801; these bits need not have any phase synchronization with respect to the interface clock signal. Although there is a small delay associated with propagation through receiver amplifier 501, this delay is due to the inherent delay of the analog circuitry, and is unrelated to the timing of clock signals.

Signal 803 represents one of the phase shifted clock signals generated by phase rotator 506. If we assume that the latches sample on the falling edge, signal 803 is the R2− signal (but it could alternatively represent the R2+ signal if latches sample on the rising edge). Signal 804 represents the captured bits in even sampling latches 605A,B, which sample on the R2+ clock, and signal 805 represents the captured bits in odd sampling latches 605C,D, which sample on the R2− clock. The multiple rising and falling lines in the signals are used to illustrate that the two latches of a pair (e.g. latches 605A and 605B) do not receive precisely the same signal, since each uses a different offset coefficient in its corresponding comparator 604. As shown, the even bits are captured in sampling latches 605A,B on the rising edge of signal 803, and the odd bits are captured in sampling latches 605C,D on the falling edge of signal 803, i.e., the odd bits are captured 180 degrees out of phase of the R2 signal from capture of the even bits.

As explained, selectors 606 select one latch of each pair depending on the previous data bit, the selected output being clocked into secondary latches 607. Signals 806, 807 show the even and odd data, respectively, captured in secondary latches 607A and 607B, respectively. It will be observed that this data is delayed one-half cycle from that of data in sampling latches 605. I.e., even secondary latch 607A uses the R2− clock phase, while odd sampling latch uses the R2+ clock phase.

Signals 808-812 represent the contents of latches 611A, 611E, 611B, 611F, and 611D, respectively. The first bit of each byte (designated d0) is captured in latch 611A from the contents of latch 607A on the R2+ clock, and is clocked successively into latch 611B on the R2+ clock a cycle later, latch 611C on the R2+ clock another cycle later, and latch 611D on the R2+ clock another cycle later. The second bit (d1) is captured in latch 611E from latch 607B on the R2− clock, i.e., half a cycle of the R2 clock after the d0 bit is clocked into latch 611A. Bits d0, d2, d4 and d6 propagate through latches 611A-D, while bits d1, d3, d5, and d7 propagate through latches 611E-G.

On the next R8+ clock after bit d0 has propagated through to latch 611D, bits d6, d4, d2 and d0 are available from latches 611A-D, respectively, while bits d5, d3 and d1 are available from latches 611E-G, respectively. Bit d7 is directly available from latch 607B. All eight bits are then clocked into register 612 on the R8+ signal 813, the entire byte now being available as a parallel output of register 612. Signal 814 represents the contents of register 612.

The R8 clock is provided to FIFO deskew buffer 504. FIFO deskew buffer preferably contains eight primary delay registers 701 clocked on the R8− clock, each of which is selected in turn. Once clocked in, the data remains in the primary delay register 701 for eight cycles of the R8 clock, amounting to 64 bit times (the time it takes to transmit 64 serial bits across the link). Although the data remains in each of the primary delay register 701 and the secondary delay register 702 a respective fixed length of time, it can be output to the FIFO deskew output register 706 from the corresponding secondary register 702 any time during which it is in that register. Signal 815 represents the contents of the primary delay register 701, and signal 816 represents the contents of secondary delay register 702 (delayed one-half cycle of the R8 clock) from the primary delay register.

An output register 706 in the FIFO deskew buffer 504 clocks data in on the receiver host clock signal, represented as signal 817. Data in the deskew output register is represented as signal 818. In the example of FIG. 8, the data in the secondary delay register is clocked into the deskew output register in the first available host clock cycle for illustrative purposes. However, in order to align the output of FIFO deskew buffer 504 with that of other lines of the interface, bits d0 . . . d7 alternatively could have been clocked into register 706 in any of the seven host clock cycles after the one illustrated in the example. Thus, the data in the deskew output register is aligned with respect to data received on other lines as a result of the variable delay in FIFO deskew buffer 504, and is synchronized to the receiver host clock signal.

A receiver synchronization circuit 404 having certain components and specific adjustable parameters and timing characteristics has been described herein and illustrated in FIGS. 5, 6, 7 and 8 as a preferred embodiment. However, it should be understood that a receiver synchronization circuit can be any combination of circuits which receives an input signal over a line 302 (which may have an arbitrary skew within some permissible design range), and produces data synchronized to that of the other receiver synchronization circuits of the other lines. Many variations are possible in implementing a receiver synchronization circuit. Some circuit elements shown and described herein may not be present, other elements not shown may be present, some elements may be combined, and different adjustable parameters may be used. By way of illustration of certain variations and not limitation, the number of sampling latches may vary; there may or may not be different latches or latch pairs for even/odd data; there may or may not be alternate latches for the same data and a selection mechanism for selecting the output of one; the arrangement of input amplifiers and offsets may be different and use different elements, a peaking adjustment such as provided by CTLE may or may not be present, and might be combined with other elements; the number of delay registers in a FIFO deskew buffer may vary or might not be present at all; different mechanisms may be chosen for introducing delay for purposes of aligning data; the number and phase of clock cycles for performing various functions may vary; and so forth.

It will be appreciated that the set of circuits in the transmitter and receiver which may be powered down between calibration intervals to conserve power may also vary from those described herein, and in particular, may vary where the design of the receiver synchronization circuit 404 is different from that described herein. In general, the set of circuits which are powered down is chosen to achieve maximum power savings consistent with continued operation of the communications interface, continuous dynamic calibration of all of the lines, and very rapid power up and return to functional operation, should the line be required to transmit functional data.

As one particular variation, although descrambler 505 is shown in the illustrated embodiment as a form of data transformation device for ensuring transition density of the transmitted data, an alternate form of data transformation device for ensuring transition density, or no such data transformation device, may be present. An alternate form of data transformation device for ensuring transition density may be, for example, a decoder which restores encoded data to its original form from an encoding (e.g., according to an 8/10 bit encoding) which expands the number of bits is a stream of data to ensure that logical transitions occur with some minimum frequency, it being understood that in such case a complementary encoder would be present in the transmitter drive circuit 403 in place of a scrambler. The descrambler or other data transformation device for ensuring transition density is intended to spread out the spectral content of the signal and avoid long sequences of zeroes or ones being transmitted. If there is sufficient degradation of the receiver or drift in the phase of transmitted data with respect to the receiver clocks, this could cause data to become unreliable. However, if the receiver circuits are calibrated with sufficient frequency, then it may be possible to detect and correct any such tendency before data is corrupted, and in such case, and possibly others, scrambling or other transformation of data to ensure transition density would be unnecessary. Removal of the scrambler and descrambler would reduce the amount of circuitry in the interface and reduce power consumption. As another variation, a descrambler or other data transformation device need not be located as shown within receiver synchronization circuit 404, and may be alternatively located upstream of the FIFO deskew buffer or downstream of switches 406 or receiver buffer 411 (since the output of the FIFO deskew buffer is synchronized in the receiver host clock domain, although the data is not yet descrambled). Where a descrambler is located downstream of switches 406 or receiver buffer 411, it typically would not be powered off between calibration intervals.

As another particular variation, a deserializer may not be present or may be present downstream of the deskewing latches, so that individual bits are propagated through the deskewing latches instead of multiple bits in parallel.

Re-Synchronization of Receiver

In one or more preferred embodiments, selective circuit elements in the transmitter circuit 403 and the receiver circuit 404 for one or more lines 302 can be temporarily powered off to conserve power when the line's transmission capability is not needed. A line may be temporarily powered down for any of various reasons, and for varying lengths of time. For example, a spare line may be regularly powered down between calibration intervals, a relatively long period from the perspective of the machine. But due to the capability to re-synchronize the receiver very quickly, it is possible to power down a line for much shorter periods of time, and to do so for more transient reasons, e.g., there is no data waiting to be sent.

When a line 302 is temporarily powered down to conserve power, substantially all of the components of the corresponding transmitter drive circuit 403, as well as substantially all of the components of the corresponding receiver synchronization circuit 404, are powered down. In the transmitter device, switches 405 and 416 corresponding to a powered down line remain powered up, and are set to select a null input to the corresponding transmitter drive circuit 403 in order to reduce the number of switching transitions. In the receiver device, a clock tree (not shown) which supplies the four phase rotated clock input signals to phase rotator 506 remains powered up, as does the corresponding receiver coefficient register 410 which contains calibration coefficients of the powered down line, as do switches 406 and component circuitry downstream of switches 406. Finally, PRBS generator 511 remains powered on and continues to generate the PRBS bit stream, later used for re-synchronization. Preferably, phase rotator 506, clock divider 510, amplifier 501, sampler 502 and deserializer 503 are powered down; these powered-down devices consume the bulk of the power consumed by the receiver synchronization circuit. Certain additional elements may be powered down as well.

The powering-down of phase rotator 506 and clock divider 510 means that the corresponding R2 and R8 clock signals are lost. Since the deserializer output register 612 and load counter 515 controlling clocking of data into registers 701, 702 of FIFO Deskew circuit 504 operate from these clock signals, the synchronization of the load counter 515 with respect to the unload counter 516 is lost when the phase rotator is powered down. Additionally, the synchronization of the clock divider 510, which divides the clock frequency, with respect to the data, is lost.

When power is restored to a line after temporarily powering it down, the corresponding clock resync logic circuit 514 within the receiver circuit re-synchronizes the clock divider 510 and load counter 515 so that coherent data, synchronized to the other lines of the interface, is output from the FIFO deskew 504 and descrambler 505. I.e., the latency of data passing through the FIFO deskew is restored to what it was before the line was temporarily powered down. In general, this is accomplished by transmitting a known signal pattern, which is preferably the PRBS23 signal, from the transmitter, and matching the received data to the same pattern in the receiver. Preferably, both the PRBS generator 415 in the transmitting device and PRBS generator 511 in the receiving device continue to receive power and generate the PRBS23 data stream when selective portions of the transmitting and receiving circuits are temporarily powered down. Since the identical pattern is being generated on both sides, received data is compared to a range of possible offsets of the data stream from the local PRBS generator 511 in the receiver to determine the correct offset, and the clock divider 510 and load counter 515 are adjusted accordingly. The structure and operation of clock resync logic circuit 514 is explained below with reference to FIGS. 9-12.

Figure 9:
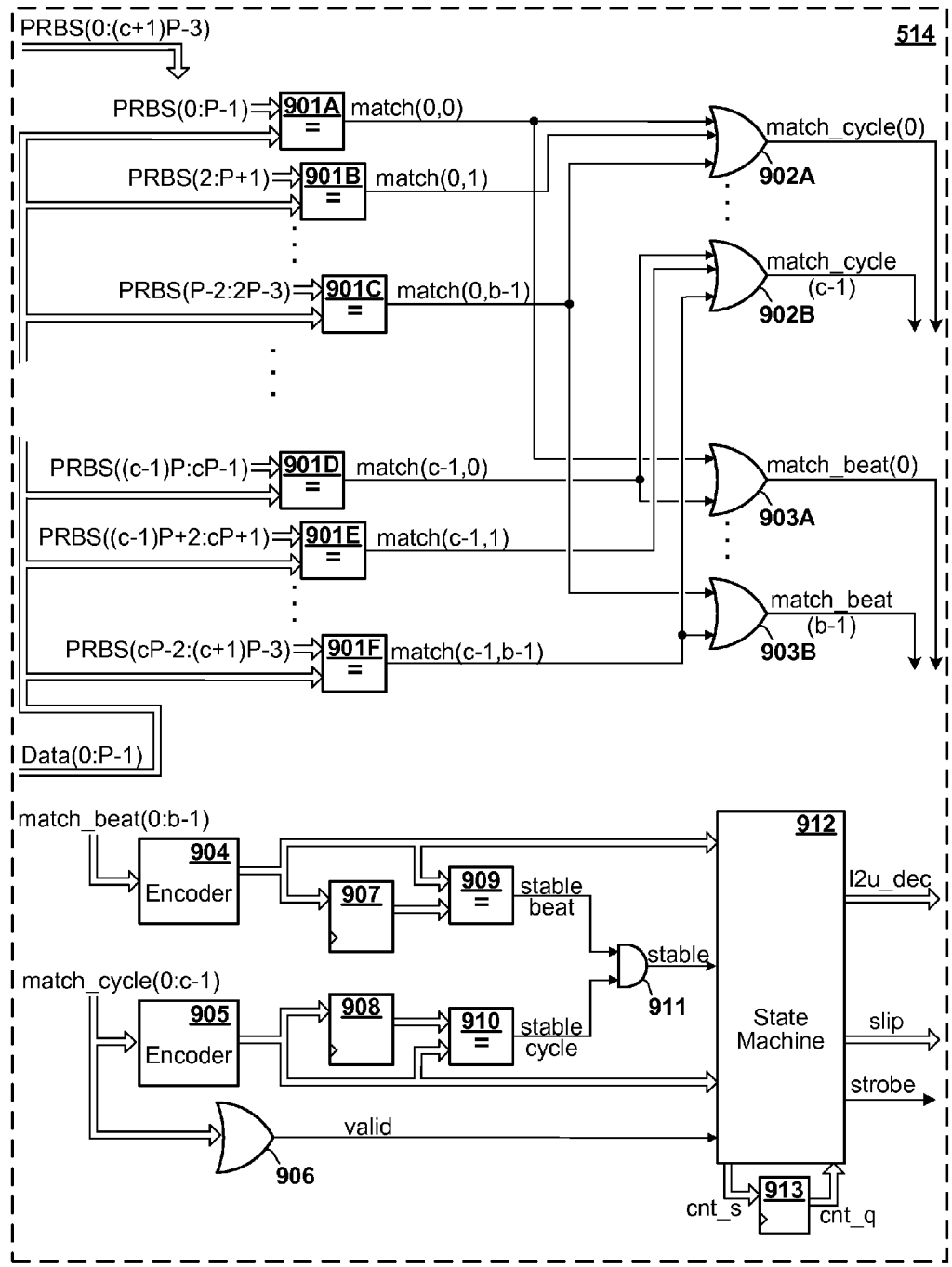
FIG. 9 is a diagram showing in greater detail the structure of a clock resync circuit within a receiver synchronization circuit, according to one or more preferred embodiments.

FIG. 9 is a diagram showing in greater detail the structure of a clock resync circuit 514 within a receiver synchronization circuit 404, according to one or more preferred embodiments. Preferably, a separate clock resync circuit 514 exists for each receiver synchronization circuit 404 and is responsible only for re-synchronizing the corresponding receiver synchronization circuit.

Referring to FIG. 9, clock resync circuit 514 includes multiple P-bit wide PRBS comparators 901A-F, herein generically referred to as feature 901, multiple match_cycle OR gates 902A-B (herein generically referred to as feature 902), and multiple match_beat OR gates 903A-B (herein generically referred to as feature 903). In one or more embodiments, the number of match_cycle OR gates 902 is equal to the number of deserializer clock cycles to be compared for a match, designated c, and the number of match_beat OR gates 903 is equal to the number of beats in each cycle, designated b. In order to compare all possible PRBS bit strings over a c cycle interval, c*b PRBS comparators 901 are used. Preferably, b=4 and c=3, requiring 12 PRBS comparators, it being understood that the number could vary. Clock resync circuit 514 further includes match_beat encoder 904, match cycle encoder 905, valid OR gate 906, match_beat latch 907, match_cycle latch 908, match_beat comparator 909, match cycle comparator 910, stable AND gate 911, state machine logic 912, and count latch 913.

Clock resync circuit 514 receives as input P bits of incoming data (designated Data(0:P–1) which was received over the corresponding line 302 and processed through amplifier 501, sampler 502, deserializer 503, and FIFO buffer 504. I.e., Data(0:P–1) represents the output of register 706 of the FIFO buffer. For comparison, clock resync circuit receives a ((c+1)P–2)-bit string (designated PRBS (0:(c+1)P–3)) recently generated by PRBS generator 511 and temporarily stored in a ((c+1)P–2)-bit PRBS history register 518 within PRBS generator 511. For a deserializer output width of P=8, 30 bits recent bits from PRBS generator 511 are preferably stored in the PRBS history register and used for comparison, it being understood that this number could vary. Each PRBS comparator 901 compares the same P-bit sequence of incoming data from FIFO output register 706 with a corresponding P-bit sequence from the PRBS history register, there being c*b, (preferably 12) P-bit PRBS strings within the ((c+1)P–2) bits (preferably 30 bits) of recent PRBS data in the PRBS history register, each string offset by 2 bits from its predecessor (the 2-bit offset being a consequence of the fact that 2 bits of data are transferred in each cycle of the interface clock, hence strings will automatically align on a 2-bit boundary from the interface clock signal, without requiring any adjustment). Each comparator 901 outputs a logic '1' if Data(0:P–1) matches the corresponding P-bit portion of the bit string from the PRBS history register, and a logic '0' if not. Due to the nature of the PRBS23 signal, there can be at most one match within the PRBS bit string.

If Data(0:P–1) matches a P-bit portion of the PRBS history string from PRBS history register 518, the match_cycle OR gate 902 and match_beat OR gate corresponding to the comparator 901 which detected the match will each output a logic '1', while the other match_cycle OR gates and match_beat OR gates output logic '0'. The outputs of match_beat OR gates 903 are input to match_beat encoder 904 to produce binary encoding of the beat at which the match was detected. Similarly, the outputs of match_cycle OR gates 902 are input to match_cycle encoder 905 to produce binary encoding of the cycle at which the match was detected. The output of match_beat encoder 904 is input simultaneously to match_beat latch 907, match_beat comparator 909, and state machine 912. Match_beat latch 907 holds the value output by encoder 904 for one cycle of the host clock (same frequency as the R8 clock); this value is then compared with the current encoder output by match beat comparator 909. If the two values match, i.e., a match of Data(0:P–1) with the PRBS history string has been detected on the same beat for two consecutive host clock cycles, then comparator outputs a logic '1'; otherwise it outputs logic '0'. The output of match_cycle encoder 905 is similarly input to match_cycle latch 908, match_cycle comparator 910, and state machine 912. Match cycle comparator 910 outputs a logic '1' if Data(0:P–1) matches the PRBS history string on the same R8 clock cycle for two consecutive host clock cycles. If both comparators 909, 910 output logic '1', Data(0:P–1) has matched the PRBS history string for two consecutive cycles on the same R8 clock cycle and beat, and a 'stable' signal is generated by AND gate 911 to state machine 912. Preferably, the pattern must match the data for multiple consecutive cycles (same beat, same cycle) to avoid possible false matches. State machine 912 verifies that the stable single is present and maintained sufficiently long to avoid false matches, as described further herein.

Figure 10:
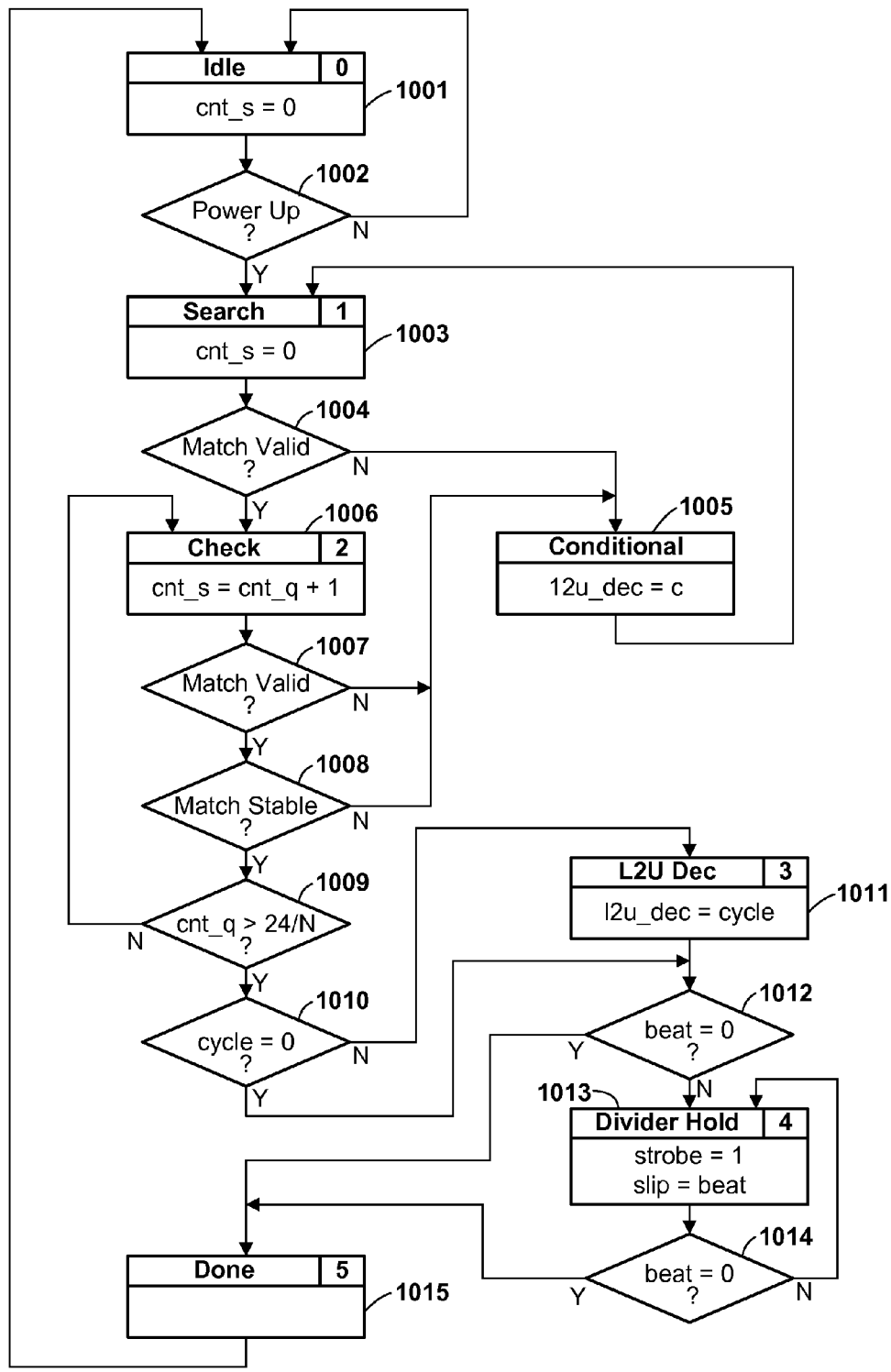
FIG. 10 is a state diagram showing the operation of a state machine within the clock resync circuit, according to one or more preferred embodiments.

The state machine 912 contains logic circuitry and state memory for triggering synchronization adjustments to the unload counter 516 and clock divider 510. FIG. 10 is a state diagram showing the operation of state machine 912, according to one or more preferred embodiments.

Referring to FIG. 10, state machine 912 is initially in an idle state 1001 when no action is required. Upon receiving an indication that the corresponding receiver circuit 404 is powering up and requires clock resynchronization (the 'Y' branch from block 1002), it transitions to search state 1003. In the search state, the state machine loops through blocks 1004 and 1005 until a valid match is found, i.e. valid OR gate 906 produces a logic '1', indicating that Data(0:P−1) matches some P-bit string from the PRBS history register 518. In the loop, if a valid match is not found, (the 'N' branch from block 1004), a load-to-unload decrement (l2u_dec) value of c is output (block 1005), causing the value in unload counter 516 to be decremented by c, the number of cycles of data that can be matched in comparators 901 at any given time. The change in the value stored in unload counter 516 in turn changes the secondary delay register 702 which is selected by alignment switch 705 for input to FIFO deskew output register 706, thus changing the delay which produces Data(0:P−1). The changed Data(0:P−1) string is then compared again with the PRBS recent history by comparators 901 to attempt to find a match. The state machine will continue to loop through all possible delay values until a valid match is found.

If a valid match is found (the 'Y' branch from block 1004), state machine 912 enters the check state (block 1006). The check state is used to verify that the match previously found in the search state represents a true synchronization of data cycle and beat offset, as opposed to a random transient match of P data bits. If the cycle and beat offset at which the match was detected represent true synchronization, then subsequently received data should also match the corresponding PRBS history register when compared at the same cycle and beat offset. The state machine therefore checks for a match valid signal from valid OR gate 906 (block 1007) and a match stable signal from stable AND gate 911 (block 1008), indicating a continuing match at the same cycle/beat offset. If either signal is logic '0', the 'N' branch is taken from the corresponding block 1007 or 1008, and the state machine returns to the search state, decrementing the unload counter (block 1005) to continue the search. If both valid OR gate 906 and stable AND gate 911 produce logic '1', the 'Y' branches are taken to block 1009. In the check state, the value of the counter cnt_s is set to the value counter cnt_q+1, causing latch 913 to increment the value of the cnt_q counter by one with each cycle of the host clock. At block 1009, the value of counter cnt_q is compared to a lock iteration limit (which is preferably 3, although a different limit could be used). If the limit is not reached (the 'N' branch from block 1009), the state machine remains in the check state for another cycle of the host clock, causing another P bits of data to be compared. If the limit has been reached (the 'Y' branch from block 1009), then the incoming data has matched the PRBS at the same cycle/beat offset for some minimum number of consecutive cycles determined as by the limit, and the cycle/beat at which the match was detected is deemed the true required offset for synchronization.

If the output of match_cycle encoder 905 is zero, then the cycle offset is already correct, i.e., the unload counter is already pointing to the correct register, and needs no further adjustment; in this case the 'Y' branch is taken from block 1010. If the output of the match_cycle encoder is non-zero, the 'N' branch is taken from block 1010 to state L2U_Dec 1011, causing the unload counter to be decremented by an amount equal to the value output be match_cycle encoder.

In either case, if the output of match_beat encoder 904 is zero, then incoming data is already synchronized on the correct beat, and no further adjustment of the R8 clock signal is required; in this case the 'Y' branch is taken from block 1012 to the Done state 1015. If the match_beat encoder output is non-zero, the R8 clock signal must be adjusted. Adjustment is performed in the Divider Hold state 1013. In Divider Hold state, the state machine outputs a logic '1' on the strobe line and a slip amount corresponding to the beat on the slip output. In response to this output, clock divider 510 causes the R8 clock signal to slip by the corresponding number of beats of the R2 clock input, thus acquiring synchronization of the beat within the synchronized cycle. The state machine remains in the Divider Hold state 1013, holding the output strobe and slip signals, until the beat output by match_beat encoder 904 becomes zero, indicating that the slipping of the R8 clock signal has propagated through the FIFO buffer. This could require more than one cycle of the host clock. When the output of match_beat encoder 904 becomes zero, the 'Y' branch is taken from block 1014 to the Done state 1015.

After the Done state 1015, state machine 912 returns to the idle state 1001.

Figure 11:
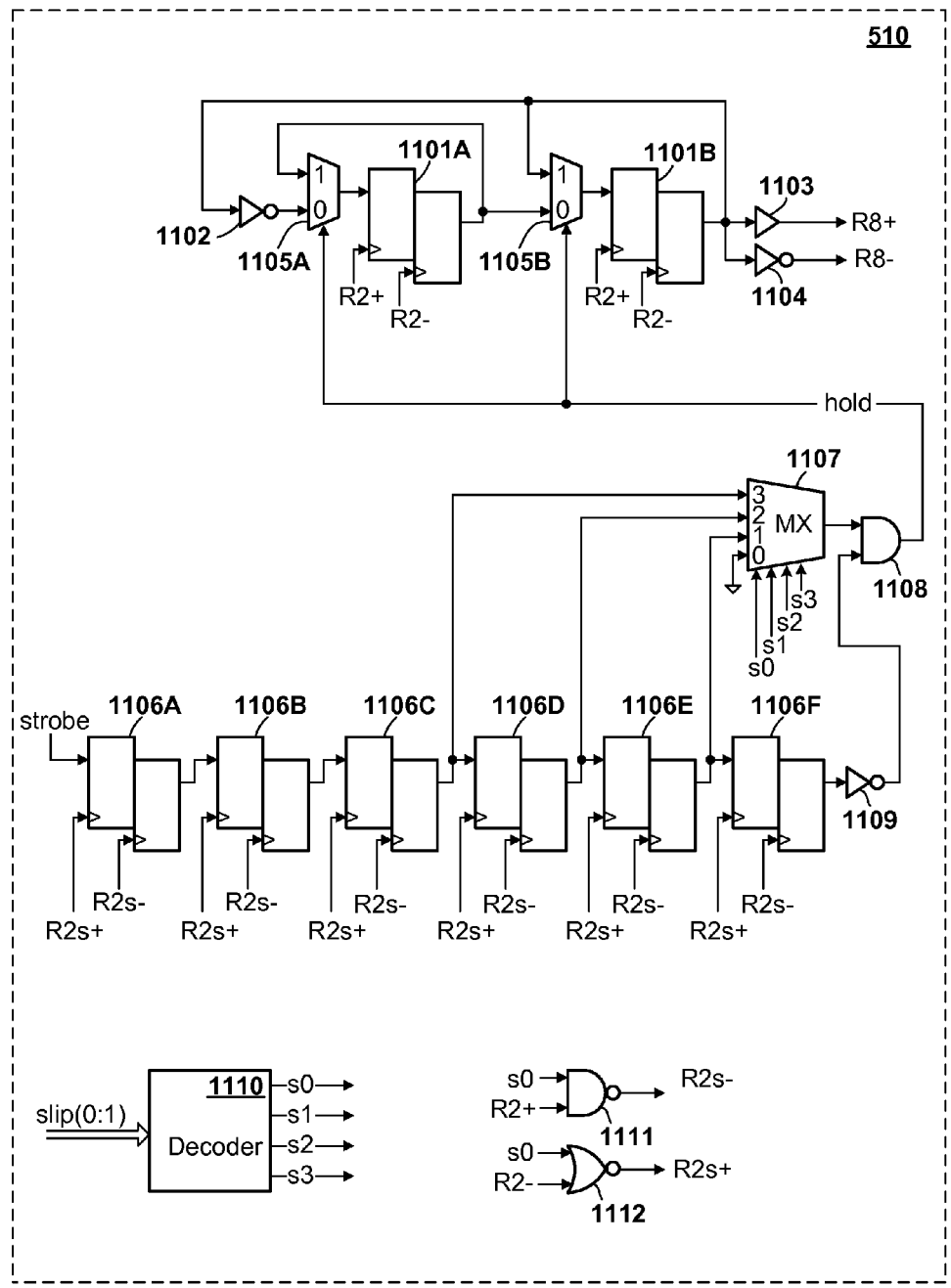
FIG. 11 is a diagram showing in greater detail the structure of a clock divider circuit for producing a divided local clock signal and for synchronizing the divided clock signal under control of a clock resync circuit, according to one or more preferred embodiments.

FIG. 11 illustrates in greater detail the structure of a clock divider circuit 510 for producing the divided R8 clock signal from the R2 signal produced by phase rotator 506, and for synchronizing the R8 clock signal under control of clock resync circuit 514, according to one or more preferred embodiments. Referring to FIG. 11, in normal operation, a divided R8 clock signal is produced by two pairs of D-latches 1101A, 1101B connected in series, the L1 latch of each pair being clocked by one phase of the R2 clock, and the L2 latch of each pair being clocked by the opposite phase of the R2 clock. The output of the second L2 latch, i.e. of latch pair 1101B, is fed back through inverter 1102 to the L1 latch input of the first pair 1101A. A logic '1' or logic '0' takes two cycles of the R2 clock to propagate through both pairs of latches 1101A, 1101B, after which the input value to the first L1 latch is inverted, causing the output to change two cycles later, and so on. The resultant output of the L2 latch of the second pair 1101B is the R8 clock signal, which is coupled to driver 1103 and driver/inverter 1104 to produce opposite phases of the R8 signal.

An adjustment mechanism for synchronization is provided by switches 1105A, 1105B, each coupled to the L1 input of a respective latch pair 1101A, 1101B. During normal operation, a hold signal for controlling switches 1105A, 1105B is logic '0', causing the output of the first pair 1101A to pass through to the input of the second pair 1101B, and the inverted output of the second pair 1101B to be input to the first pair 1101A. When the hold signal is logic '1', the output of each latch pair if fed back to the input of the same latch pair, causing the state of the latches to be frozen until the hold signal returns to logic '0'.

The hold signal for controlling switches 1105A, 1105B is produced by a circuit comprising six pairs of D latches 1106A-F, 4:1 multiplexer 1107, hold AND gate 1108, hold enable inverter 1109, decoder 1110, filtered clock NAND gate 1111, and filtered clock NOR gate 1112, as shown in FIG. 11. Latch pairs 1106A-F are coupled in series as shown, with the L1 input to the first latch pair 1106A being supplied by the strobe signal from clock resync circuit 514.

In normal operating mode, strobe is a logic '0' and all latches 1106A-F store logic '0'; slip(0:1) represents a zero value, causing decoder 1110 to produce logic '1' on line s0, causing MUX 1107 to select logic '0' (ground) as input, producing a logic '0' at the output of hold AND gate 1108.

Latch pairs 1106A-F are clocked by a filtered R2 clock signal, designated R2s, the L1 latch in each pair being clocked by a first phase of the R2s signal, and the L2 latch in each pair being clocked by the opposite phase of the R2s signal. The two phases of the R2s clock are produced by filtered NAND clock gate 1111 and filtered clock NOR gate 1112, and decoder 1110, as shown. When slip(0:1) represents 0 (as in normal operating state), the resultant logic '1' on line s0 shuts off the R2s clock, reducing power consumption in latches 1106A-F. When slip(0:1) represents any non-zero value, the resultant logic '0' on line s0 causes the R2 signal to pass through gates 1111 and 1112 to the R2s signal.

When clock resync circuit activates strobe and drives a non-zero value on slip(0:1), decoder 1110 drives s0 to logic '0', causing filtered clock NAND gate 1111 and filtered clock NOR gate 1112 to activate the R2s clock signal. The activated R2s clock causes the strobe to propagate through latches 1106A-F in successive cycles of the R2s clock, i.e. successive cycles of the R2 clock. The strobe is captured in three successive latch pairs 1106A-C before being used to drive the output, to avoid metastability issues which may arise from crossing the clock domain from the host clock to the R2 clock. The appropriate activated signal from decoder 1110, either s3, s2 or s1, selects an input to MUX 1107, causing the MUX output to go to logic '1' as the strobe propagates through the output of latches 1106C, 1106D, or 1106E, respectively. When the strobe reaches the output of latch pair 1106F, inverter 1109 generates logic '0', causing hold AND gate 1108 to drop the hold signal to logic '0'. Thus, the hold will be at logic '1' for 1, 2 or 3 cycles of the R2 clock, depending on the value of slip(0:1). As explained above, the active hold signal will freeze the latches 1101A, 1101B which generate the R8 clock signal for 1, 2 or 3 cycles of the R2 clock accordingly, thus synchronizing the R8 clock under control of the clock resync circuit 514.

Logical Bus Width Control

In one or more embodiments, the number of lines N which are used for transmitting functional data at any given time (the "logical bus width") is variable. The upper limit of N is $N_{MAX}$, but where low traffic conditions justify it, some of the physical lines can be temporarily powered down by powering down selective components including the phase rotator 506, clock divider 510, amplifier 501, sampler 502, and deserializer 503, as explained above, thus reducing the logical bus width N below $N_{MAX}$. Such lines remain in a continuously calibrated state, meaning that if a line is powered down for a relatively long time period extending across multiple calibration intervals, it is powered up periodically for calibration in accordance with any applicable scheduled calibration technique, and again powered down once calibration is completed. Alternatively, a line may be temporarily powered down for a relatively brief period of time between scheduled calibration. In either case, the local clock resync circuit 514 and resynchronization techniques described herein enable a temporarily powered down line to be powered up and available for use with very little delay if it is again required to transmit data.

Figure 12:
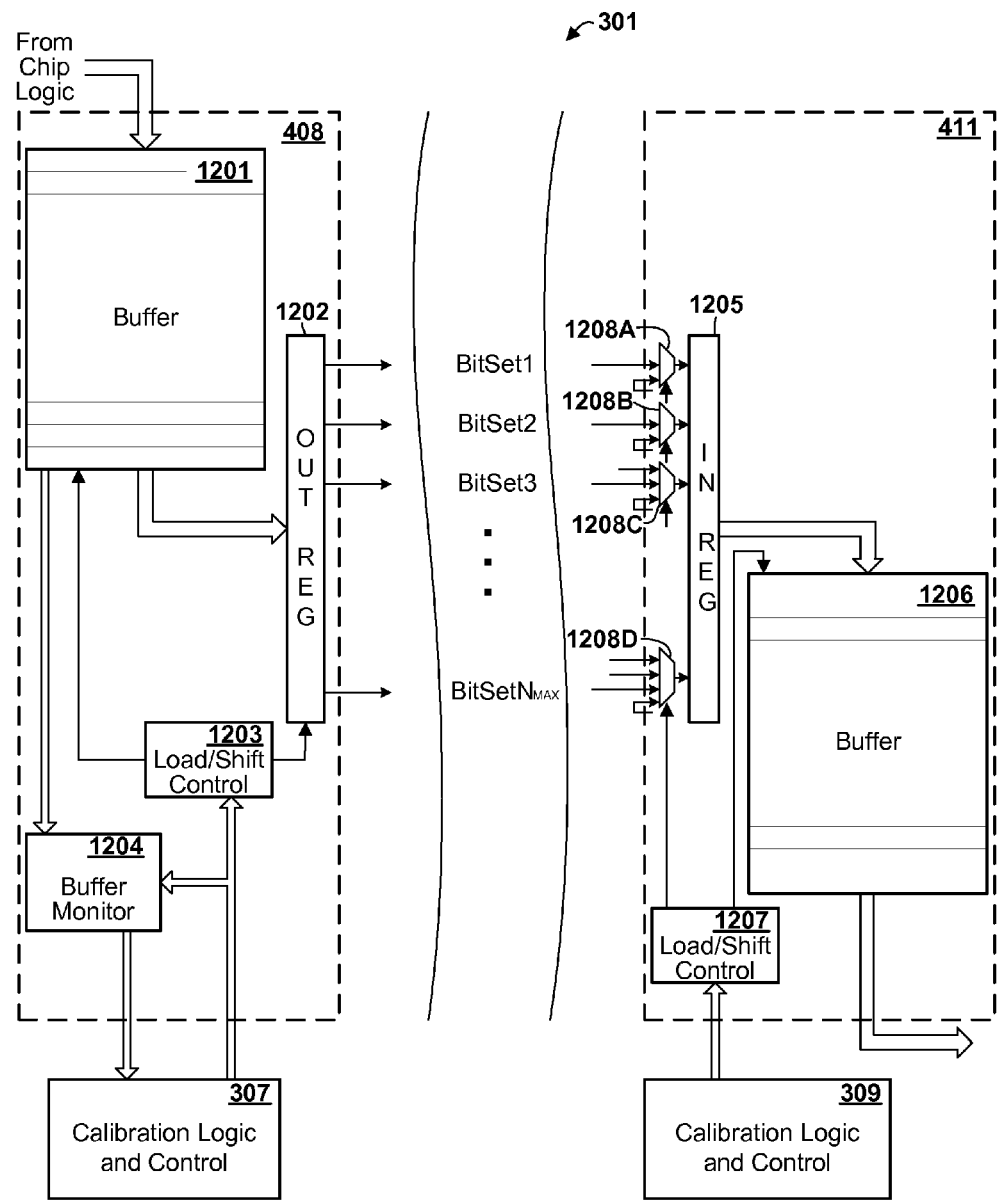
FIG. 12 is a diagram showing in greater detail certain portions of a transmit buffer and a receive buffer for supporting a variable width bus in the unidirectional half of a point-to-point link of parallel lines of FIG. 4, according to one or more preferred embodiments.

FIG. 12 is a diagram showing in greater detail certain portions of transmit buffer 408 and receive buffer 411 of the unidirectional half of a point-to-point link of parallel lines of FIG. 4, according to a preferred embodiment of one or more aspects of the present invention. FIG. 12 represents certain logical bus width control structures in an exemplary embodiment.

Referring to FIG. 12, transmit buffer 408 contains a fixed-width internal FIFO buffer 1201, an output shift register 1202, a load/shift control circuit 1203, and a traffic monitoring mechanism in the form of buffer monitor 1204. Internal FIFO buffer 1201 preferably contains multiple entries, each having $N_{MAX}*P_{TX}$ bits. FIFO buffer 1201 may be constructed according to any known design for FIFO buffers. Data produced by logic components of the transmitting chip is loaded to internal FIFO buffer 1201 in segments which are integral multiples of $N_{MAX}*P_{TX}$ bits. Load/Shift control 1203 selects an oldest entry of $N_{MAX}*P_{TX}$ bits in FIFO buffer 1201 for loading to output shift register 1202. Regardless of the current logical bus width, $N_{MAX}*P_{TX}$ bits are loaded to shift register 1202. Register 1202 contains $N_{MAX}*P_{TX}$ latches, each outputting a single bit. Where $N=N_{MAX}$, each bit of the ($N_{MAX}*P_{TX}$)-bit output of register 1202 is simultaneously provided to a respective transmitter circuit 403 after passing through a respective switch 405. Each transmitter circuit 403, which operates at a clock frequency which is $P_{TX}$ times that of the transmit buffer 408, transmits one bit of the $P_{TX}$ bits presented to it in each cycle of its interface clock 412. It is therefore possible to unload one ($N_{MAX}*P_{TX}$)-bit entry from FIFO buffer 1201 with each cycle of the transmit buffer's clock (which is preferably the same frequency as the internal logic within the transmitting chip).

However, where $N<N_{MAX}$, only the first $N*P_{TX}$ bits in register 1202 are presented to the respective transmitter circuits 403. Switches 405 effectively disable the outputs of the remaining latches of register 1202. The remaining latches of register 1202 shift their respective bits into the first $N*P_{TX}$ latches in one or more subsequent cycles of the buffer's clock, responsive to signals from load/shift control 1203. Thus multiple cycles of the buffer's clock are required for each ($N_{MAX}*P_{TX}$)-bit entry in FIFO buffer 1201. Preferably, both N and $N_{MAX}$ are powers of 2, although other bus widths could be used.

Load/shift control 1203 receives logical bus width control data specifying the current logical bus width from calibration logic and control circuit 307, and responsive thereto controls both the loading of FIFO buffer entries into output register 1202 and the shifting of bits within output register 1202, as explained above.

Analogous circuitry exists in the receiver. Receiver buffer contains an input register 1205, an internal FIFO buffer 1206, and a load/shift control circuit 1207, and a set of input switches 1208A-D (hereinafter referred to generically as feature 1208). Load/shift control 1207 receives logical bus width control data specifying the current logical bus width from calibration logic and control circuit 309, and controls switches 1208 and loading of buffer 1206. Data bits received over the interface are received in input register 1205 after passing through switches 406 and switches 1208.

Input register 1205 contains $N_{MAX}*P_{RX}$ latches. When the logical bus width is $N_{MAX}$, each switch of switches 1208 transmits the respective received data directly to the corresponding logical latch. I.e., BitSet1 to the first $P_{RX}$ latches, BitSet2 to the second $P_{RX}$ latches, and so forth, BitSet $N_{MAX}$ to the $N_{MAX}$th $P_{RX}$ latches. However, if N is less than $N_{MAX}$, then $N_{MAX}*P_{RX}$ bits are received in multiple successive cycles of the buffer clock, so that in a first cycle of the buffer clock the first $N*P_{RX}$ bits will be clocked into the first $N*P_{RX}$ latches, in a second cycle the second $N*P_{RX}$ bits will be clocked into the second $N*P_{RX}$ latches, and so forth. Switches 1208 select the destination of each set of $N*P_{RX}$ bits. When input register 1205 is full, load/shift control 1207 loads its data into internal FIFO buffer 1206 which, like buffer 1201, has a fixed width of $N_{MAX}*P_{RX}$.

The number of inputs to each switch 1208 varies, and is related to the number of possible bus configurations. For example, the first switch 1208A has only two inputs, one for Bitset1 (i.e., the output of switch 406A) and the other a feedback input. The feedback input is selected on those cycles in which the received data is being clocked into other latches. On the other hand, switch 1208D, corresponding to Bitset $N_{MAX}$, has an input for BitSet$N_{MAX}$, a feedback input, and an input for each supported logical bus width less than $N_{MAX}$. For example, if $N_{MAX}$=8, and the interface supports logical bus widths of 2, 4 and 8, the inputs to switch 1208D will include BitSet2 (for a logical bus width of 2), BitSet4 (for a logical bus width of 4), BitSet8 (for a logical bus width of 8), and the feedback input.

Buffer monitor 1204 in transmitter buffer 408 monitors the state of FIFO buffer 1201 and/or volume of data flowing through FIFO buffer 1201, to generate appropriate indications to calibration logic and control circuit 307 to change the logical bus width. Any of various techniques could be used for determining a low or high traffic condition justifying a change in bus width. In a first exemplary embodiment, buffer monitor 1204 responds simply to the current amount of data in buffer 1201, i.e, the logical bus width is set to a narrow width if there is no data in the buffer or if the amount of data is below some predetermined threshold, and set to a wider width otherwise. In another exemplary embodiment, buffer monitor 1204 responds to both the current amount of data in buffer 1201, and the volume of data transmitted in a recent interval, it being understood that other or additional criteria could be used. Specifically, buffer monitor may contain a counter (not shown) responsive to load signals from load/shift control 1203 which counts a number of entries loaded to FIFO buffer 1201 from chip logic, and a timer (not shown). The counter is examined and reset each time the timer expires. The logical bus width is increased if either (a) the current amount of data in buffer 1201 exceeds a buffer level threshold $T_{BLI}$, or (b) the volume of data received in the most recent time interval exceeds a traffic threshold $T_{TI}$. The logical bus width is decreased if both (a) the current amount of data in buffer 1201 is less than a buffer level threshold $T_{BLD}$, and (b) the volume of data received in the most recent time interval is less than a traffic threshold $T_{TD}$. For stability, it is expected that $T_{BLI} > T_{BLD}$ and $T_{TI} > T_{TD}$. Morever, these thresholds, particularly $T_{TI}$ and $T_{TD}$, may vary depending on the current logical bus width. When an appropriate condition is detected for increasing or decreasing the logical bus width, buffer monitor 1204 outputs a signal to calibration logic and control circuit 307, which sequences the change in bus width. A process for coordinating the change of bus width in both the transmitting and receiving devices is explained below with respect to FIG. 17.

Buffer monitor 1204 of one or more preferred embodiments generates a relatively direct measurement of link traffic by monitoring actual data passing through the buffer. However, it will be appreciated that a traffic monitoring mechanism could alternatively utilize any of various direct or indirect measurements of link traffic. For example, such a mechanism might measure supply current for the chip or selective components thereof, or delay times of data passing through the buffers and across the link, or any of various other parameters which, while not direct measures of link traffic volume, are sufficiently related to link traffic to provide a useful traffic monitoring mechanism.

Calibration of the Receiver

In one or more preferred embodiments, various coefficients of receiver synchronization circuits 404 are calibrated and stored in registers 410. Calibration is performed at initial power-on of the digital device, and periodically thereafter during operation. Recalibration during operation, herein referred to as "continuous time, dynamic calibration", or simply "dynamic calibration", requires that the interface be able to communicate functional data during calibration. Therefore, lines are calibrated one at a time, using one of the redundant lines, so that enough lines are available to handle functional data while each one is being calibrated in turn.

Figure 13:
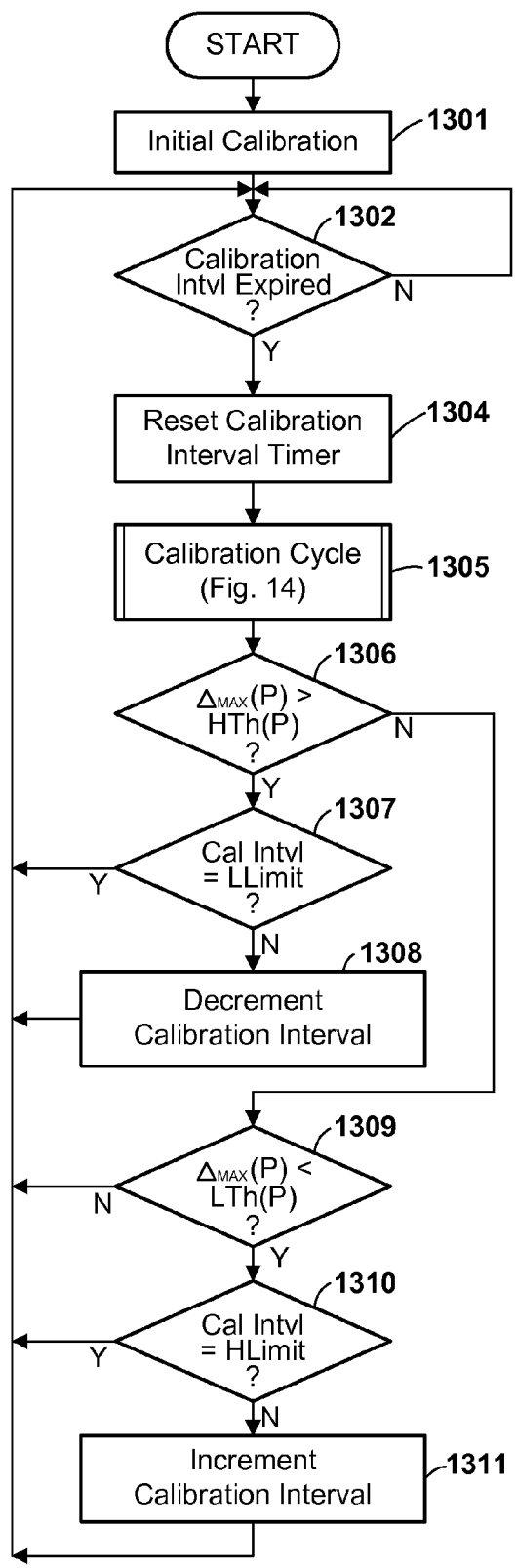
FIG. 13 is a flow diagram showing at a high level a process of continuous calibration of a point-to-point link of parallel lines, according to one or more preferred embodiments.

FIG. 13 is a flow diagram showing at a high level a process of continuous calibration of a point-to-point link of parallel lines, according to a preferred embodiment of one or more aspects. Upon power up, the interface goes through an initial calibration cycle in which all lines are calibrated (block 1301). A calibration interval timer and, optionally, a status interval timer are initialized.

The interface then waits for the calibration interval timer to expire, represented as the tight loop at block 1302. It will be appreciated that, although represented as a flow diagram, the timer is preferably implemented as a hardware timer which generates appropriate signals upon reaching a timeout.

Upon expiration of the calibration interval (the 'Y' branch from block 1302), the calibration interval timer is reset (block 1304), and a calibration cycle is performed on the lines of the communications link (block 1305). Preferably, a calibration cycle includes the lines of both unidirectional halves 301 of the link, although it would alternatively be possible to trigger calibration cycles in each half independently. Performance of a calibration cycle in a single unidirectional half is represented in greater detail in FIG. 14, it being understood that where both halves 301 of the link are calibrated concurrently, the process represented by FIG. 14 runs concurrently in both halves.

Upon completion of the calibration cycle, the calibration interval is adjusted if indicated, represented by blocks 1306-1311. Specifically, during the calibration cycle, with respect to each of multiple calibrated parameters in each calibrated line, a difference between the previous calibrated value of the corresponding parameter and its current calibrated value is determined, and the maximum difference in calibrated values among the various lines for each such parameter P (designated $\Delta_{MAX}(P)$) is saved. For each such parameter P, there is a corresponding high threshold (HTh(P)), representing a maximum acceptable delta. A deviation $\Delta_{MAX}(P)$ in excess of HTh(P) indicates that parameter P is changing too much between calibration cycles, and the cycle interval should be shorter. Accordingly, in this circumstance the 'Y' branch is taken from block 1306. If the calibration interval has not yet reached a lower limit LLimit (the 'N' branch from block 1307), the calibration interval is decremented an appropriate amount (block 1308).

If, on the other hand, no parameter P has changed more than the corresponding HTh(P), then the 'N' branch is taken from block 1306. If, for each such parameter P, $\Delta_{MAX}(P)$ is less than a corresponding low threshold (LTh(P)) for parameter P, then the amount of change in calibration parameters is so low that it is deemed acceptable to lengthen the interval between calibration. In this circumstance (represented as the 'Y' branch from block 1309), if a calibration interval upper limit (HLimit) has not yet been reached (the 'N' branch from block 1310), the calibration interval is incremented (block 1311).

It will be understood that blocks 1306-1311 are not necessarily a sequential decision process, and in the one or more illustrated embodiments the decisions represented by these blocks are implemented in hardware logic within calibration logic and control 309. Any change in the calibration cycle interval is preferably communicated to the other device using an appropriate SLS command of the SLS protocol, described herein.

Figure 14:
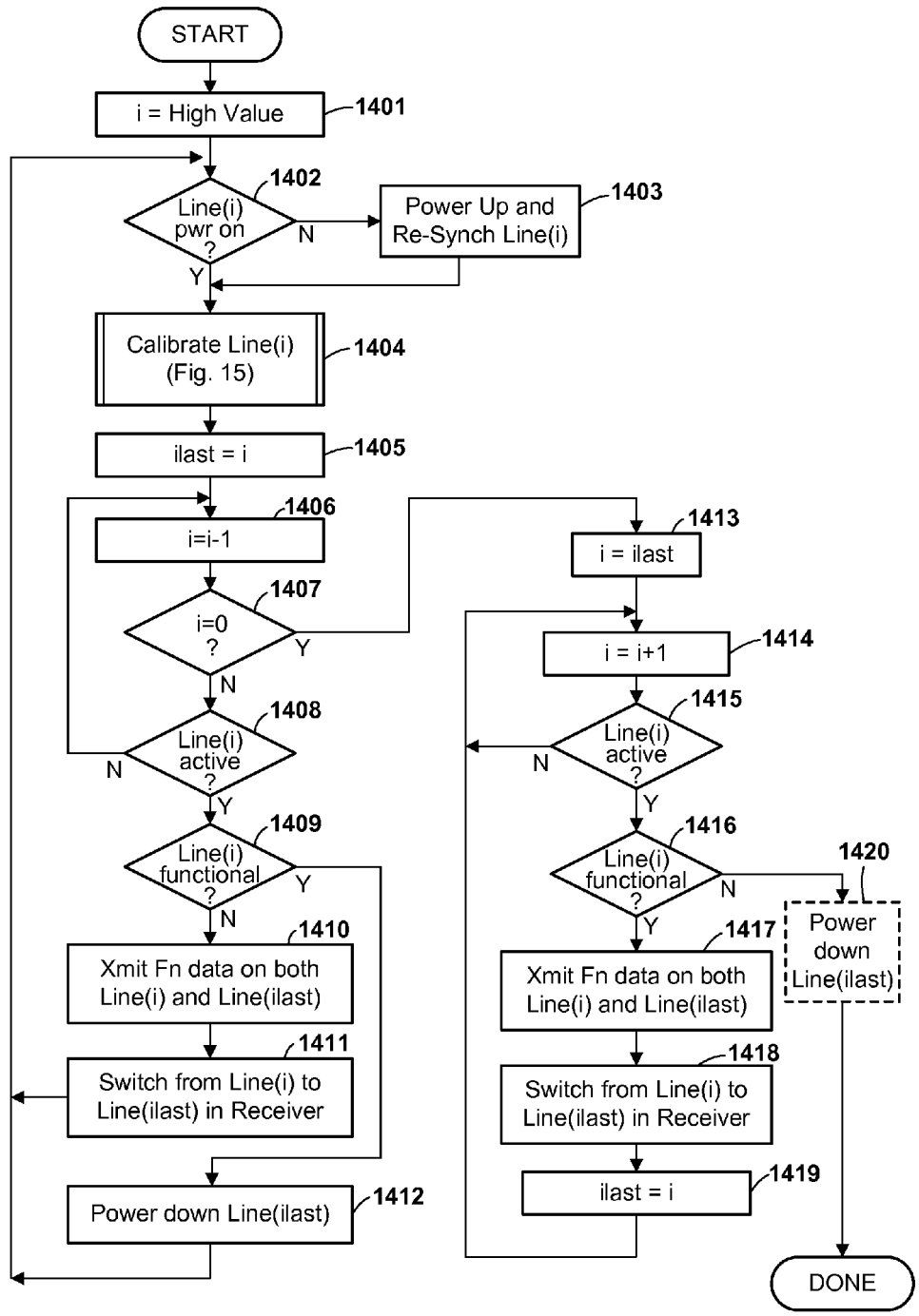
FIG. 14 is a flow diagram showing at a high level a process of dynamic calibration of a unidirectional half of a point-to-point link of parallel lines, according to one or more preferred embodiments.

FIG. 14 is a flow diagram showing at a high level a process of dynamic calibration of a unidirectional half 301 of the link, according to one or more preferred embodiments. The dynamic calibration process is invoked periodically during operation of a digital data system, as required to maintain appropriate calibration coefficients for the circuits. Any of several possible alternatives techniques may be used for invoking the dynamic calibration process. In a preferred embodiment as explained above with respect to FIG. 13, calibration is invoked at time intervals which are judged sufficiently frequent to counter any possible drift of calibrated coefficients. The frequency of the calibration interval is tunable by observing the actual drift of calibrated coefficients between successive calibration cycles, and incrementing or decrementing the calibration interval according to the drift observed. Alternatively, the frequency of calibration may be fixed in the circuit design, or may be selectable from among multiple possible settings at the time of manufacture. As an additional alternative, calibration might be invoked upon the occurrence of one or more pre-defined events, such as a change in internal system temperature since the last calibration cycle or an observed increase in intermittent errors. A triggering condition for calibration may involve a combination of such factors. As a further alternative, dynamic calibration can be invoked at maximum frequency, i.e., as soon as one calibration cycle has completed and all lines have been calibrated, a new calibration cycle is commenced immediately to recalibrate all the lines. In the latter instance, it will be observed that there is no interval between calibration cycles. As used herein, "periodic recalibration" could include any of these alternatives, and does not necessarily imply that recalibration occurs at regular intervals.

In the description herein, it is assumed that, as a starting point for calibration, that no line is currently being calibrated and the first N active lines are transmitting functional data, while lines above the first N active lines are either in the active but unused state or the deactivated state, where N is the current logical bus width. The outputs of any deactivated or active but unused lines are disabled by switches 406. It will be understood that if one of the lines has been previously deactivated (powered down) due to a fault, that line will be skipped during calibration, but a line which has been temporarily powered down to save power (active but unused) is powered up and calibrated during the calibration cycle.

Referring to FIG. 14, a line index variable i is initialized to a high value (block 1401). This high value is the highest index value of a line which is currently active, i.e. was calibrated in the last calibration cycle and is available for use. Normally, this value is $N_{MAX}+M$, there being $N_{MAX}+M$ physical lines. However, where Line($N_{MAX}+M$) was previously deactivated, the initial value of i will be less than $N_{MAX}+M$.

If Line(i) is currently powered off, the 'N' branch is taken from block 1402, and Line(i) is powered up and re-synchronized (block 1403). By "re-synchronized", it is meant that the local clock divider circuit 510 and unload counter 516 are re-synchronized using clock resync circuit 514, as described above with respect to FIGS. 9-12. If Line(i) is already powered up, block 1403 may be skipped (the 'Y' branch from block 1402). Line(i) may be powered down because it is in an unused but active state, e.g. it is a spare line or a line which is part of the full-width bus but not used when the bus is in reduced width, which is maintained in a calibrated state.

Line(i) is then calibrated (block 1404). When finished calibrating Line(i), the line index i is saved as ilast (block 1405) and then decremented (block 1406).

Calibration represented by block 1404 is a complex process, and generally takes significantly more time than all other blocks of FIG. 14 collectively. In one or more preferred embodiments, a pair of lines in opposite halves 301 of link 201 are calibrated concurrently by exchanging control information as shown in FIG. 15, explained in greater detail below. In one or more preferred embodiments, calibration is accomplished by transmitting known test patterns on the line 302 being calibrated, and iteratively adjusting various calibration parameters and observing the effect of such adjustments at the output of the receiver synchronization circuit. Suitable calibration procedures for calibration of receiver synchronization circuit 404 are disclosed in each of the following U.S. patents or patent applications, each of which is herein incorporated by reference: U.S. Pat. No. 8,681,839 to Bulzacchelli et al.; application Ser. No. 12/913,064, filed Oct. 27, 2010, published as U.S. pre-grant patent publication 2012/0106539; and U.S. Pat. No. 8,767,531 to Ferraiolo et al.

A significant feature of the calibration procedure as described in the above referenced patents or patent applications is that all data input to the calibration circuit is data that has passed through the receiver synchronization circuit and is output by it. No special analog sensing circuitry is required for providing input to the calibration circuit. However, such a calibration procedure is not necessarily the only method by which a receiver interface could be calibrated using only the output data or could be calibrated consistent with the present invention. As previously explained, different circuit elements may be present in a receiver synchronization circuit, which may require different calibration procedures as appropriate. Special purpose analog circuitry may exist for measuring incoming voltage levels and so forth to support calibration. Furthermore, even for the circuit elements of the one or more preferred embodiments described, the calibration procedures described herein and the parameters used are not necessarily the exclusive means of calibrating the disclosed circuit elements.

It is worth noting that the receiver circuitry and techniques for calibrating a receiver circuit described or referenced herein as a preferred embodiment enable a feedback-based calibration of the receiver using only the receiver circuit digital logic output in the host clock domain. As a result, the receiver calibration circuit 309 itself, as well as switches 406 for selectively enabling outputs of receiver circuits, are implemented entirely in digital logic in a low power clock domain, i.e., they do not contain any analog devices. A receiver circuit so implemented offers significant power reduction.

Returning to FIG. 14, if the line index is greater than 0, the 'N' branch is taken from block 1407. If Line(i) is not active, the 'N' branch is taken from block 1408, and i is again decremented. This is done to skip over a line which has been deactivated, e.g., due to a fault in the line. If Line(i) is active, the 'Y' branch is taken from block 1408.

At this point (the 'Y' branch from block 1408), Line(ilast) has just been calibrated and is powered up, although its output is disabled by switches 406. If Line(i) is carrying functional data (block 1409), then Line(i)'s functional data will be transmitted temporarily on Line(ilast) while Line(i) and lines having index lower than i are being calibrated. Accordingly, the 'Y' branch is taken from block 1409 to switch the functional data over to Line(ilast). Transmitter switches 405 cause a copy of the functional data being transmitted on Line(i) to also be transmitted on Line(ilast) (block 1410), i.e. the same data is transmitted on both Line(i) and Line(ilast). After sufficient time has elapsed for this functional data to propagate all the way through the corresponding receiver synchronization circuit 404 in the receiving device, receiver switches 406 simultaneously enable Line(ilast) and disable Line(i) (block 1411). I.e, the single receiver switch 406 corresponding to the logical bitset being transmitted on both Line(i) and Line(ilast) is switched to select the output of Line(ilast) instead of the output of Line(i). The transmitter can then discontinue sending functional data on Line(i), and the Line(i) is available for transmitting a calibration test pattern or other control data, as described herein. The process therefore returns to block 1402 to calibrate Line(i).

However, if at block 1409 Line(i) is not carrying functional data, then Line(ilast) is no longer needed, and the 'N' branch is taken to block 1412. Line(ilast) is powered down, and the process returns to block 1402 to calibrate Line(i). The effect of powering down Line(ilast) at block 1412 is to maintain one or more lines in a powered down state in the time intervals between calibration of the respective lines, although any such lines are continuously calibrated at the same frequency as other lines and are always ready for use.

If, at block 1407, line index i is equal to zero, then all lines have been calibrated, and the 'Y' branch is taken. In this case, the lines will be restored to their initial respective states, with the lower index lines (ignoring any deactivated lines) being used to transmit functional data and the lines having index greater than N+D (where N is the logical bus width and D is the number of deactivated lines having index of less than N+D) being either active and unused or deactivated, as the case may be. Accordingly, line index i is set to the index of the last calibrated line, i.e. ilast (block 1413).

Line index i is then incremented to find the next line being used for functional data (block 1414). If Line(i) is inactive (e.g. powered down due to a fault), the 'N' branch is taken from block 1415, and index i is again incremented at block 1414. If Line(i) is an active line, the 'Y' branch is taken from block 1415.

If Line(i) is carrying functional data (block 1416), then the resetting ("unshadowing") of all lines carrying functional data is not yet complete. At this point (the 'Y' branch from block 1416), the output of Line(ilast) is disabled, and Line(ilast) is the line used for transmitting test patterns or commands. Transmitter switches 405 cause a copy of the functional data being transmitted on Line(i) to also be transmitted on Line(ilast) (block 1417). After sufficient time has elapsed for this functional data to propagate all the way through the corresponding receiver synchronization circuit 404 in the receiving device, receiver switches 406 simultaneously enable Line(ilast) and disable Line(i) (block 1418). The index ilast is then set to the value of i (block 1419), and the process iterates to block 1414 to again increment i.

If, at block 1416, Line(i) is not carrying functional data, then the resetting ("unshadowing") of the lines is complete, and the 'N' branch is taken from block 1416. In this case, Line(ilast) is no longer needed for functional data, and will not be needed for calibration until the next calibration cycle. Accordingly, in one or more embodiments, Line(ilast) is powered down (block 1420). Unlike the line or lines powered down at block 1412, Line(ilast) is powered down between calibration cycles (i.e., from the end of one cycle to the beginning of the next).

It will be observed that, if Line(ilast) is powered down between calibration cycles as represented by block 1420, then the SLS mechanism for exchanging status and control information is not available between calibration cycles. Depending on the commands which are supported by the SLS mechanism, it may not be needed between calibration cycles. However, it may be desirable to support communication of SLS commands or status between calibration cycles. For example, it may be desirable to use the SLS protocol to coordinate a change in bus width, as described further herein. In such instances, it would optionally be possible to periodically power up the line which was powered down at step 1420 between calibration in this interval to exchange status/control data. Alternatively, the line could be powered up in response to a command transmitted according to a higher level protocol (i.e., transmitted in a frame of functional data). It is alternatively possible to leave Line(ilast) powered up, e.g., for exchanging status and control information.

In one or more preferred embodiments, there are two redundant lines, one of which (Line(N+1)) is used for dynamic calibration, while the second (Line(N+2)) is used as a true spare. In the event of failure of any line (e.g., Line(k)) or its associated transmitter or receiver circuitry, for each Line(i), where i>k, switches 405, 406 cause Line(i) to assume the functions normally performed by Line(i−1), and disable any output of Line(k). Of course, there could be additional spares, or there might be only a single redundant line (used for calibration) with no additional spares, or there might be no redundant lines at all.

In one or more preferred embodiments, the parallel data link is bidirectional, and both halves of the link are dynamically calibrated, the procedure described above being repeated for both halves. While this could be done serially, in one or more preferred embodiments it is performed concurrently. Specifically, at approximately the same time that Line(i) is being calibrated at block 1404, an OLine(j), being a line of the same link transmitting data in a direction opposite to that of Line(i), is being calibrated in essentially the same manner. The index j is saved as jlast and decremented in the same manner as the index i at steps 1405 and 1406. Functional data is transmitted on both OLine(j) and OLine(jlast) in the same manner and at approximately the same time that functional data is transmitted on Line(i) and Line(ilast) at block 1410. The receiver switches for the OLines simultaneously enable OLine(jlast) and disable OLine(j), in the same manner and at approximately the same time that analogous actions are performed on Line(i) and Line(ilast) at block 1411. When the index j reaches zero, the OLines are returned to their initial state in a manner analogous to that described above with respect to blocks 1413-1420.

While the number of lines in each half of the link could be the same, this will often not be the case, and therefore the two halves of the link will not necessarily finish calibrating all lines at the same time (i.e., index j will not reach zero at the same time as index i). Furthermore, the frequency of calibration cycles may be the same for both halves of the link, or may be different. For example, each half of the link may independently tune the calibration cycle length, or may begin a new calibration cycle as soon as the previous cycle finishes. This means that blocks 1413-1420 are not necessarily performed at the same time for each half of the link. Since the time required to perform blocks 1413-1420 is relatively short compared to the time required to perform block 1404, where one half of the link is resetting its lines as illustrated in blocks 1413-1420 (referred to as "unshadowing"), the other half will simply wait until it is done, so that both begin calibration of the next line (block 1404) at approximately the same time.

The switching of different lines for performing calibration or transmitting functional data as described herein requires some degree of coordination between the two devices in communication with each other at opposite ends of the link. In one or more preferred embodiments, control data for coordinating the activities of the two devices is exchanged by time multiplexing the redundant lines used for calibration, as described in greater detail herein and illustrated in FIGS. 15-16.

In one or more preferred embodiments, a common calibration logic and control circuit 309 receives as inputs the aligned data outputs of each receiver synchronization circuit, and uses these outputs for calibration. This is digital logic data, not analog voltage levels. In one or more preferred embodiments, all calibration of the interface is performed with a common calibration circuit and using only the aligned data outputs of the receiver circuits. This embodiment avoids analog measurements and both the static and dynamic manipulation of high-speed latches into and out of the paths from each line in order to ensure and maintain the correct synchronization of the common calibration circuitry. By avoiding analog measurement and calibration circuitry and using a common calibration circuit, a significant amount of complexity and power associated with the calibration process is reduced. However, alternate techniques could be used for calibration.

Spare Lane Signaling Protocol

As explained previously, the switching of different lines for dynamic calibration, transmitting functional data, or powering down to reduce power involves coordination of the two devices at opposite ends of the link. Preferably, control information for coordinating these activities is exchanged on the same redundant lines which are also used for dynamic calibration. This is accomplished by time multiplexing between performing calibration activities and exchanging control information using a protocol called "Spare Lane Signaling" (SLS). If there is an interval between calibration cycles in which no line is currently being calibrated, the SLS commands can be transmitted on an unused line, temporarily powering the line up if necessary at SLS command intervals to transmit SLS commands. In the SLS protocol described herein, the dynamic calibration process is also referred to as "recalibration", since a line being dynamically calibrated has already undergone at least one calibration (at power-on reset), as well as possibly multiple previous iterations of dynamic calibration. These procedures are described in greater detail below, with reference to FIGS. 15-17.

Control information is transmitted on a single line by repeating an SLS command until some event occurs, such as a timeout or an acknowledgment is received from the intended recipient device. Each SLS command contains 8 consecutive serially transmitted bits ("beats") of the line, which are aligned on a half-byte boundary. The SLS command has the format '1' c0 c1 c2 '0' c3 c4 c5, where the '1' in the first beat distinguishes the first four beats of the SLS command from the second four. Thus, six bits are available for transmitting command data, allowing 64 possible different command types. Although several different command types are discussed herein, it will be appreciated that different and/or additional command types could be employed, e.g., to convey more detailed status information, to recover from errors, etc. Although referred to as an "SLS command", it is not necessarily a command to take some action, and may include any type of control information, including an acknowledgment, status information, or simply a null operation. (No-op). Moreover, although in the preferred embodiment control information for the parallel data link is used specifically to control calibration actions, to replace a faulty line with a spare, and to modify the logical bus width, control information in accordance with the present invention could include other and/or additional types of data for controlling the parallel link, such as control information for resetting the link, for recovery from errors, for diagnostics of link conditions, for measurement of link performance, for power management of link components, and so forth.

Data on the line selected for calibration is fed into calibration logic and control circuit 309 after processing through the corresponding receiver synchronization circuit 404, where it is captured in static pattern detector 507. Static pattern detector 507 will detect that a received SLS command has been repeated some minimum number of times, triggering a response in the receiver after the minimum number is met. Since the 8-bit SLS command is simply repeated on the line during a time interval, prior signaling or close coupling of the transmitter and receiver are unnecessary, as long as the receiver will look at the SLS command some time in the corresponding interval that it is being transmitted. The protocol allows the spare line which is used for calibration to also support low bandwidth exchange of control information, without the need for additional control lines.

Figure 15A:
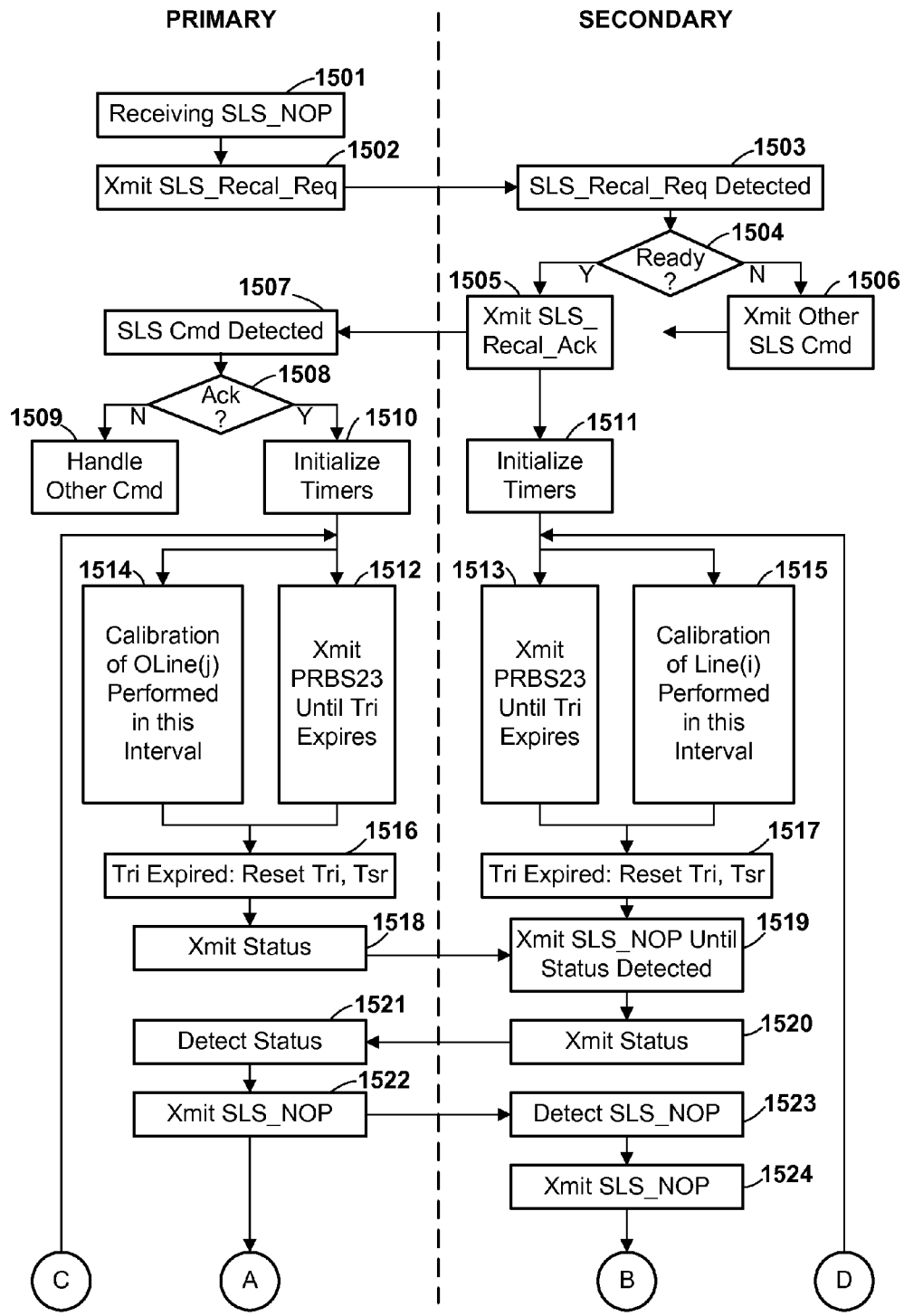
FIGS. 15A and 15B (herein collectively referred to as FIG. 15) are a flow diagram showing a process of exchanging control information and time multiplexing of function for dynamically calibrating a pair of lines of a parallel link, according to one or more preferred embodiments.
Figure 15B:
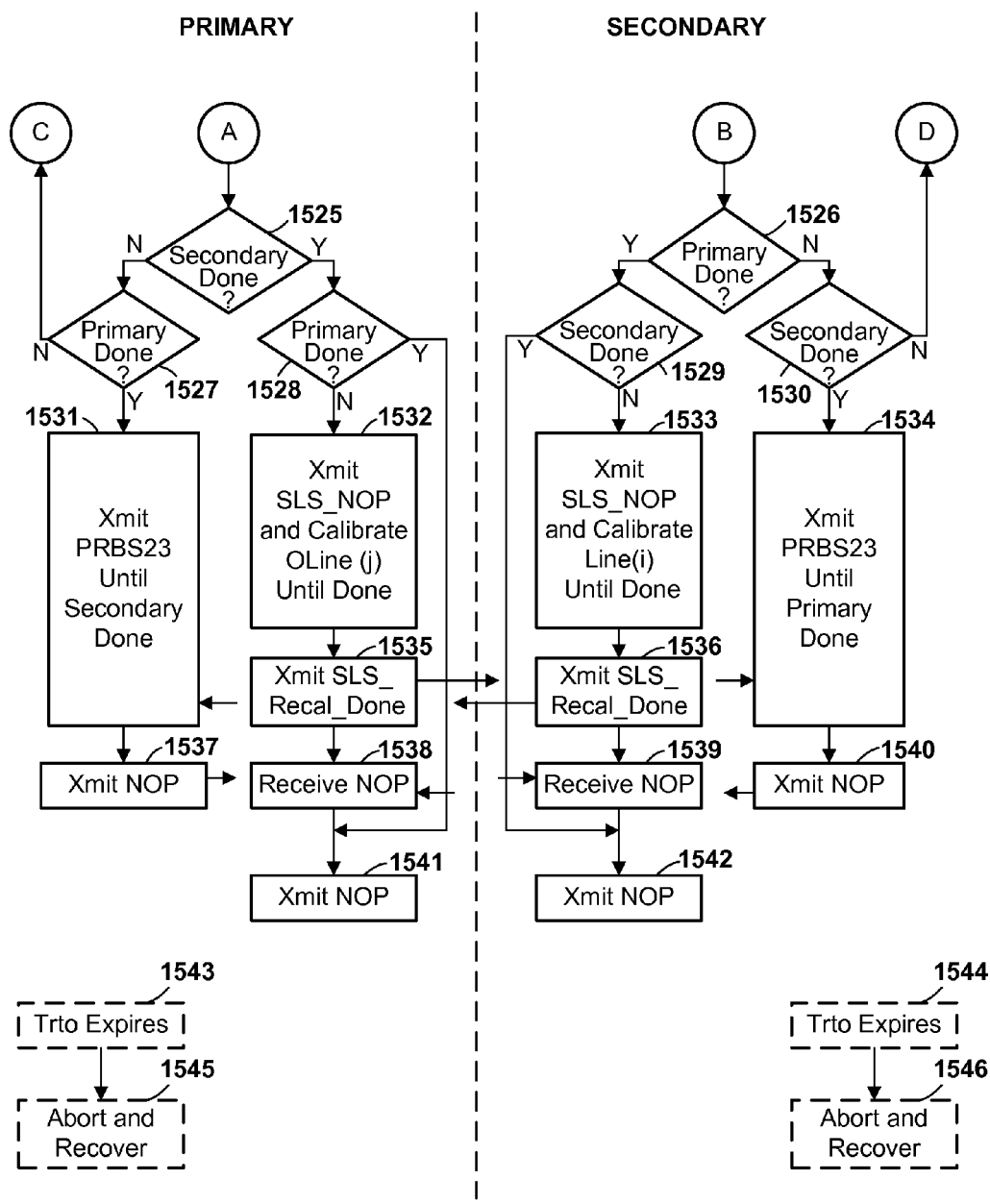

FIGS. 15A and 15B (herein collectively referred to as FIG. 15) are a flow diagram showing a process of exchanging control information and time multiplexing of function for dynamically calibrating a pair of lines of a parallel link, the two lines of the pair conveying data in opposite directions, according to one or more preferred embodiments. I.e., FIG. 15 illustrates in greater detail the exchange of control information and time multiplexing of function involved in performing block 1404 of FIG. 14.

Referring to FIG. 15, one of the two devices coupled by the link is arbitrarily designated the "primary", while the other is designated the "secondary". This designation is purely arbitrary, and is only employed to resolve priority in the event that both devices simultaneously issue a request, as explained in greater detail herein. It does not necessarily imply any other subservient or hierarchical relationship between the two devices. Actions performed by the primary are illustrated on the left side of the central division line in FIG. 15, while actions performed by the secondary are illustrated on the right side.

At the beginning of calibration, Line(i) from the primary to the secondary and OLine(j) from the secondary to the primary are powered on and are the next lines to be calibrated, while N other lines are transmitting functional data. The primary has finished any switching of previously calibrated lines (blocks 1410 and 1411 of FIG. 14), and is in a quiescent state. In this state, the primary is repeatedly transmitting an SLS no-operation (SLS_NOP) command on Line(i) to the secondary, and is receiving an SLS_NOP command on OLine(j) from the secondary, indicating that the secondary is probably finished with any line switching and ready to calibrate (block 1501).

The primary then initiates the calibration by repeatedly sending an SLS recalibration request (SLS_Recal_Req) to the secondary on Line(i) (block 1502). The SLS recalibration request is detected by a static pattern detector in the calibration circuit (block 1503). If the secondary is ready to begin calibration (the 'Y' branch from block 1504), it stops transmitting SLS_NOP, and repeatedly transmits an SLS recalibration acknowledgment (SLS_Recal_Ack) to the primary on OLine(j) (block 1505). If the secondary is not ready to begin calibration (the 'N' branch from block 1504), it stops transmitting SLS_NOP and repeatedly transmits an alternative SLS command on OLine(j) (block 1506). For example, if the secondary is still performing switching of lines (as shown in blocks 1410-1411 or blocks 1413-1420 of FIG. 14), the secondary would transmit an appropriate next command in the sequence of switching lines.

The primary receives the SLS_Recal_Ack or alternative command from the secondary on OLine(j) (block 1507). If the command is anything other than an SLS_Recal_Ack (the 'N' branch from block 1508), the primary stops transmitting SLS_Recal_Req, and responds as appropriate to the alternative command (block 1509). If the command received from the secondary is an SLS_Recal_Ack (the 'Y' branch from block 1508), the primary initializes a set of timers (block 1510). At approximately the same time, the secondary initializes a corresponding set of timers (block 1511).

Calibration and time multiplexing of SLS commands is preferably governed by three timers, which could use selectable values. A recalibration timeout (Trto), usually in the multiple-millisecond range, is used to abort calibration if one or both lines fail to properly calibrate in a reasonable time. A recalibration interval (Tri), usually in the multiple-microsecond range, is used to define the length of time for sending the PRBS23 bit pattern and performing calibration operations at the receiver. A status reporting interval, Tsr, usually in the sub-microsecond range, is used to define which portion of the recalibration interval is used to send and receive status via SLS commands. The timers in the primary and secondary are not necessarily synchronized to begin at precisely the same moment, but the nature of the SLS protocol accommodates small discrepancies in the timers which inevitably result from the time required to propagate and detect the SLS command.

Upon initializing the Trto and Tri timers at blocks 1510, 1511, the primary repeatedly transmits the PRBS23 test pattern on Line(i) (block 1512), and the secondary repeatedly transmits the PRBS23 test pattern on OLine(j) (block 1513), until the expiration of the Tri timers in the primary and secondary. During this interval, both the primary and the secondary perform calibration actions as described above with respect to the receiver synchronization circuit for OLine(j) and the receiver synchronization circuit for Line(i), respectively (blocks 1514 and 1515).

Upon expiration of the Tri timers, calibration actions are suspended in the primary and the secondary. The Tri and Tsr timers are reset in both the primary (block 1516) and the secondary (block 1517). The primary then repeatedly transmits its status (as an appropriate SLS command) to the secondary on Line(i) (block 1518), while the secondary initially transmits SLS_NOP to the primary on OLine(j) until the primary's status is detected (block 1519). When the secondary detects the primary's status on Line(i), it then stops transmitting SLS_NOP, and repeatedly transmits its own status on OLine(j) (block 1520). The primary, upon detecting the secondary's status on OLine(j) (block 1521), takes this as an acknowledgment from the secondary that the secondary has successfully detected the primary's status, and responds by transmitting SLS_NOP on Line(i) (block 1522). The secondary, upon detecting SLS_NOP from the primary (block 1523), stops transmitting status and transmits SLS_NOP on OLine(j) (block 1524). The primary and secondary continue to transmit SLS_NOP on their respective lines until the respective Tsr timers expire. Because recalibration is not necessarily complete, in order to properly receive status data, the calibrated coefficients of the receiver synchronization circuits are restored to their respective states before dynamic recalibration was commenced while receiving during the Tsr interval.

Upon expiration of the Tsr timers, both the primary and secondary should have each other's current state. (In the unlikely event the Tsr timers expire before the primary or secondary detects the other's status, the device which did not detect status simply assumes that the other has not finished calibration, and proceeds accordingly.) If neither the primary nor the secondary has finished recalibration (the 'N' branches from blocks 1525 and 1527, and the 'N' branches from blocks 1526 and 1530), then the primary and secondary return to blocks 1512, 1514 and 1513, 1515, respectively to again transmit the PRBS23 test pattern on Line(i) and OLine(j), respectively, and resume calibration of the receiver synchronization circuits in OLine(j) and Line(i), respectively, until Tri again expires.

If the primary has finished recalibration of the receiver synchronization circuit for OLine(j) but the secondary has not finished recalibration of the receiver synchronization circuit for Line(i) (the 'N' branch from block 1525 and 'Y' branch from block 1527 in the primary, and the 'Y' branch from block 1526 and the 'N' branch from block 1529 in the secondary), then the primary transmits the PRBS23 pattern on Line(i) while listening for status on OLine(j) (block 1531). The secondary meanwhile transmits SLS_NOP on OLine(j) while continuing to calibrate the receiver synchronization circuit for Line(i) (block 1533). When the secondary finishes recalibration of Line(i), it transmits an appropriate SLS_Recal_Done status command OLine(j) (block 1536). The primary, upon detecting the status command, ceases transmitting PRBS23, and transmits SLS_NOP on Line(i) (block 1537). The secondary, upon detecting SLS_NOP on Line(i) (block 1539), ceases transmitting status and transmits SLS_NOP on OLine(j) (block 1542)

An analogous procedure is followed if the secondary has finished recalibration of the receiver synchronization circuit for Line(i) but the primary has not finished recalibration of the receiver synchronization circuit for OLine(j) (the 'Y' branch from block 1525 and 'N' branch from block 1528 in the primary, and the 'N' branch from block 1526 and the 'Y' branch from block 1530 in the secondary). The secondary transmits the PRBS23 pattern on OLine(j) while listening for status on Line(i) (block 1534). The primary meanwhile transmits SLS_NOP on Line(i) while continuing to calibrate the receiver synchronization circuit for OLine(j) (block 1532). When the primary finishes recalibration of OLine(j), it transmits an appropriate SLS_Recal_Done command on Line(i) (block 1535). The secondary, upon detecting the status command, ceases transmitting PRBS23, and transmits SLS_NOP on OLine(i) (block 1540). The primary, upon detecting SLS_NOP on OLine(j) (block 1538), ceases transmitting status and transmits SLS_NOP on Line(i) (block 1541).

If both the primary and the secondary have finished recalibration of their respective receiver synchronization circuits (the 'Y' branches from blocks 1525 and 1528 in the primary, and the 'Y' branches from blocks 1526 and 1529 in the secondary), then the primary and secondary transmit SLS_NOP on Line(i) and OLine(j), respectively (blocks 1541, 1542)

Throughout the performance of blocks 1512 through 1539, the Trto timers are running in the primary and secondary devices. If these timers timeout (represented as blocks 1543, 1544), further calibration processing is immediately aborted, and appropriate recovery actions are taken (represented as blocks 1545, 1546). The Trto timers thus prevent calibration from continuing indefinitely, where more than adequate time for performing calibration has already elapsed. The recovery actions would depend on the circumstances. In the preferred embodiment, where a single line can not be calibrated, it is deactivated and an available spare line in the active but unused state is substituted as a replacement. Some problems may require suspension of functional data transmission and/or re-initialization of the entire link, but it is expected that this will only rarely occur.

Figure 16:
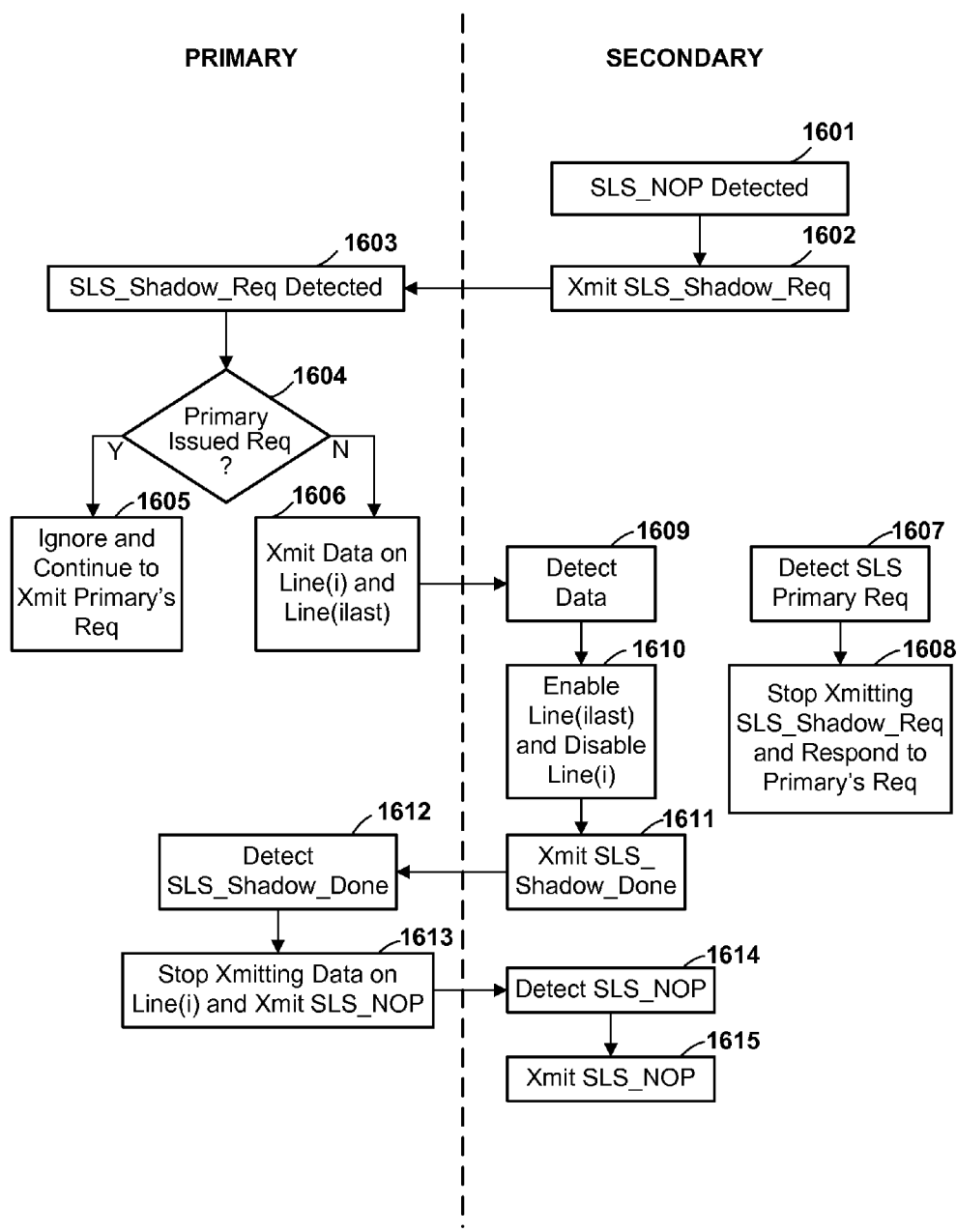
FIG. 16 is a flow diagram showing a process of exchanging control information and switching functional data from a line to be calibrated to a recently calibrated line, according to one or more preferred embodiments.

FIG. 16 is a flow diagram showing a process of exchanging control information and switching functional data from a Line(i) to a Line(ilast), immediately after calibrating Line(ilast), according to one or more preferred embodiments. I.e., FIG. 16 illustrates in greater detail the exchange of control information involved in performing blocks 1410-1411 of FIG. 14, a process referred to as "shadowing". FIG. 16 shows the process of switching lines calibrated by the secondary; the switching of lines calibrated by the primary is similar, with some differences noted below. Switching of the lines in the opposite direction, after all lines have been calibrated (i.e. blocks 1413-1420 of FIG. 14) is referred to as "unshadowing".

Referring to FIG. 16, actions performed by the primary are illustrated on the left side of the central division line in FIG. 16, while actions performed by the secondary are illustrated on the right side. At the beginning of switching, the redundant line from the primary to the secondary is Line(ilast), Line(ilast) having just been calibrated. The secondary is in a quiescent state, and is receiving SLS_NOP on the redundant Line(ilast) (block 1601)

The secondary initiates the process by repeatedly transmitting an SLS shadow request (SLS_Shadow_Req) on the current redundant OLine (block 1602). The primary detects the SLS_Shadow_Req (block 1603). If the primary has already issued its own shadow request (or unshadow request or other primary request, such as a change of bus width) to the secondary (the 'Y' branch from block 1604), the primary will continue to transmit its request on Line(ilast) and ignore the secondary's shadow/unshadow request, waiting for the secondary to acknowledge the primary's request (block 1605). If the primary has not issued a shadow, unshadow or other request (the 'N' branch from block 1604), the primary begins transmitting functional data on Line (ilast) as it continues to transmit identical functional data on Line(i) (block 1606).

After issuing the SLS_Shadow_Req, the secondary listens on Line(ilast) for something other than SLS_NOP. If the secondary detects an SLS_Shadow_Req or some other SLS request from the primary (block 1607), the secondary stops transmitting its own SLS_Shadow_Req, and responds to the primary's request (block 1608); e.g. in the case of an SLS_Shadow_Req from the primary, the secondary begins transmitting identical copies of functional data on OLine(j) and OLine(jlast). I.e., the secondary defers to the primary, allowing the primary's request to proceed. If the secondary instead detects functional data on Line(ilast) (block 1609), the secondary operates the appropriate switches 406 to enable output from Line(ilast) and disable output from Line(i) (block 1610). It will be observed that, prior to switching, both Line(i) and Line(ilast) are receiving identical data and that the data output from the respective receiver synchronization circuits associated with Line(i) and Line (ilast) are synchronized on the same clock with respect to each other. Therefore switching from Line(i) to Line(ilast) is not visible to downstream functional logic within the secondary device.

After switching lines, the secondary transmits SLS_shadow_done to the primary on the redundant OLine (block 1611). The primary detects SLS_shadow_done (block 1612). The primary then stops transmitting functional data on Line(i), and begins transmitting SLS_NOP on Line(i), indicating that Line(i) is now to be used as the redundant line for SLS commands and calibration (block 1613). The secondary detects SLS_NOP on Line(i) (block 1614), and responds by discontinuing SLS_Shadow_Done on the redundant OLine, and instead transmitting SLS_NOP on the redundant OLine (block 1615).

Either the primary or the secondary may issue an SLS_Shadow_Req, and in any order. However, the two requests can not be performed concurrently, because the handshaking protocol requires that redundant lines be available in both directions for handling a single request. One device will perform shadowing (or unshadowing) of its receivers, and the other device will then perform shadowing (or unshadowing). To address the possibility that both primary and secondary will simultaneously issue the SLS_Shadow_Req, the primary's request is given priority. Therefore, a request issued by the primary mirrors the procedure shown in FIG. 16 with sides reversed, except that blocks 1604, 1605, 1607, and 1608 are unnecessary. I.e., blocks 1604 and 1605 are unnecessary because the primary's shadow request will assume priority, so if the secondary detects a request from the primary as at block 1603, it will simply transmit identical copies of the data on the two lines as at block 1606, whether or not it has also issued an SLS_Shadow_Req or other request. In this case, transmitting identical copies of the data has the effect of cancelling any request from the secondary, since the redundant line (which was being used to transmit the secondary's request) is now being used to transmit a second copy of functional data. Similarly, blocks 1607 an 1608 are unnecessary in the primary, because the primary ignores any request from the secondary if it has issued its own request.

An analogous procedure is followed to switch functional data from Line(i) to Line(ilast) when returning the lines to their initial state after all lines have been calibrated, i.e., when performing steps 1417-1418 of FIG. 14, a process known as "unshadowing". An SLS unshadow request (SLS_Unshadow_Req) is issued at block 1602 instead of the SLS_Shadow_Req. The unshadow request tells the receiving device that lines will be switched in a direction opposite to that of the shadowing request. The receiving device responds by transmitting a copy of functional data on Line(ilast) which is the same as the currently transmitted functional data on Line(i), as at block 1606. The requesting device follows by enabling Line(ilast) and disabling Line(i), as at block 1610.

The SLS_Shadow_Req and the SLS_Unshadow_Req can also be used to shift lines in either direction in the event that a faulty line is detected and must be replaced.

Coordinating a Change of Logical Bus Width

When the buffer monitor 1204 detects a condition indicating that a change in logical bus width (either a reduction or increase in bus width) should take place, the activities of both the transmitter and receiver devices are coordinated so that the receiver is correctly interpreting transmissions from the transmitter. Preferably, any change in bus width occurs in a gap between data frames of functional data being transmitted to reduce the complexity of coordinating the change and/or possibility of data corruption, although it may alternatively be possible to change bus width in the middle of a frame. I.e., as is well known, data is transmitted in discrete units (herein called frames, although other terms can be used), each containing control information such as start/stop patterns, length, cyclic redundancy check data, and so forth.

The activities of the transmitter and receiver may be coordinated using the SLS protocol. Alternatively, they may be coordinated by using one or more reserved control lines, i.e., lines which are reserved for control signals and not used for transmitting functional data. A reserved control line could be a line which is never used for any other purpose. Alternatively, it could be a spare line which is not currently being used for functional data, but is available for use to carry functional data in the event that another line fails (in this case, the capability to use the line for control signals would be lost, and some alternative technique such as the SLS protocol could be used for changing bus width). When compared with the SLS protocol, the use of reserved control lines has the obvious disadvantage of requiring additional lines, but it is also significantly faster than the SLS because control signals can be transmitted at any time, without waiting for an SLS transmission interval. The use of reserved control lines and rapid re-synchronization of the receiver as disclosed herein supports changing of the logical bus width more frequently, to the point where bus width could be changed (i.e. some of the lines powered down) whenever there is no data in the transmit buffer, and powered back up when there is data available for transmission. In one or more preferred embodiments, the interface clock line 413 and at least one data line 302 remain powered up at all times even when there is no data to transmit, to help maintain synchronization; however, in some embodiments it may be possible to power down all data lines. There are potentially other ways to coordinate changing the logical bus width, e.g., commands transmitted in a functional data protocol, but these involve additional complexity and/or delay.

Figure 17:
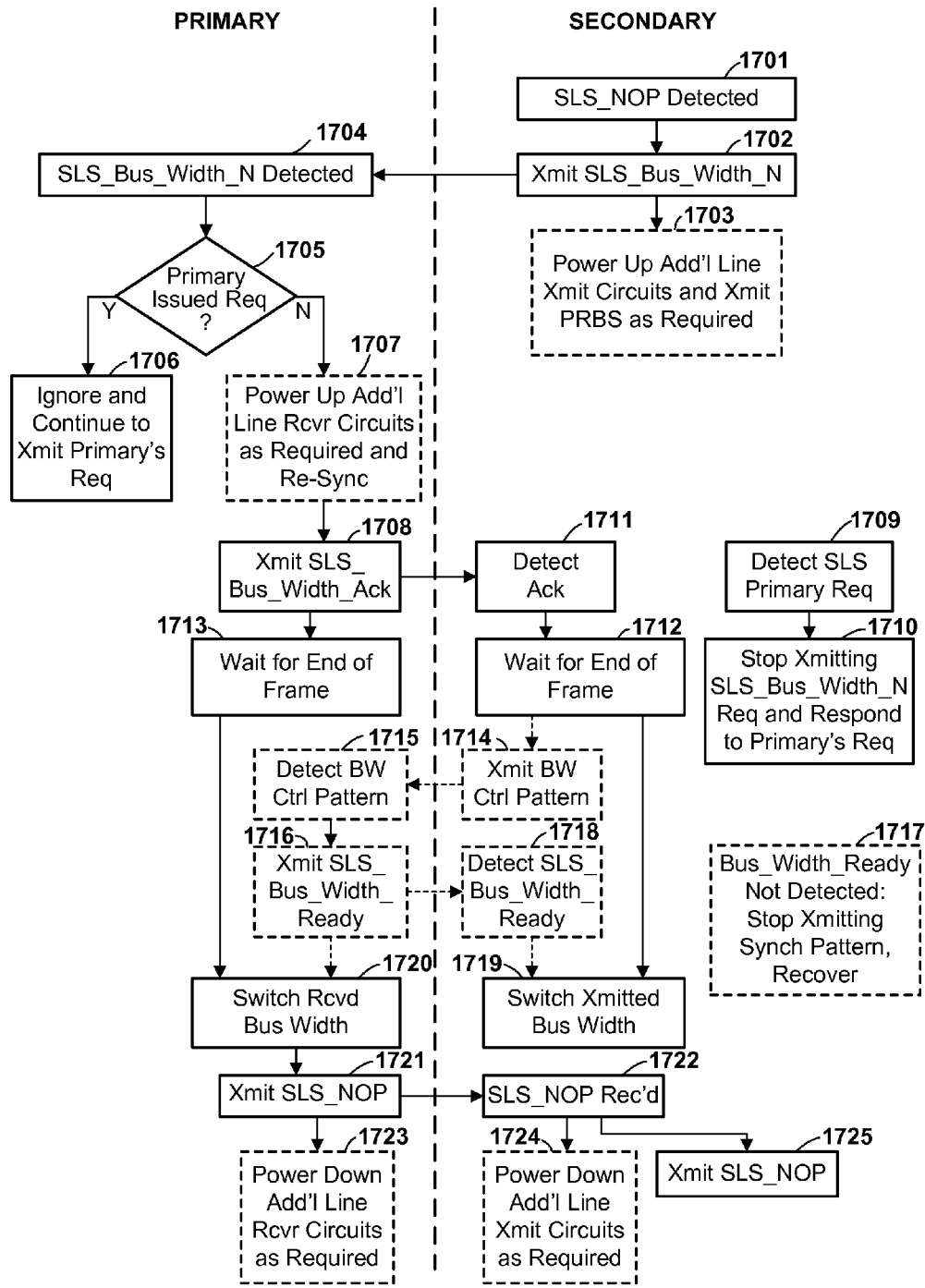
FIG. 17 is a flow diagram showing a process of exchanging control information and changing the logical width N of the bus, according to one or more preferred embodiments.

FIG. 17 is a flow diagram showing a process of exchanging control information and changing the logical width N of the bus, according to one or more preferred embodiments. FIG. 17 particularly illustrates the use of the SLS protocol to coordinate a change in logical bus width; the use of reserved control lines is similar, as explained in further detail below. The same basic procedure is followed with slight variations whether the bus width is increased or decreased, and both are represented by FIG. 17. Preferably, each unidirectional half 301 of bus 201 can independently change its bus width, a bus width change in each unidirectional half always being initiated by the transmitting device for that half. FIG. 17 shows the process of changing bus width when the transmitting device is the secondary; the change of bus width when the primary is the transmitter is similar, with some differences noted below.

Referring to FIG. 17, actions performed by the primary are illustrated on the left side of the central division line in FIG. 17, while actions performed by the secondary are illustrated on the right side. At the beginning of switching, the secondary is not currently processing an SLS command, and is receiving SLS_NOP on the OLine being used for transmission of SLS commands from primary to secondary (block 1701).

The secondary initiates the process by repeatedly transmitting an SLS bus width request (SLS_Bus_Width_N) on the Line being used for by the secondary for SLS command transmission (block 1702). The SLS_Bus_Width_N request specifies a new bus width of N, which may be greater or less than the current bus width. The SLS_Bus_Width_N request may be issued at the same that a frame of functional data is being transmitted on other lines of the interface, i.e. in the middle of the frame, although the actual switching of bus width will take place between frames. If the new bus width N is greater than the current bus width, the secondary simultaneously powers up additional transmitter circuits as required to support the expanded bus width, and begins transmitting the PRBS23 pattern on the lines that have just been powered up (represented as optional block 1703, in dashed lines). The primary detects the SLS_Bus_Width_N request (block 1704). If the primary has already issued a different SLS request, such as a shadow/unshadow request, to the secondary (the 'Y' branch from block 1705), the primary will continue to transmit its request on the appropriate OLine being used for SLS commands, and ignore the secondary's SLS_Bus_Width_N request, waiting for the secondary to acknowledge the primary's request (block 1706). If the primary has not issued a different request (the 'N' branch from block 1705), then if the request involves an increase in bus width, the primary powers up as many additional receiver synchronization circuits as will be required to support the additional bus width, and the activates the corresponding clock resync circuit 514 in each powered up receiver synchronization circuit to re-synchronize the clock divider 510 and unload counter 516, as described in greater detail above with respect to FIGS. 9-11 (represented as optional block 1707 in dashed lines). After powering up and re-synchronizing any additional receiver circuits as required, the primary transmits an acknowledgment (SLS_Bus_Width_Ack) to the secondary, indicating that the change in bus width may proceed (block 1708).

After issuing the SLS_Bus_Width_N request, the secondary listens on the OLine for something other than SLS_NOP from the primary. If the secondary detects an SLS request initiated by the primary (block 1709), the secondary stops transmitting its own SLS_Bus_Width_N request, and responds appropriately to the primary's request (block 1710). I.e., the secondary defers to the primary, allowing the primary's request to proceed.

If the secondary instead detects SLS_Bus_Width_Ack on the appropriate OLine (block 1711), then the bus width change may proceed. Since the change should occur between the transmission of frames of functional data, the secondary waits for the end of any frame of functional data currently being transmitted (block 1712). Upon reaching end of frame, the secondary switches bus width in the transmitter circuitry, before beginning transmission of the next frame (step 1719). If a next frame is already waiting in the transmit buffer, this may require that further transmission of functional data from the buffer be paused a small number of cycles to coordinate bus width change. At the same time, the primary, after transmitting Bus_Width_Ack, waits for the end of the current frame (if any) (block 1713), and then switches bus width in the receiver circuitry (block 1720).

As above described, the switch of transmitter and receiver circuitry to a new bus width will not necessarily occur on exactly the same bus beat, but as long as it occurs between data frames this should not matter. If for any reason it is deemed desirable to enforce switching on the same bus beat, an optional procedure represented by blocks 1714-1718 could be employed.

In this optional procedure, upon detecting the end of the current frame at block 1712, the secondary stops transmitting SLS_Bus_Width_N, and begins transmitting a bandwidth control pattern having a single bandwidth change beat within the pattern (block 1714). Since the secondary, as the transmitting device, may know the timing of frame end in advance, it could begin transmitting the bandwidth control pattern at block 1714 a sufficient number of cycles in advance of frame end to ensure that the change occurs after frame end. Upon detecting the beginning of the bandwidth control pattern (block 1715), the primary stops transmitting SLS_Bus_Width_Ack, and transmits SLS_Bus_Width_Ready (block 1716). The transmission of SLS_Bus_Width_Ready indicates that the primary is ready to switch bus width at the corresponding bandwidth change beat.

If the secondary does not detect SLS_Bus_Width_Ready before the bus cycle in which the bandwidth change beat occurs, it halts transmission of the bandwidth control pattern, preventing the primary from switching bus width, and takes appropriate action to recover (block 1717). Such action could include re-trying the SLS_Bus_Width_N request or any other appropriate recovery action. If SLS_Bus_Width_Ready is detected in sufficient time (block 1718), the secondary switches bus width in the transmitter circuitry on the bandwidth change bit (block 1719). The primary, which is receiving the bandwidth control pattern, also switches bus width in the receiver circuitry on the same bandwidth change beat (block 1720).

After changing bus width, the primary stops transmitting SLS_Bus_Width_Ready and transmits SLS_NOP (block 1721) to inform the secondary that bus width was successfully switched. If the bus width was reduced, the primary then powers down any additional receiver circuits that are no longer needed as a result of reduced bus width (represented as optional block 1723 in dashed lines).

The secondary detects SLS_NOP (block 1722), and analogously, the secondary powers down any unneeded transmitter circuits (optional block 1724 in dashed lines). The secondary then transmits SLS_NOP on the appropriate command line (block 1725).

Either the primary or the secondary may issue an SLS_Bus_Width_N request, and in any order. However, two SLS requests can not be performed concurrently (either SLS_Bus_Width or various unshadowing requests, discussed earlier), because the handshaking protocol requires that the command line be available in both directions for handling a single request. To address the possibility of a simultaneous SLS request from both primary and secondary, the primary's request is given priority. Therefore, an SLS_Bus_Width_N request issued by the primary mirrors the procedure shown in FIG. 17 with sides reversed, except that blocks 1705, 1706, 1709, and 1710 are unnecessary. I.e., blocks 1705 and 1706 are unnecessary because the primary's request will assume priority, so if the secondary detects a request from the primary as at block 1704, it will simply power up circuits as needed and issue the SLS_Bus_Width_Ack, whether or not it has also issued a request of its own. In this case, transmitting the SLS_Bus_Width_Ack has the effect of cancelling any request from the secondary. Similarly, blocks 1709 an 1710 are unnecessary in the primary, because the primary ignores any request from the secondary if it has issued its own request.

Essentially the same procedure would be followed if a pair of reserved control lines, one for communicating in each direction, were used instead of the SLS protocol, but the procedure would operate significantly faster because there would be no need to wait for the calibration Tri time to expire when performing calibration and subsequent SLS_NOP. A device wishing to initiate bus width change would simply transmit the appropriate command on the reserved control line (analogous to block 1702) and power up lines as required (block 1703). The other device would receive the command (analogous to bock 1704), and if no interfering command were issued, power up and re-sync lines as required (block 1707), and transmit an acknowledgment back the requestor on the complementary reserved control line (analogous to block 1708). The device would then wait for the end of frame (blocks 1712,1713) and switch bus width (blocks 1719, 1720). An appropriate acknowledgment could then be sent by each device, analogous to the SLS_NOP at blocks 1721, 1722 and 1725.

In the above described procedure, a bandwidth control pattern is transmitted to coordinate a change in bus width on the same bus cycle or within a small number of cycles between frames. However, it would not be necessary to use such a closely coupled protocol. For example, it would alternatively be possible to transmit bus width change commands as part of a higher level command protocol, in which commands are embedded in frames in the functional data stream. In such a case, it may be necessary to halt the bus briefly between frames while changing the bus width.

Design Structure

Figure 18:
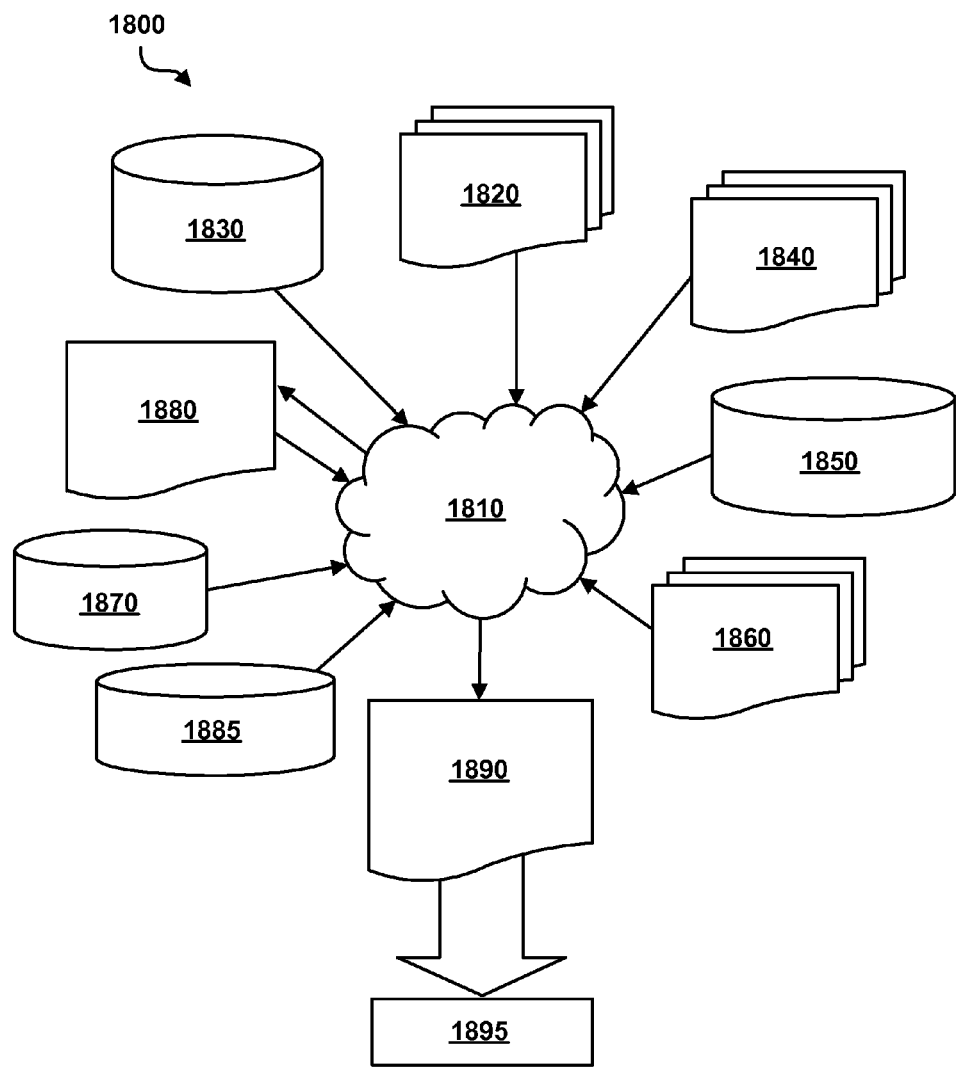
FIG. 18 is a flow diagram of a design process used in semiconductor design, manufacture and/or test.

FIG. 18 shows a block diagram of an exemplary design flow 1800 used for example, in semiconductor design, manufacturing, and/or test. Design flow 1800 may vary depending on the type of IC being designed. For example, a design flow 1800 for building an application specific IC (ASIC) may differ from a design flow 1800 for designing a standard component. Design structure 1820 is preferably an input to a design process 1810 and may come from an IP provider, a core developer, or other design company or may be generated by the operator of the design flow, or from other sources. Design structure 1820 comprises an embodiment of any aspect of the invention as shown in any of FIGS. 1-17 in the form of schematics or HDL, a hardware-description language (e.g., Verilog, VHDL, C, etc.). Design structure 1820 may be contained on one or more machine readable medium. For example, design structure 1820 may be a text file or a graphical representation of an embodiment of any aspect of the invention as shown in any of FIGS. 1-17. Design process 1810 preferably synthesizes (or translates) an embodiment of any aspect of the invention as shown in any of FIGS. 1-17 into a netlist 1880, where netlist 1880 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which netlist 1880 is resynthesized one or more times depending on design specifications and parameters for the circuit.

Design process 1810 may include using a variety of inputs; for example, inputs from library elements 1830 which may house a set of commonly used elements, circuits, and devices, including models, layouts, and symbolic representations, for a given manufacturing technology (e.g., different technology nodes, 32 nm, 45 nm, 90 nm, etc.), design specifications 1840, characterization data 1850, verification data 1860, design rules 1870, and test data files 1885 (which may include test patterns and other testing information). Design process 1810 may further include, for example, standard circuit design processes such as timing analysis, verification, design rule checking, place and route operations, etc. One of ordinary skill in the art of integrated circuit design can appreciate the extent of possible electronic design automation tools and applications used in design process 1810 without deviating from the scope and spirit of the invention. The design structure of the invention is not limited to any specific design flow.

Design process 1810 preferably translates an embodiment of any aspect of the invention as shown in any of FIGS. 1-17, along with any additional integrated circuit design or data (if applicable), into a second design structure 1890. Design structure 1890 resides on a storage medium in a data format used for the exchange of layout data of integrated circuits and/or symbolic data format (e.g. information stored in a GDSII (GDS2), GL1, OASIS, map files, or any other suitable format for storing such design structures). Design structure 1890 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce an embodiment of any aspect of the invention as shown in any of FIGS. 1-17. Design structure 1890 may then proceed to a stage 1895 where, for example, design structure 1890: proceeds to tape-out, is released to manufacturing, is released to a mask house, is sent to another design house, is sent back to the customer, etc.

Other Variations

In one or more preferred embodiments described above, the line being used for calibration is shifted one at a time, up and down the bus, and if a line(k) is replaced with a spare (e.g., by Line($N_{MAX}$+2)), this is also accomplished by shifting each line with index greater than k by one. It would alternatively be possible to provide a single dedicated line for calibration, and to shift functional data from each functional line to the dedicated line while the functional line is being calibrated. Similarly, as an additional alternative, it would be possible to map any replaced line directly to the spare line, so that intermediate lines are not shifted. While there may be some advantages to this approach, this would require a large multiplexor in the transmitter to allow any line's functional data to be sent on the dedicated calibration line and/or the spare line or lines, which could involve critical timing and wiring problems, and the approach described herein is therefore believed to be preferable for most applications. As a further alternative, it would be possible to provide an additional calibration line for each functional data line, the calibration line being used for calibrating its corresponding data line, as is known in certain parallel data interfaces; this approach has the advantage of less complex switching, but obviously requires more physical lines (and associated transmitter/receiver circuits).

In one or more preferred embodiments, a unidirectional link half contains at least ($N_{MAX}$+2) lines, where one of the redundant lines is used to support dynamic calibration and the second is a true spare, which is normally continuously calibrated and in the active but unused state. However, in any of various alternative embodiments, it would be possible to support a unidirectional link half containing fewer than ($N_{MAX}$+2) lines. For example, in one such alternative, a link half contains ($N_{MAX}$+1) lines, and contains no true spare line for use only in the event of a fault. Instead, in the event of a fault, the faulty line is deactivated (leaving $N_{MAX}$ active lines), and the logical bus width is decreased to ($N_{MAX}$−1) or fewer lines, so that at any instant in time, only ($N_{MAX}$−1) or fewer lines are used for carrying functional data while the $N_{MAX}$th active line is disabled from carrying functional data and available to be calibrated and/or transmit SLS commands. The line being calibrated would rotate among the $N_{MAX}$ active lines on a round-robin basis as described previously. As a further alternative, a link might contain only $N_{MAX}$ lines and be calibrated by other means which do not require a redundant line. For example, special calibration circuitry, which may include one or more lines used only for calibration purposes, may exist which supports calibration concurrently with data transfer on the same line. Alternatively, one or more lines on a bus may be halted temporarily while being calibrated, allowing the bus to operated temporarily at reduced logical width during calibration.

In one or more preferred embodiments, a receiver synchronization circuit which produces synchronized data in a common clock domain is used to provide input to the switches as well as to the calibration circuit. This circuit arrangement is considered desirable because it enables the switches and the calibration circuit to be enabled in relatively low-power digital logic, and accommodates large data skew through the use of low-power deskew buffers as disclosed. However, the present invention is not necessarily limited to use in a receiver synchronization circuit as disclosed herein, one or more lines may be temporarily powered down and re-synchronized upon power up in circuits of different type, including, without limitation, receiver circuits which are calibrated in a substantially different manner and/or are of a type previously known in the art and/or are of a type subsequently developed.

In one or more preferred embodiments described above, all calibration adjustments, and particularly the adjustment of the local clock phase, are performed within the receiver synchronization circuit. Adjusting the receiver circuitry to accommodate variations in the individual lines is preferred, because calibration logic which analyzes the outputs of the receiver synchronization circuits is located in the same device. However, it will be appreciated that variations in the parameters of individual lines and their associated circuits could alternatively be compensated in whole or in part by adjustments performed in the transmitter circuits. In particular, it would be possible to individually adjust a local clock for each transmitter circuit so that the outputs produced by the receiver synchronization circuits are in a common clock domain. It is possible that other parameters, such as a variable gain or an offset, might also be adjusted within the transmitter.

In one or more preferred embodiments described above, a bidirectional parallel data link contains separate unidirectional portions each having at least one redundant line, and the redundant lines are used to transmit control signals using the SLS protocol as described herein. This approach has the advantage of utilizing the existing redundant lines for exchanging control information, obviating the need for additional control lines for that purpose. However, it would alternatively be possible to provide control information for purposes of coordinating calibration by other means, in particular by use of one or more additional control lines, or by interrupting functional data to transmit control information on the functional data lines. Additionally, while it is preferred that a point-to-point link be bidirectional, the link could alternatively be unidirectional, i.e. a unidirectional set of lines 301 as shown in FIG. 3 could exist independently, without any lines for transmitting data in the opposite direction. In this case, there should be alternative means for transmitting control signals in the opposite direction for purposes of coordinating calibration actions described above.

In one or more preferred embodiments described above, a separate PRBS generator is associated with each transmitter circuit and with each receiver synchronization circuit, the PRBS signals for each of the lines being out of phase with respect to one another. There are certain advantages to transmitting the PRBS signals on different lines at different phases when multiple lines are transmitting a PRBS signal. However, in one or more alternative embodiments, a common PRBS generator in the transmitter provides the PRBS signal for transmission on multiple lines and a common PRBS generator in the receiver is used for re-synchronization.

Although a specific embodiment of the invention has been disclosed along with certain alternatives, it will be recognized by those skilled in the art that additional variations in form and detail may be made within the scope of the following claims.

What is claimed is:

1. A communications mechanism for communicating between digital data devices, comprising:
   a respective receiver synchronization circuit associated with each of a first plurality of parallel lines supporting a parallel communications link for communicating data in a first direction from a first digital data device to a second digital data device, each respective receiver synchronization circuit being in the second digital data device, each receiver synchronization circuit outputting respective received data in a common clock domain;
   a power saving mechanism for temporarily powering down one or more respective components of each of one or more of said receiver synchronization circuits;
   a receiver re-synchronization mechanism which re-synchronizes the respective receiver synchronization circuit associated with each temporarily powered down line of said first plurality of parallel lines upon re-powering the line by matching a pre-determined data pattern transmitted by a respective transmitter circuit associated with the respective line in the first digital device with a corresponding pre-determined data pattern generated by the second digital data device to determine an adjustment of at least one parameter required for re-synchronization of the respective receiver synchronization circuit.

2. The communications mechanism of claim 1, further comprising:
   a switching mechanism coupled to said receiver synchronization circuits for selectively enabling each line of said first plurality of parallel lines to carry functional data.

3. The communications mechanism of claim 2, further comprising:
   a calibration mechanism for periodically recalibrating each line of said first plurality of parallel lines;
   wherein said calibration mechanism calibrates one line of said plurality of parallel lines at a time; and
   wherein said switching mechanism is further coupled to said calibration mechanism, said switching mechanism disabling a line of said plurality of parallel lines for calibration by said calibration mechanism while at least some lines of said plurality of parallel lines not being calibrated are enabled for carrying functional data.

4. The communications mechanism of claim 2, wherein a maximum number of lines which can be enabled by said switching mechanism for carrying function data at any given time is $N_{MAX}$, and wherein said first plurality of parallel lines comprises at least $(N_{MAX}+1)$ lines.

5. The communications mechanism of claim 1, wherein said power saving mechanism is responsive to a traffic monitoring mechanism which monitors data traffic on said communications link, wherein the number of lines temporarily powered down is adjusted responsive to at least one traffic parameter determined by said traffic monitoring mechanism.

6. The communications mechanism of claim 1, wherein each said receiver synchronization circuit comprises a respective phase rotator for generating an independently adjusted phase rotated clock signal from a common interface clock signal of said parallel communications link for use by one or more components of the respective receiver synchronization circuit, the respective phase rotator being among the components temporarily powered down by said power saving mechanism.

7. The communications mechanism of claim 6,
   wherein each said receiver synchronization circuit further comprises a respective clock divider for generating a divided frequency clock signal from the independently adjusted phase rotated clock signal; and
   wherein said adjustment of at least one parameter required for re-synchronization of the respective receiver synchronization circuit comprises a shift of said divided frequency clock signal.

8. The communications mechanism of claim 1,
   wherein each said receiver synchronization circuit comprises a respective deskew circuit which receives input data which is not synchronized to said common clock domain and produces output data synchronized to said common clock domain, said deskew circuit comprising a plurality of latches and a selector selecting the output of one of said plurality of latches responsive to a control input from an unload counter;
   wherein said adjustment of at least one parameter required for re-synchronization of the respective receiver synchronization circuit comprises an adjustment of said unload counter.

9. The communications mechanism of claim 2,
   wherein said power saving mechanism supports operation of said first plurality of parallel lines using a plurality of different bus widths, including a first bus width in which exactly N1 lines of said plurality of parallel lines are enabled by said switching mechanism to carry functional data, and a second bus width in which exactly N2 lines of said plurality of parallel lines are enabled by said switching mechanism to carry functional data, wherein 0<N1<N2.

10. The communications mechanism of claim 1,
    wherein said pre-determined data pattern comprises a repeating pseudo-random bit stream which is used by said communications mechanism for at least one of: (a) periodically re-calibrating at least one calibratable parameter of each said receiver synchronization circuit; or (b) scrambling and descrambling functional data transmitted by said communications mechanism.

11. The communications mechanism of claim 1,
    wherein said second digital data device comprises a respective data pattern generator associated with each receiver synchronization circuit for generating the corresponding pre-determined data pattern generated by the second digital device to determine an adjustment of at least one parameter required for re-synchronization of the respective receiver synchronization circuit; and
    wherein the data patterns transmitted on each line are identical repeating data patterns which are out of phase with respect to one another.

12. The communications mechanism of claim 1, further comprising:
    a respective transmitter circuit associated with each of a second plurality of parallel lines supporting a parallel communications link for communicating data in a second direction from said second digital data device to said first digital data device.

13. A digital data processing apparatus, comprising:
    a plurality of digital data modules;
    at least one parallel communications link for communicating data between a first module of said plurality of digital data modules and a second module of said plurality of digital data modules, said at least one parallel communications link having a first plurality of parallel lines supporting data communication in a first direction from said first digital data module to said second digital data module;

a respective receiver synchronization circuit in said second digital data module associated with each of said first plurality of parallel lines, each receiver synchronization circuit outputting respective received data in a common clock domain;

a power saving mechanism for temporarily powering down one or more respective components associated with each of said first plurality of parallel lines;

a receiver re-synchronization mechanism which re-synchronizes the respective receiver synchronization circuit associated with each temporarily powered down line of said first plurality of parallel lines upon re-powering the line by matching a pre-determined data pattern transmitted by a respective transmitter circuit associated with the respective line in said first digital data module with a corresponding pre-determined data pattern generated by said second digital data module to determine an adjustment of at least one parameter required for re-synchronization of the respective receiver synchronization circuit.

* * * * *